(12) United States Patent
Kokatsu et al.

(10) Patent No.: US 7,370,720 B2
(45) Date of Patent: May 13, 2008

(54) ELECTROMOTIVE POWER ASSISTED BICYCLE

(75) Inventors: Kyosuke Kokatsu, Osaka (JP); Akihito Yoshiie, Osaka (JP); Fumihito Nigara, Osaka (JP)

(73) Assignees: Sunstar Giken Kabushiki Kaisha, Osaka (JP); Sunstar Suisse SA, Ecublens (CH)

( * ) Notice: Subject to any disclaimer, the term of this patent is extended or adjusted under 35 U.S.C. 154(b) by 235 days.

(21) Appl. No.: 10/500,220

(22) PCT Filed: Dec. 2, 2002

(86) PCT No.: PCT/JP02/12601

§ 371 (c)(1),
(2), (4) Date: Jun. 25, 2004

(87) PCT Pub. No.: WO03/057554

PCT Pub. Date: Jul. 17, 2003

(65) Prior Publication Data

US 2005/0077096 A1    Apr. 14, 2005

(30) Foreign Application Priority Data

Dec. 28, 2001  (JP) .............................. 2001-400826

(51) Int. Cl.
*B62K 11/00* (2006.01)
(52) U.S. Cl. .................................................... 180/205
(58) Field of Classification Search ............... 180/205, 180/206, 207, 220
See application file for complete search history.

(56) References Cited

U.S. PATENT DOCUMENTS

| | | | | |
|---|---|---|---|---|
| 3,991,843 A * | 11/1976 | Davidson | .................... | 180/206 |
| 6,015,882 A * | 1/2000 | Petersen et al. | ............. | 530/350 |
| 6,352,131 B1 * | 3/2002 | Lin et al. | ..................... | 180/207 |
| 6,545,437 B1 * | 4/2003 | Strothmann | .................. | 318/139 |
| 6,684,971 B2 * | 2/2004 | Yu et al. | ...................... | 180/205 |
| 6,851,497 B1 * | 2/2005 | Yoshiie et al. | .............. | 180/206 |
| 2003/0159870 A1 * | 8/2003 | Yu et al. | ..................... | 180/206 |
| 2005/0039963 A1 * | 2/2005 | Forderhase | .................. | 180/205 |
| 2005/0173174 A1 * | 8/2005 | Edmonds, Jr. | .............. | 180/206 |
| 2005/0189157 A1 * | 9/2005 | Hays et al. | .................. | 180/207 |

FOREIGN PATENT DOCUMENTS

| | | |
|---|---|---|
| EP | 0 686 522 | 12/1995 |
| EP | 0 822 134 | 2/1998 |
| EP | 1 092 622 | 4/2001 |
| EP | 1 092 826 | 4/2001 |
| FR | 2 645 823 | 10/1990 |
| FR | 2 741 585 | 5/1997 |

(Continued)

*Primary Examiner*—Tony Winner
(74) *Attorney, Agent, or Firm*—Wenderoth, Lind & Ponack, L.L.P.

(57) ABSTRACT

An electromotive power assisted bicycle includes a drive shaft rotated by a pedal effort a primary sprocket fixed to the drive shaft for transmitting the pedal effort to a drive wheel; a secondary sprocket fixed to the drive shaft coaxially with the primary sprocket; a pedal effort detection sensor; an electromotive power output unit box detachably attached to the body for outputting electromotive power in response to the detected pedal effort; a power sprocket coupled to a rotating output shaft of the electromotive power output unit box; an auxiliary chain stretched between the secondary sprocket and the power sprocket; a supporting section for rotatably supporting the drive shaft; and a unit mounting bracket on which the electromotive power output unit box is mounted, the unit mounting bracket being fixed to the supporting section with the drive shaft penetrating through the unit mounting bracket.

47 Claims, 35 Drawing Sheets

FOREIGN PATENT DOCUMENTS

| | | |
|---|---|---|
| FR | 2 768 990 | 4/1999 |
| JP | 10-318860 | 12/1998 |
| JP | 2001-130476 | 5/2001 |
| JP | 2001-247069 | 9/2001 |

* cited by examiner

Fig. 6
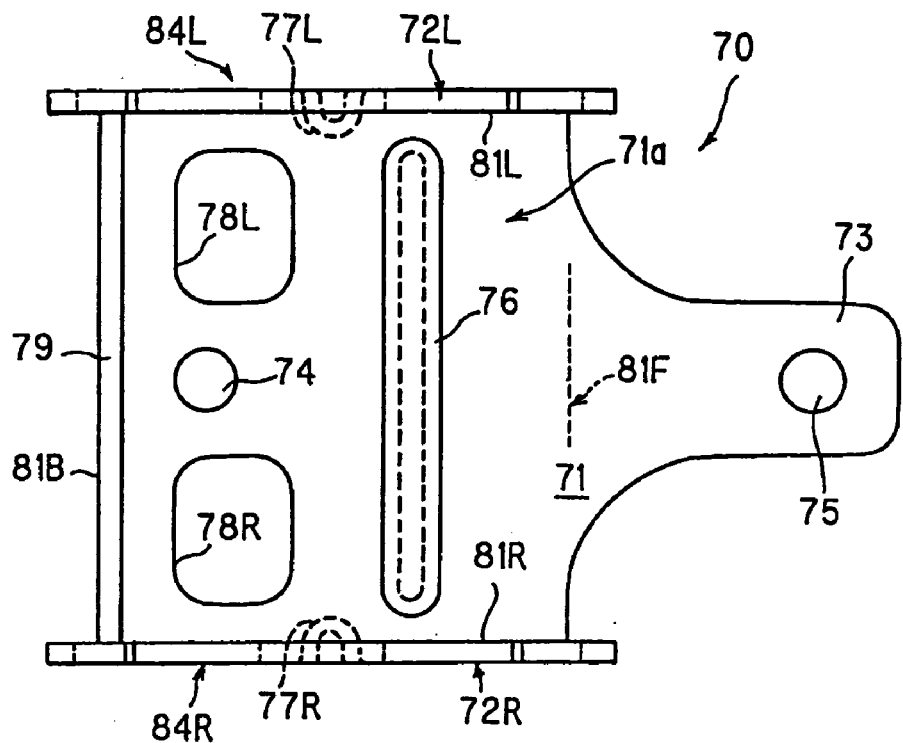
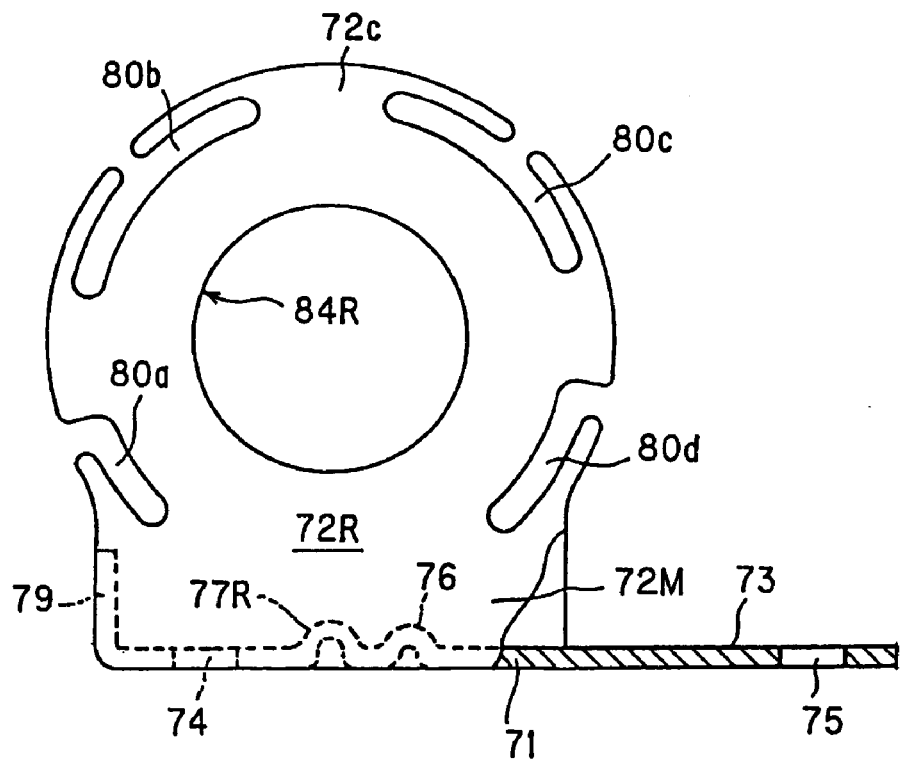

Fig. 7
(a)
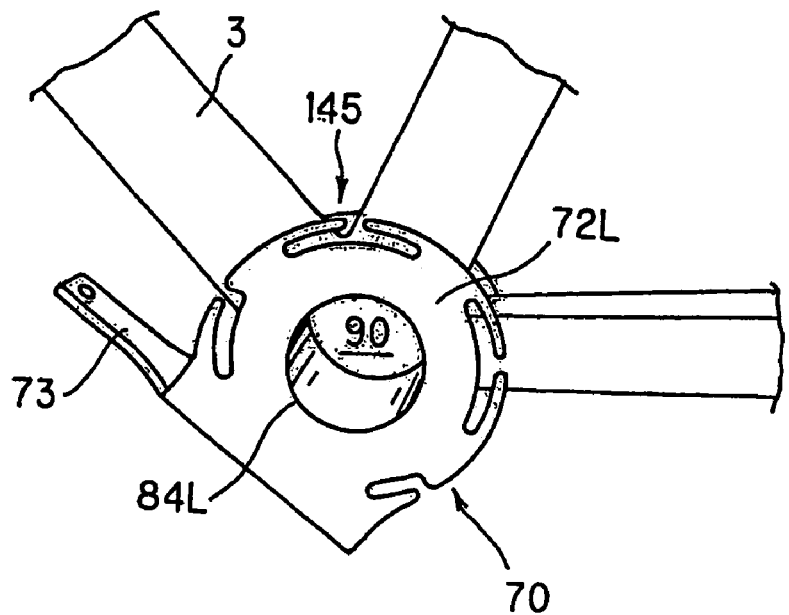
(b)
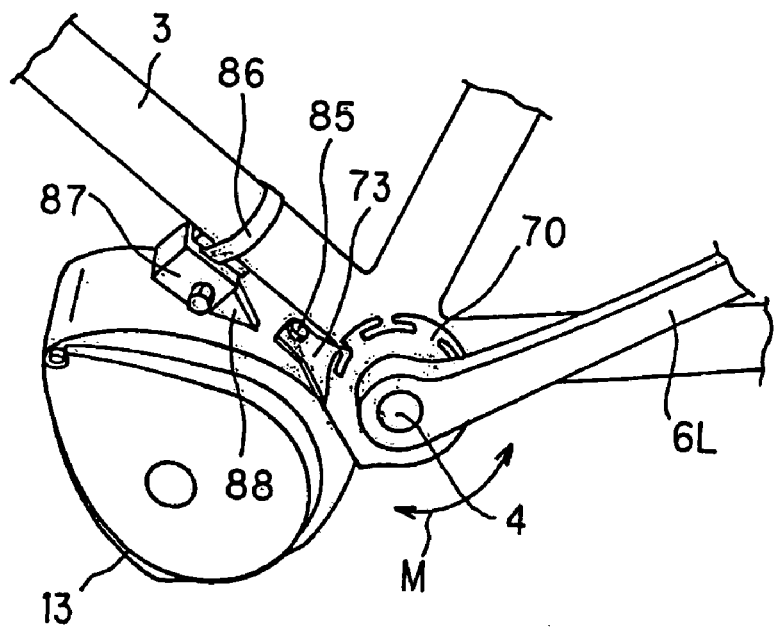

Fig. 8
(a)
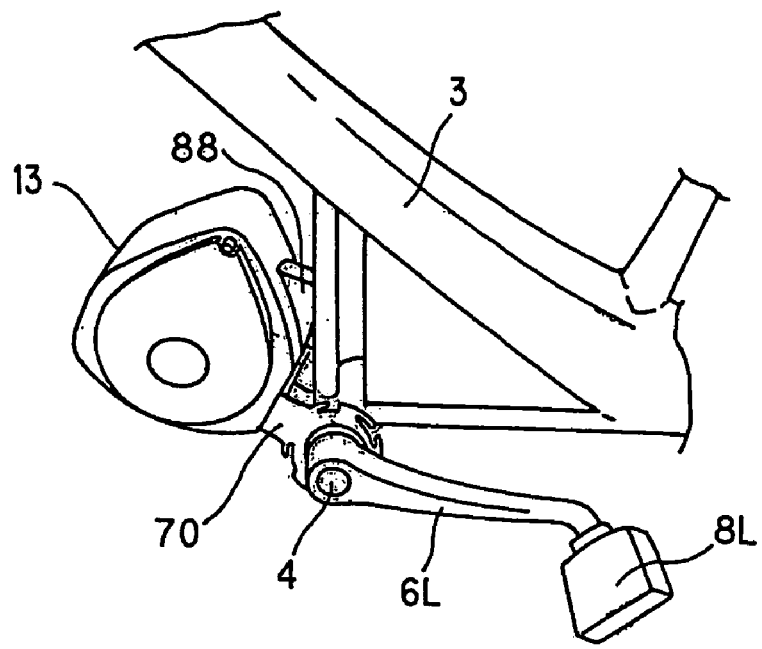
(b)
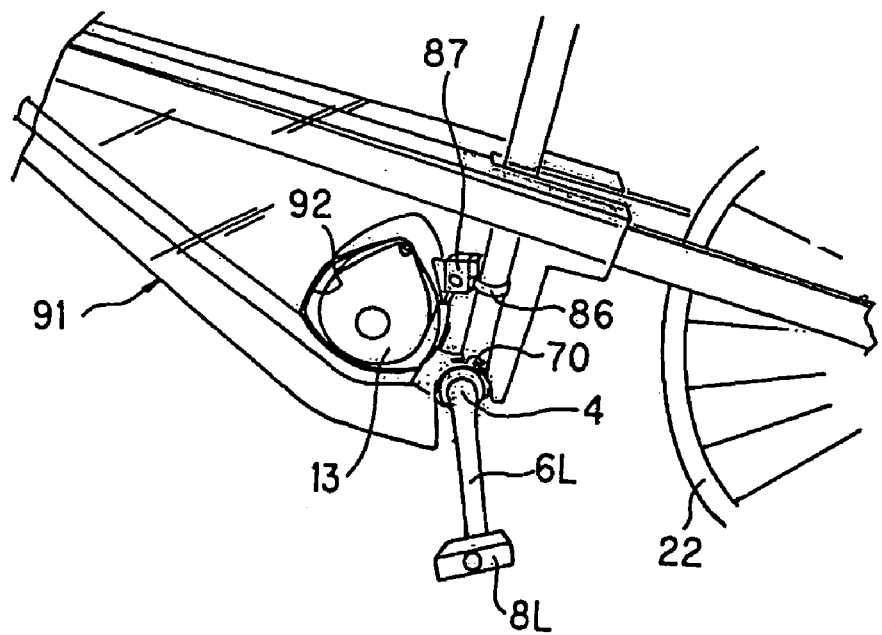

Fig. 9
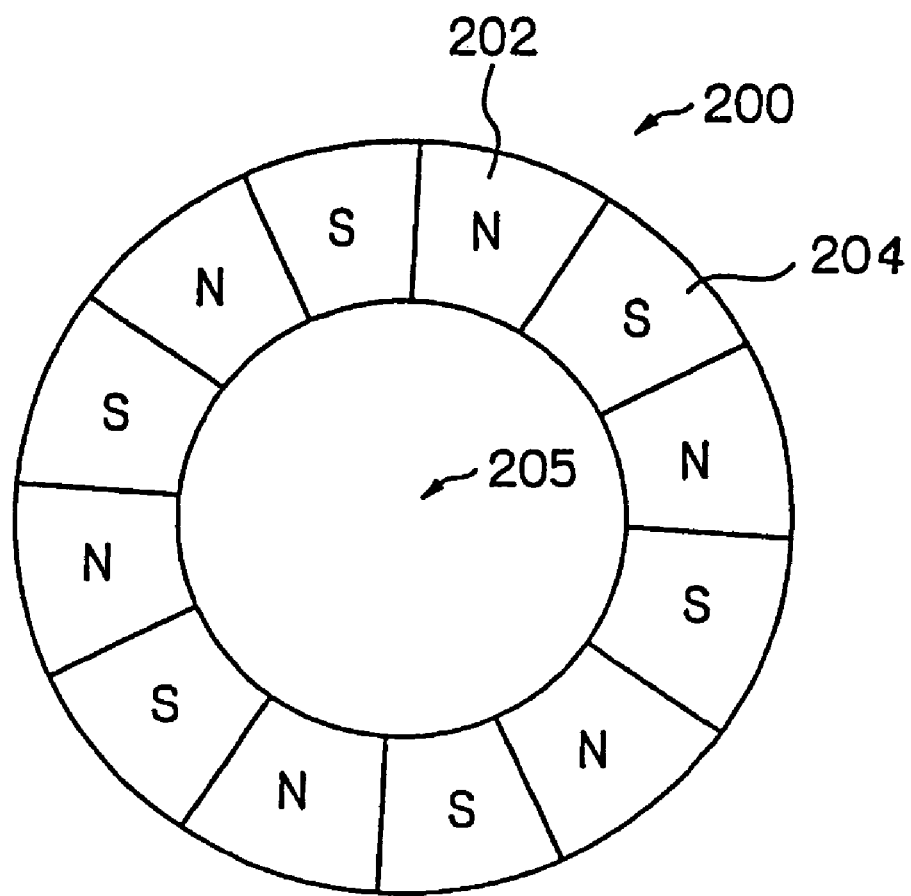
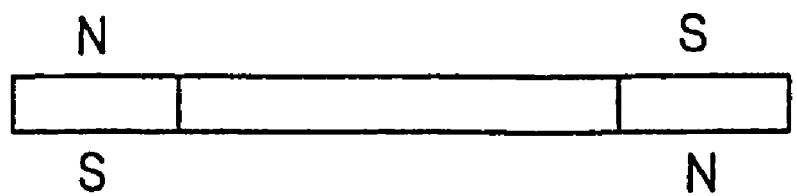

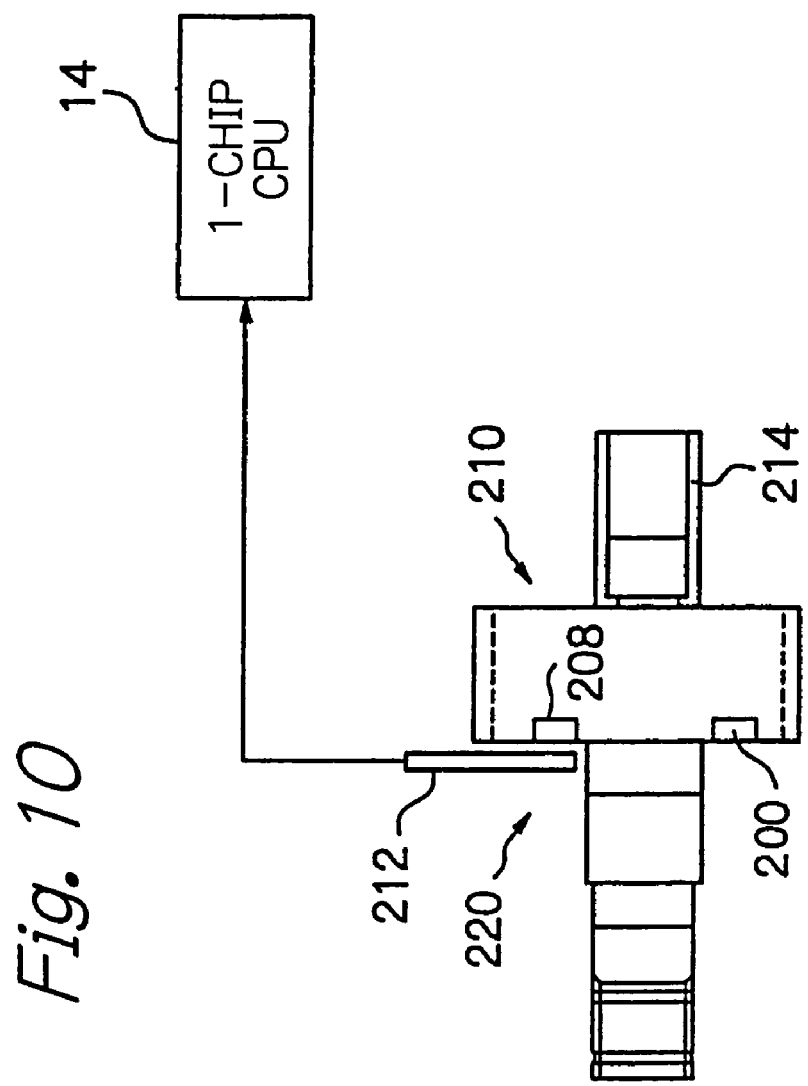
Fig. 10
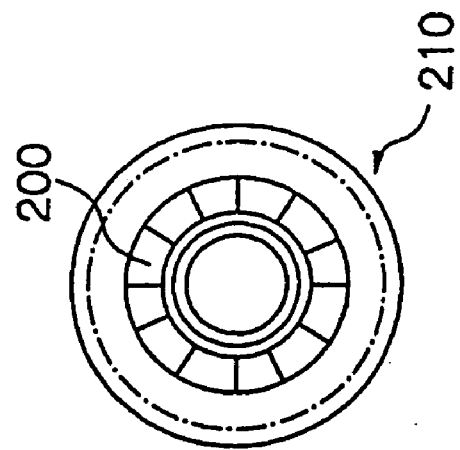

220

Fig. 12
(a)
MAGNETIC INTENSITY
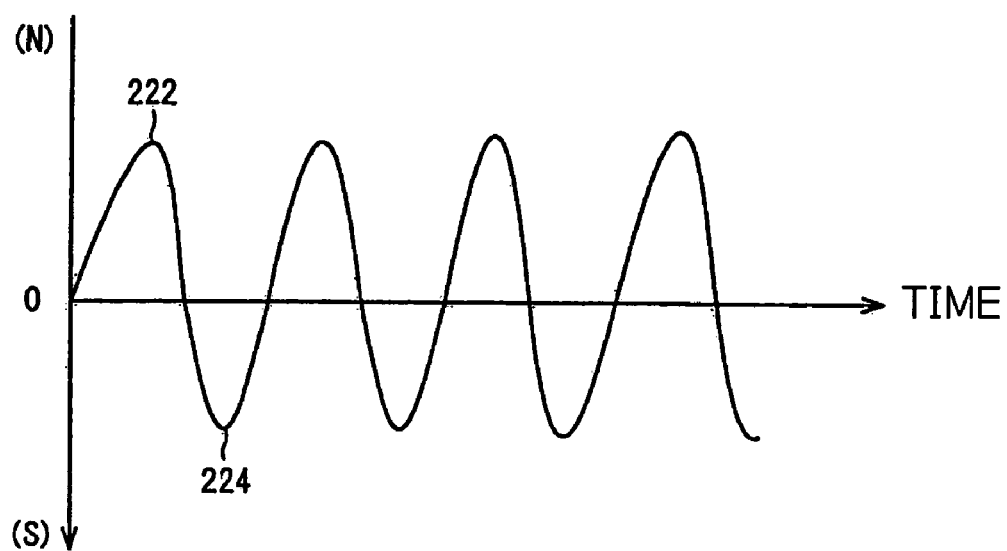
(b)
HALL IC OUTPUT (V)
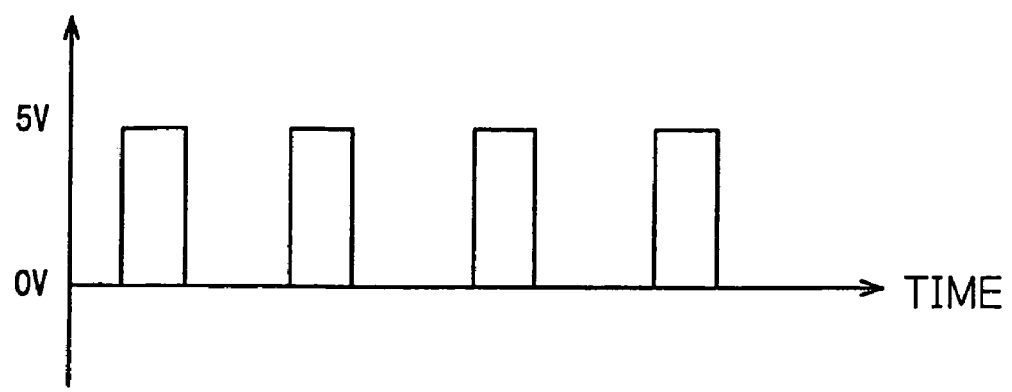

Fig. 16
(a) 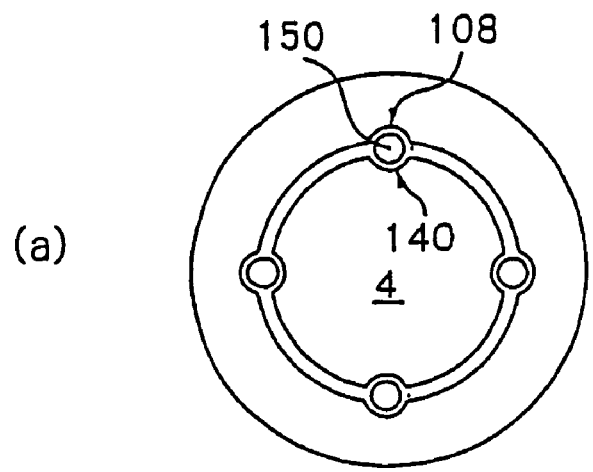
(b) 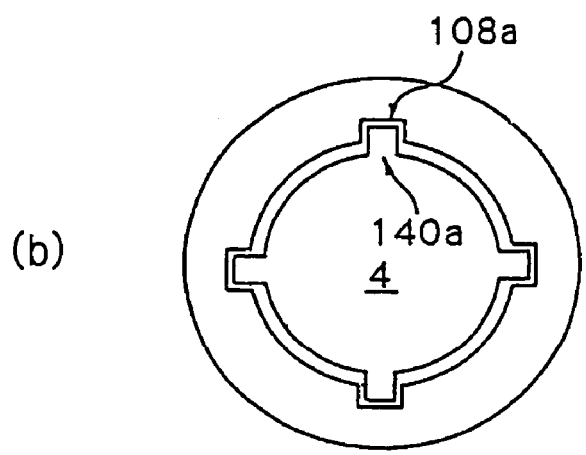
(c) 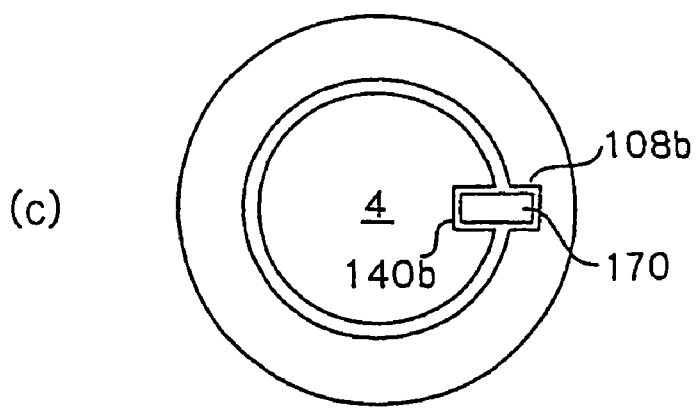

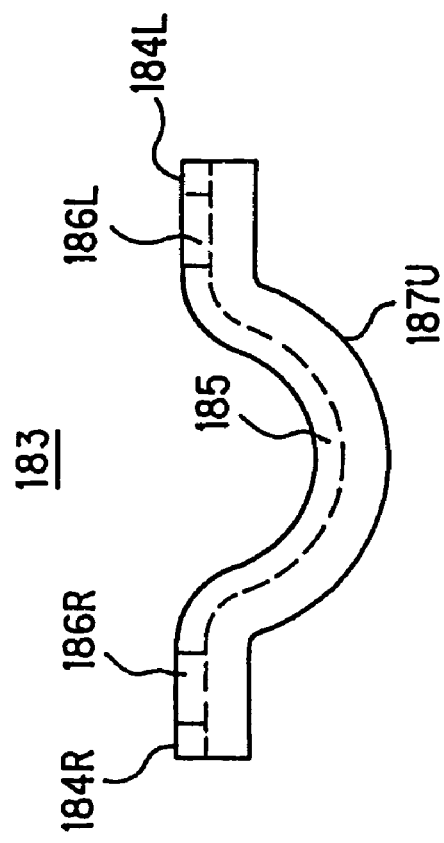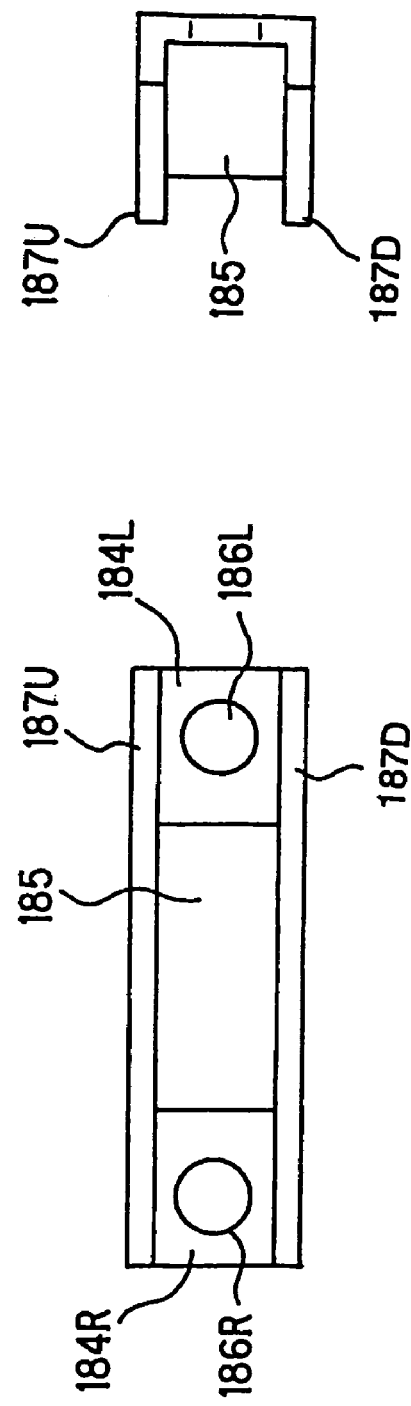
Fig. 22

Fig. 23
(a)
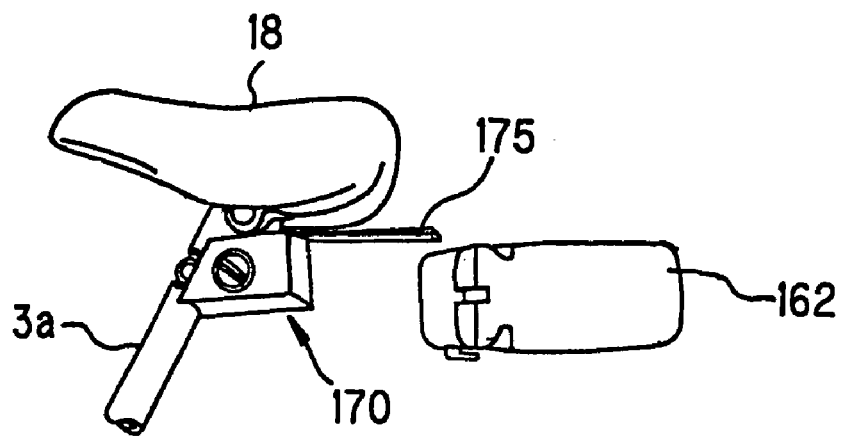
(b)
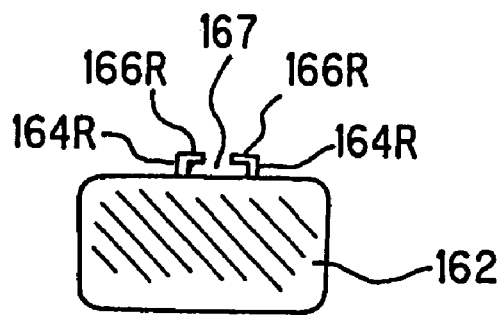
(c)
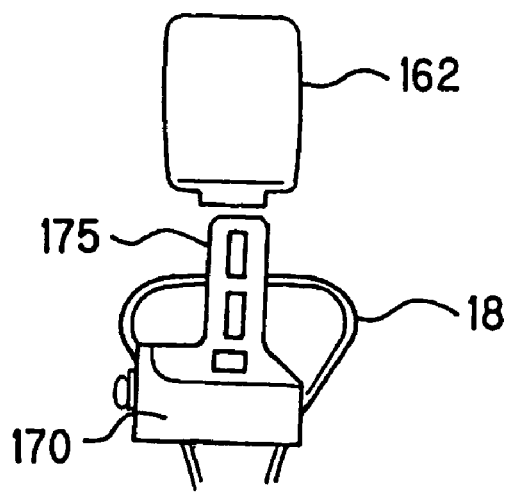

Fig. 24
(a)
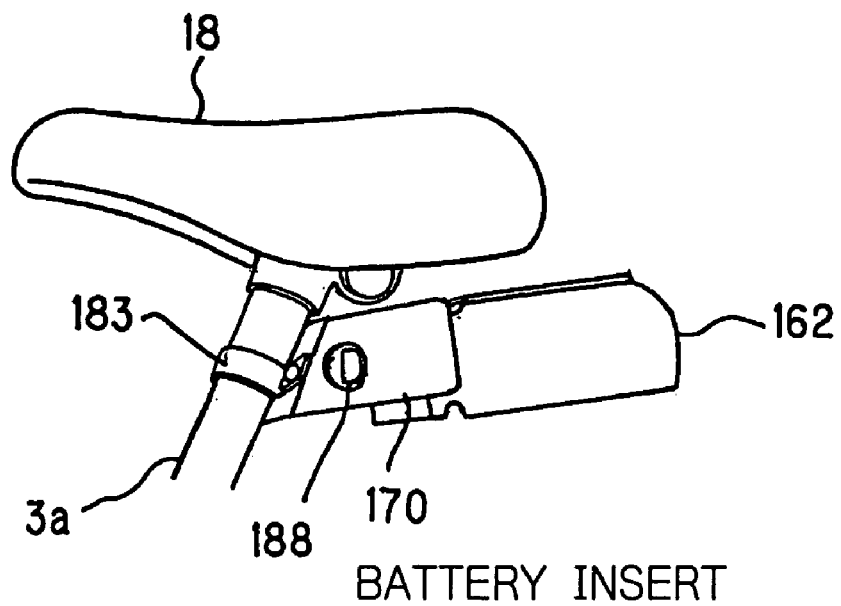
BATTERY INSERT
(b)
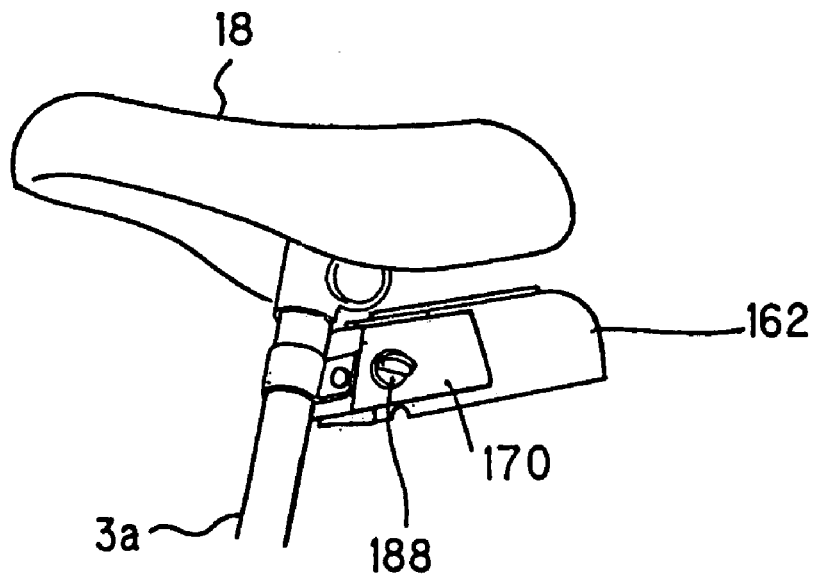
BATTERY FITTED COMPLETELY

Fig. 25
(a) FRONT SIDE
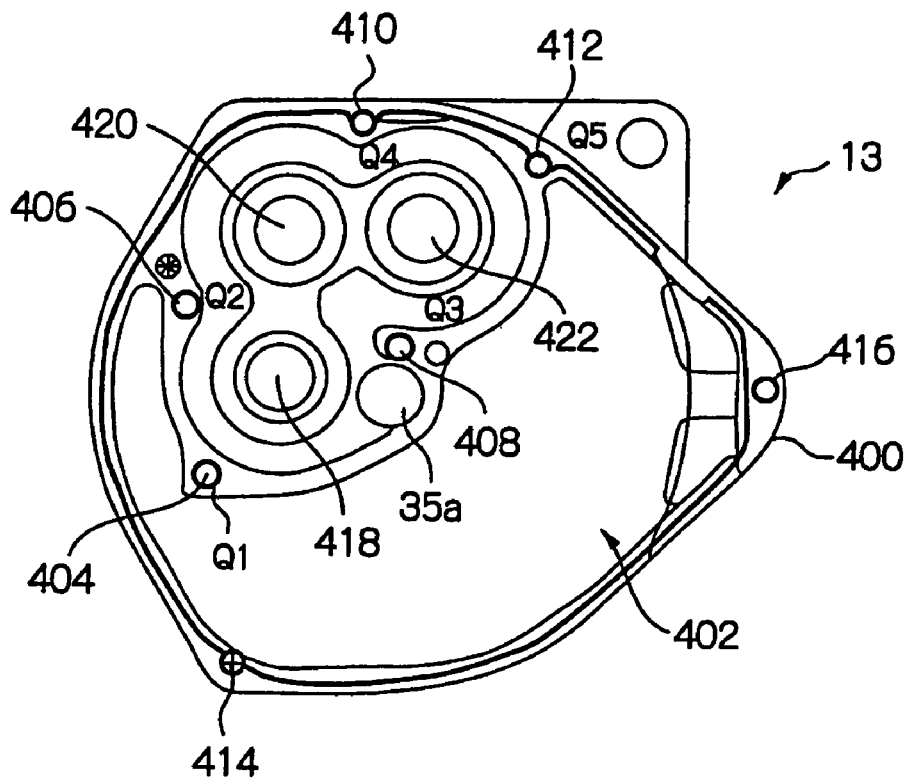
(b) REVERSE SIDE
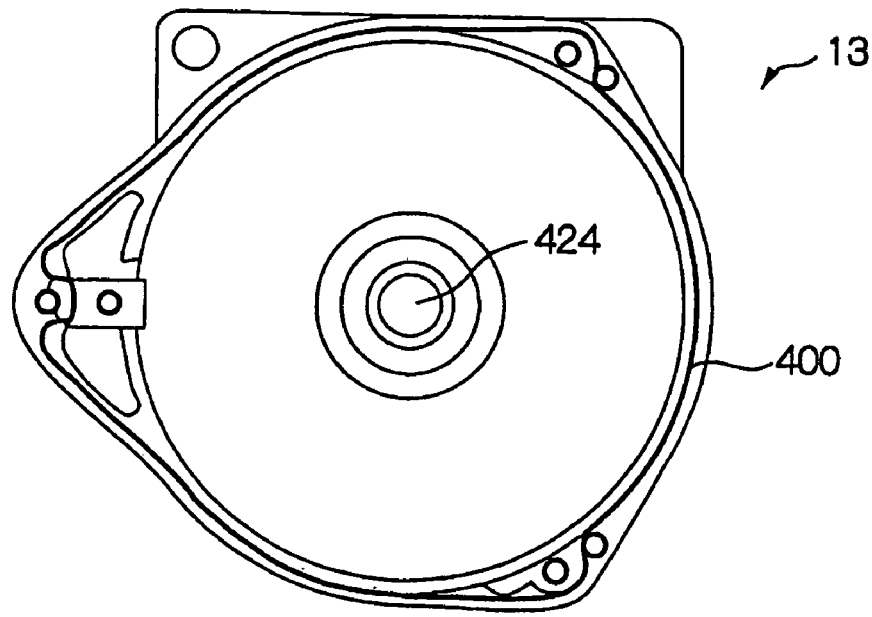

Fig. 27
(a) 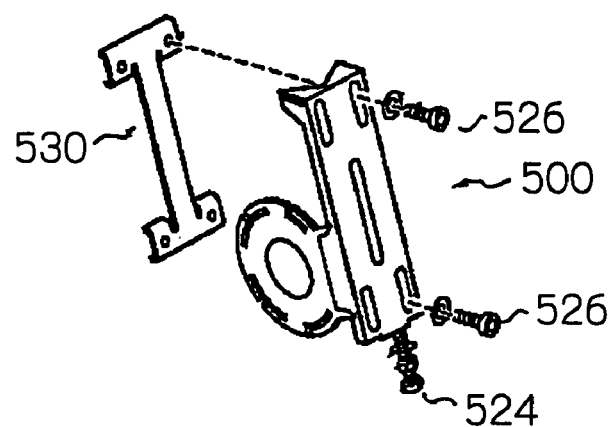
(b) 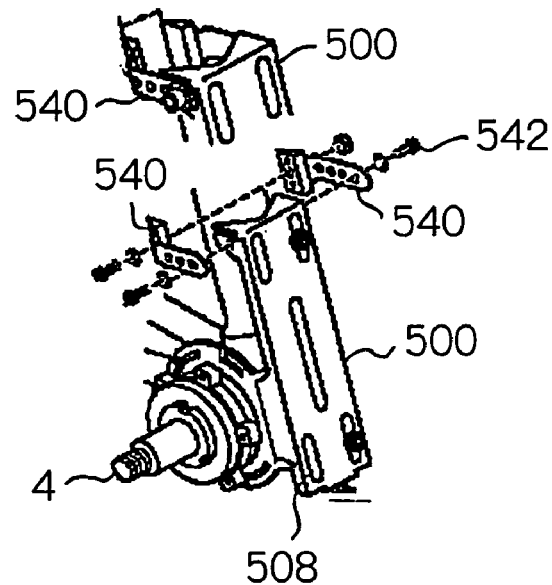
(c) 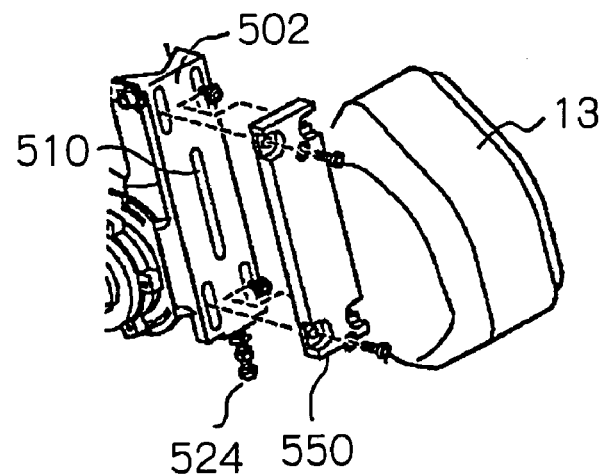

Fig. 29
(a)
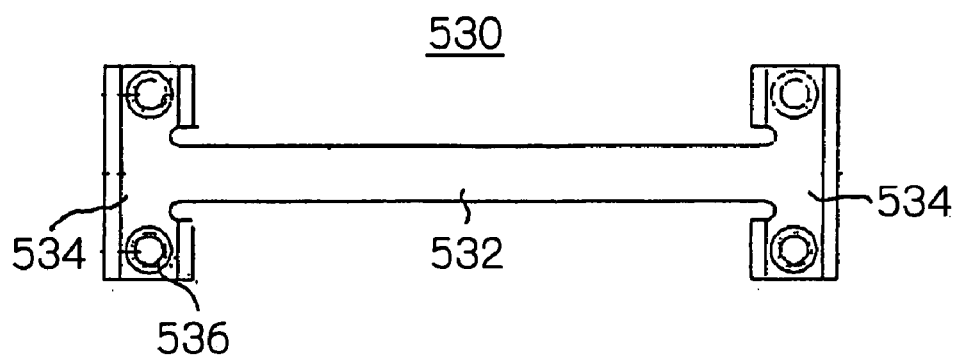
(b)
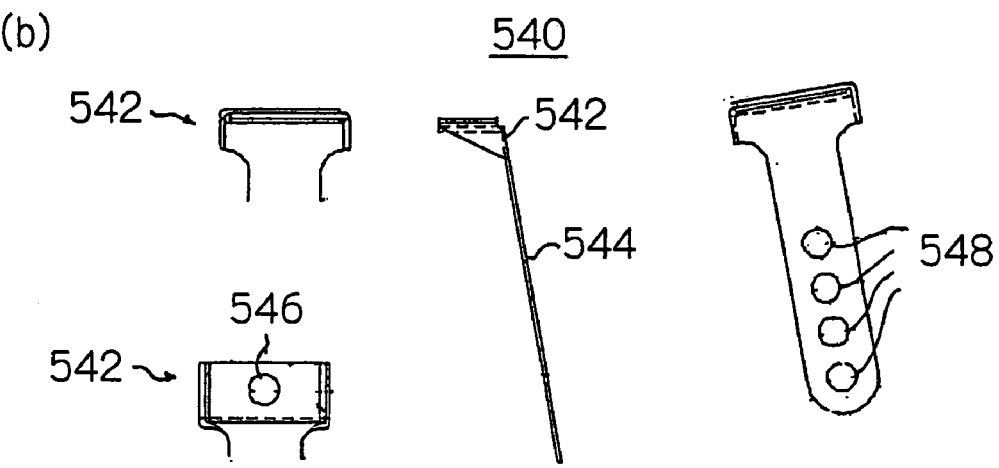
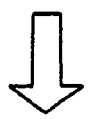
FINAL CONTOUR

Fig. 30
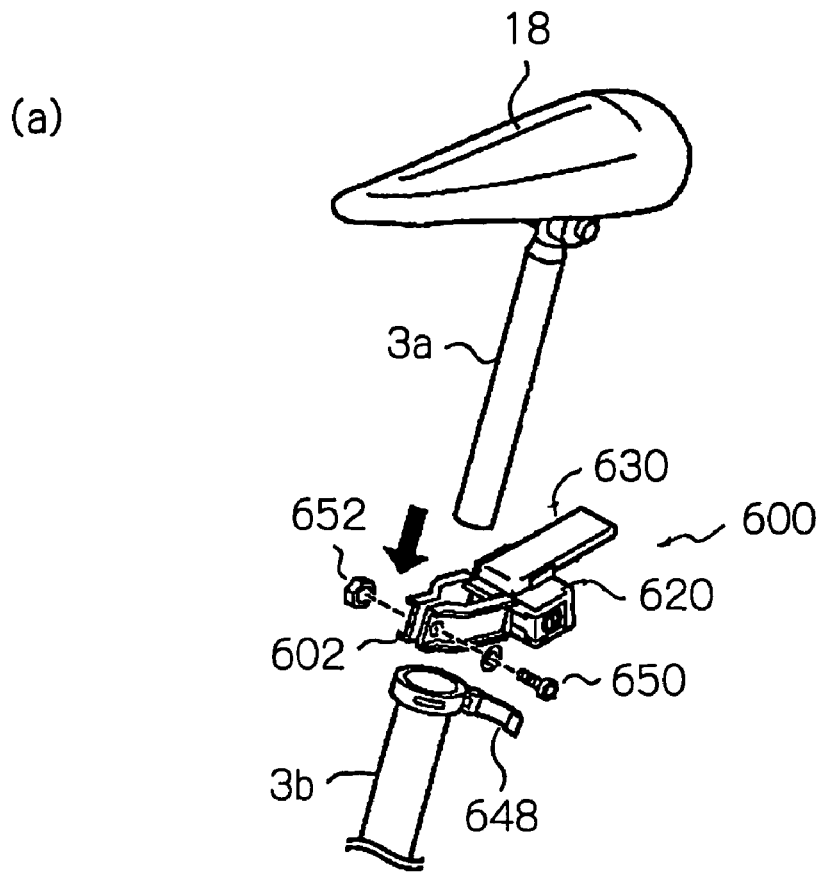
(a)
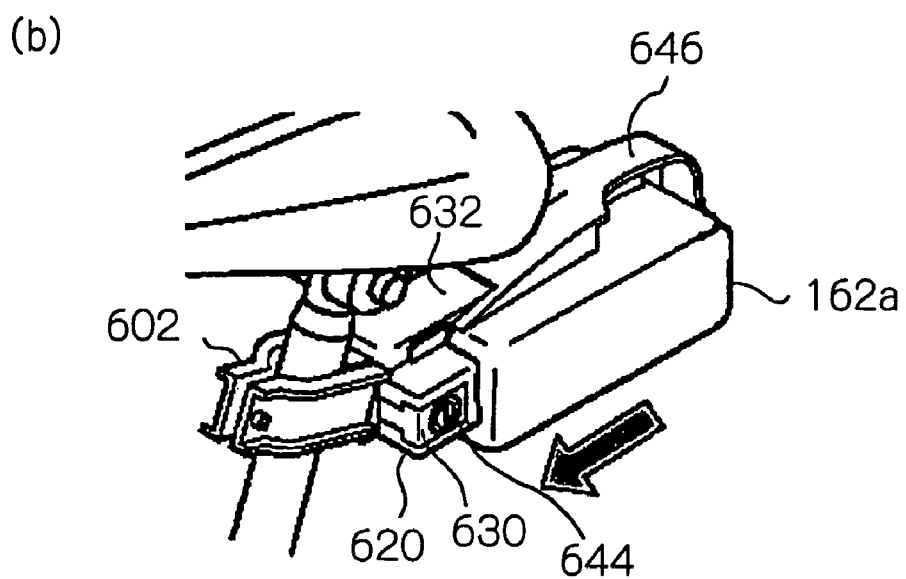
(b)

Fig. 31
602
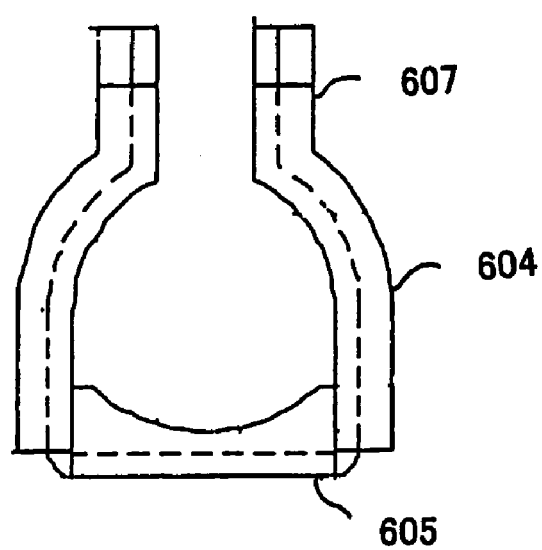
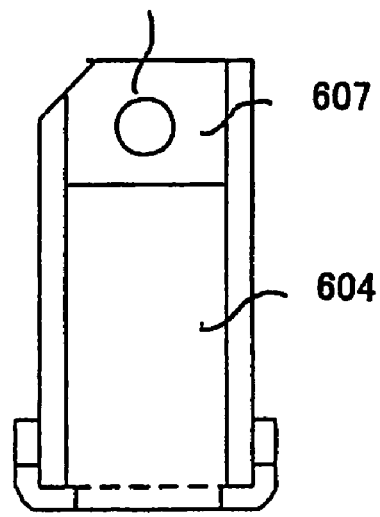
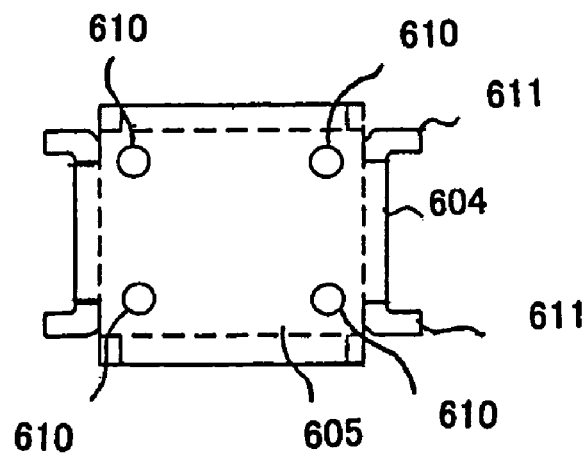

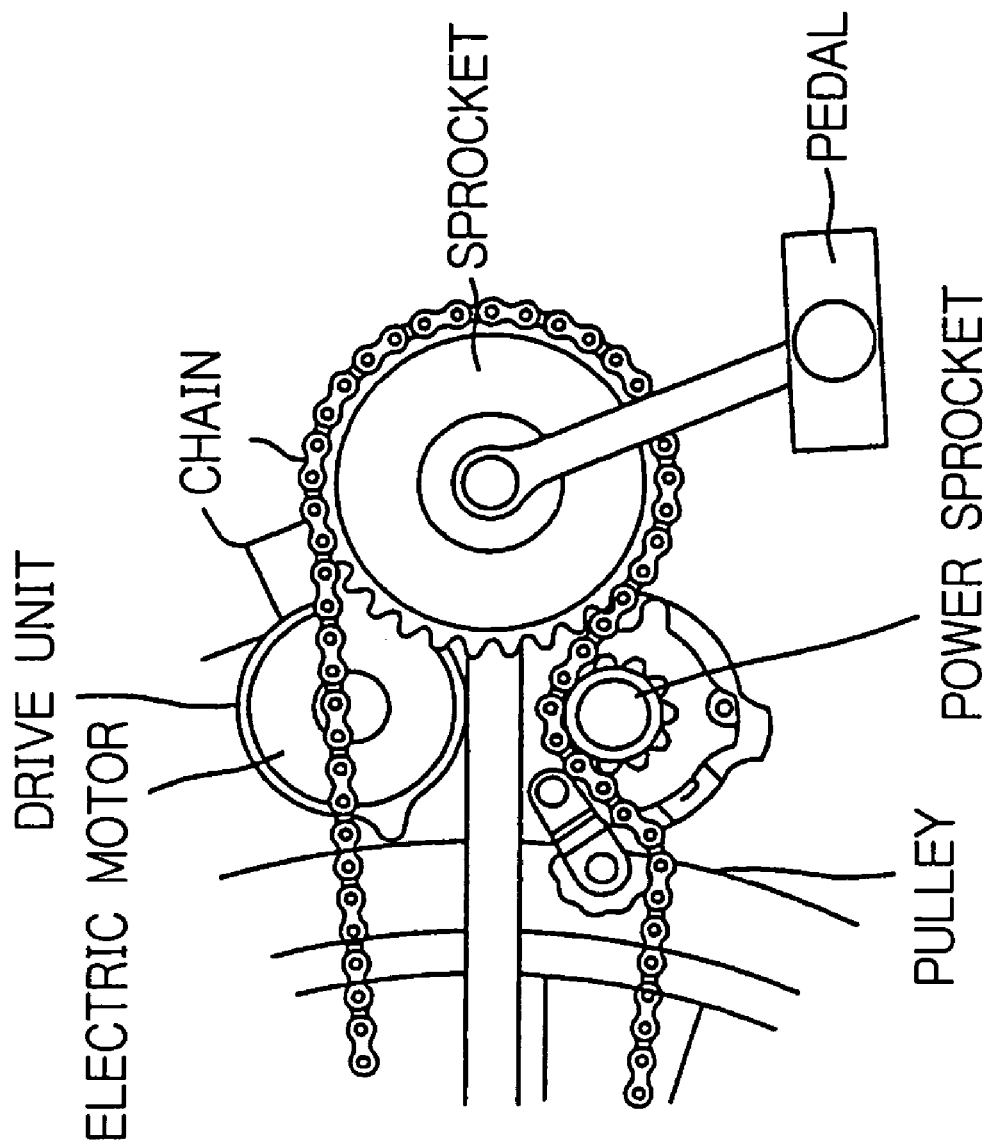

ELECTROMOTIVE POWER ASSISTED BICYCLE

FIELD OF THE INVENTION

The present invention relates to an electromotive power assisted bicycle that can run under a pedal effort to be assisted by electromotive power; and more specifically to an electromotive power assisted bicycle wherein the attachment system of the electromotive power has a high degree of flexibility for installation thereof.

BACKGROUND OF THE INVENTION

Conventionally, an electromotive power assisted bicycle that can run under a pedal effort assisted by electromotive power has been made using a body frame tailored specifically for such a bicycle, and the frame has been further built upon by incorporating an electric motor, a reduction gear, a battery and other components such as a force combining mechanism for adding the electromotive power to the pedal effort. Those components have also been fabricated as dedicated parts adapted to the dedicated body frame.

Among the above components, an example of a type of mechanism that has been suggested as the force combining mechanism includes a unit of dedicated design around a crank shaft such that the pedal effort applied onto the crank shaft and the power transmitted from the electric motor may be output coaxially from the crank shaft. In addition, a chain direct drive system as shown in FIG. 35 has been also suggested. The chain direct drive system includes, mounted on the body frame, an electric motor, a reduction gear for reducing a revolution speed of said electric motor and for outputting a resultant power therefrom and the like, wherein a power sprocket coupled to an output shaft of the reduction gear is, along with a regular sprocket, engaged with a chain for transmitting the pedal effort. At the same time, to ensure a contact angle of the chain over the power sprocket, pulleys are engaged with the chain respectively from the opposite side thereof.

In one method for assembling the battery to the body, an attachment for fixing the battery is mounted to a seat post or a seat tube of the electromotive power assisted bicycle, so that a battery box containing the battery may be installed detachably in said attachment so as to extend from the seat post or the like toward the rear side of the body. According to this attaching method, the attachment is formed into a U-shaped unit comprising a curved portion and a halving portion, in which the curved portion is externally fitted onto the seat post or the like, while a hook of the battery box is clamped in the halving portion, so that the battery box can be fixedly secured to the attachment by tightening a fastener penetrating a bore formed through the halving portion.

The electric motor and the reduction gear housed in a gear box are typically mounted to the body frame in places where they are to be fixed, respectively, as separate components, and covered by a housing or the like. Otherwise, a gear box serving as an electromotive power output unit box containing both of the reduction gear and the electric motor is coupled to the body frame in a place where it is to be fixed.

The above-mentioned gear box comprises, in a typical example, a box having an opening, a cover for closing the opening, and a plurality of bolts for connecting the box and the cover in different positions. FIG. 34 shows a front elevation view of the conventional box viewed from the opening side, wherein a plurality of gears is housed on the inside thereof. The cover is placed over the box shown in FIG. 34, and screws are fastened, or bolts are threaded, over the cover at a plurality of locations to thereby fix the gear. At this time, a shaft end defined in the front side of the gear is held by a bearing provided in an inside of the cover. In FIG. 34, those portions designated by P1, P2, P3 and P4 serve as the locations for the bolts to be attached. Specifically, the bolts are attached along an outer periphery of the box.

However, in the above described prior art, since the electromotive power assisted bicycle is built by providing a specialized body for the electromotive power assisted bicycle and then mounting to said body respective components exclusively tailored therefor, the components can not be adapted to a frame for a regular bicycle, thereby losing versatility. Therefore, those systems according to the prior arts have common problems that they may lead to an increase in cost as well as to a complicated mechanism, resultantly increasing the volume and weight of the electromotive power assisted bicycle. Detailed problems associated with the above-described respective prior arts will now be discussed individually.

In the above-mentioned force combining mechanism according to the prior art, the mechanism of crank coaxial output type needs to employ a structure different from a typical frame around the crank shaft, which may lead to a complex and enlarged profile of the structure around the crank shaft. On the other hand, the prior art force combining mechanism relying on the direct chain drive system shown in FIG. 35 entails a problem that the force combining mechanism is installed exclusively in a location where the chain for transmitting the pedal effort runs therethrough, which is, in actual practice, in a position near the chain (an upper or a lower side thereof) located between the sprocket and a rear wheel. Consequently, the force combining mechanism cannot be installed in a front side of the sprocket. Accordingly, some bicycles still need to have their frames adapted for installing the force combining mechanism, depending on the frame structures thereof. In addition, since in this type of system, such an arrangement as shown in the drawing is essential, in which the pulley is disposed in association with the power sprocket so as to be engaged with the chain in a longitudinal direction serially along a length thereof to ensure the contact angle of the chain over the power sprocket, the degree of flexibility relating to the installation space will be further reduced.

Further, in the mounting system of the battery according to the prior art as described above, since the battery is often placed longitudinally owing to the U-shaped attachment to be used, and in a case that the battery is moved in the vertical direction, a long distance must be provided between the attachment and a saddle, meaning a large space is necessary for attaching and detaching, thus a restriction is imposed on the body frame available for mounting the attachment. Besides, in this mounting system, since the fastener has to be loosened or tightened in response to the detaching or attaching operation of the battery, the attaching and detaching operation takes time, and further disadvantageously, the system entails a problem that a third party may possibly loosen the fastener and steal the battery easily.

The gear box serving as the above electromotive power output unit according to the prior art needs to be adjusted such that its position is precisely relative to the force combining mechanism, so that the electromotive power can be added to the pedal effort correctly, and said gear box also has to be mounted fixedly to the body frame so as not to become displaced with respect thereto. Further, the gear box has to be mounted carefully so as not to interfere with the rigid frame and to thereby offset the gear position. To satisfy these requirements, although in some practices according to the prior art a dedicated body frame has been made, or a special processing has been applied thereto, such attempts have not yet successfully utilized a regular frame manufacturing process. Further, if the electromotive power output unit box is to be mounted without applying any modification to the frame, the electromotive power output unit itself, and attachments used to mount the unit to the frame are apt to be complicated, and furthermore, in such a case the difficulty in positioning is not avoidable. The facts mentioned above are similarly applicable to a case where the electric motor and the reduction gear are separately mounted.

Furthermore, since the conventional gear box shown in FIG. 34 is fastened with screws in the vicinity of the peripheral region thereof, in some gears, the position of a shaft center may be significantly distant from those of the screws. Thus, in such an arrangement having distant screwed positions, if a gear such as a helical gear, for example, that produces a component force in an axial direction of the shaft is used, said component force in the axial direction may produce a deflection in the gear box (especially in the cover) thereby inducing a vibration thereof. Namely, a so-called drumming phenomenon may be induced. Further, since the gear box is deformed and thereby a pitch error may be produced between gears and also a perpendicularity of the gear mounting portion may be distorted, it is more likely to make a sound. Especially, if a flat motor is used, the motor tends to pick up the vibrations from the gear and thereby the motor sound is also magnified.

The present invention has been made in the light of the above facts, and an object thereof is to provide an electromotive power assisted bicycle of a simple mechanism, which enables a bicycle comprising a regular frame to be electrically powered easily by extending the degree of freedom for installation of respective components and also by facilitating a mounting and adjusting operation thereof, thereby solving the above problems.

SUMMARY OF THE INVENTION

To solve the problems pointed out above, an electromotive power assisted bicycle of the present invention comprises: a drive shaft to be revolved by a pedal effort; a primary sprocket fixed to said drive shaft for transmitting the pedal effort to a driving wheel; a secondary sprocket fixed to said drive shaft coaxially with said primary sprocket; a pedal effort detection means for detecting the pedal effort; an electromotive power output unit box that is detachably mounted to a body and serves for outputting an electromotive power in response to the pedal effort detected by said pedal effort detection means; a power sprocket coupled to an output rotary shaft of said electromotive power output unit box; an auxiliary chain stretched across between said secondary sprocket and said power sprocket; and a battery bracket capable of accommodating a battery for said electromotive power output unit box.

According to the present invention, as the electromotive power output unit box outputs electromotive power corresponding to the detected pedal effort, said electromotive power causes the power sprocket to rotate. The rotating torque of the power sprocket is transmitted to the secondary sprocket via the auxiliary chain stretched around the power sprocket. The thus rotated secondary sprocket, that rotates coaxially with the primary sprocket, can transmit the electromotive power to the primary sprocket immediately. The primary sprocket transmits the resultantly combined force consisting of the pedal effort plus the electromotive power to the driving wheel.

Thus, the present invention does not employ a system as the crank coaxial output type of the force combining mechanism or the chain direct drive system according to the prior art, where an auxiliary power is transmitted directly to the portion whose position is defined geometrically, but a system in which the torque to be output from the power sprocket is transmitted to the secondary sprocket rotating coaxially with the primary sprocket via a separate auxiliary chain. This may allow the power sprocket to be installed in any desired location as long as the power sprocket does not interfere with the primary sprocket or other portions of the body frame, thus extending the degree of freedom for the installation of the electromotive power output unit box. For example, the power sprocket can be placed in any desired location along a circumferential direction of the secondary sprocket (and thus the primary sprocket). Further, if the length of the auxiliary chain is changed, the distance from the secondary sprocket (and thus the primary sprocket) to the power sprocket can be modified as desired.

Yet further, since in the present invention, the electromotive power output unit box has been provided, which is constructed by enclosing the components for outputting the electromotive power by the housing and thus unitizing them such that said box may be detachable, and further the battery bracket has been provided, which is capable of accommodating the battery for the electromotive power output unit box, the present invention enables even an ordinary bicycle having no dedicated frame to be electrically powered easily.

To install the electromotive power output unit box detachably, it is further preferred that the electromotive power assisted bicycle comprises a support section for supporting the drive shaft, and a unit mounting bracket having a bottom plate and a pair of side plates extending from said bottom plate approximately vertically in the same direction. In one embodiment of installation of the electromotive power output unit box, the unit mounting bracket is fixed to the support section in such a state that the drive shaft penetrates through side holes formed respectively in said pair of side plates, while at the same time, the support section is clamped between said pair of side plates, wherein the electromotive power output unit box is attached to the bottom plate. In this case, the bottom plate is preferably fixed to the support section by being tightened toward the inner side along the axial direction of said drive shaft. In this way, the rotational position of the bottom plate can be adjusted appropriately around the axis of the drive shaft before being fixed to the support section, and a proper installation position of the unit can be determined automatically at the point where the auxiliary chain extending across between the power sprocket and the secondary sprocket can be stretched appropriately. Owing to the effect of enabling the installation position of the electromotive power output unit box to be adjusted by the unit mounting bracket in conjunction with such an advantage of the freedom in the installation position of the electromotive power output unit box with the aid of the secondary sprocket, the power sprocket and the auxiliary chain, the unit can be installed in the proper location without restriction as to the type of the frame. This means that since a bicycle of an ordinary type is equipped with the drive shaft and the support section for supporting the drive shaft without exception, and generally there is no frame provided beneath the bottom plate of the bracket that has been attached in the manner described above, the electromotive power output unit box can be installed easily without applying any additional processing to the frame of the ordinary bicycle.

A further preferred electromotive power output unit box comprises a box having an opening and accommodating a plurality of gears therein, a cover for closing the opening, and a plurality of connecting means for interconnecting the box and the cover at different connecting points respectively, wherein shaft ends of said plurality of gears are held by the cover, and the connecting points of said plurality of connecting means are arranged such that each of shaft centers of said plurality of gears whose shaft ends are held by the cover may pass through the inside of each of different triangles formed by connecting the connecting points of said plurality of connecting means.

According to the present invention, since the shaft centers of the plurality of gears whose shaft ends are held by the cover are allowed to pass through the inside of those different triangles formed by connecting the connecting points of the plurality of connecting means, the load applied onto said cover in the axial direction can be substantially dispersed evenly across the plurality of connecting means and so the load in the axial direction from the gears can be received efficiently by the screws of the gear box. Accordingly, the deflection of the gear box can be inhibited and thereby its associated problems including the drumming phenomenon and the deviations in the gear pitch and in the perpendicularity can be resolved. In addition, resultantly, even if the processing precision of the gear is degraded to some degree, the vibrations can be still controlled within an acceptable range, thereby easily realizing the cost reduction.

The battery bracket according to a preferred embodiment may comprise a bracket member capable of detachably accommodating the battery and engagingly locking the accommodated battery with a key, and a bracket retainer to be coupled with said bracket member so as to clamp the body frame. This can consistently achieve both the easiness of the attaching and detaching operation and the prevention of theft. Preferably, the body frame to which the battery bracket is to be fixed is a seat post. It is a matter of course that the battery bracket may be fixed to locations other than the body frame, for example, to a seat tube. It is to be noted that the term "coupling of the battery retainer with the bracket member" also includes the case where both are integrated to form a single unit.

When the battery bracket is to be fixed to the seat post, preferably the seat post is coupled with a connecting means fixed to the body, for example, a wire or a rope. This can prevent the battery, together with the seat post from being stolen. More preferably, the connecting means in its full length should extend within the body frame. Owing to this, an access to the connecting means can be made available without spoiling the exterior appearance.

In the present invention, by appropriately setting a physical relationship of the bracket member relative to the bracket retainer (for example, by appropriately setting the tilting angles of the attaching surfaces of the bracket retainer and the bracket member, respectively, in response to the angle of the body frame in the longitudinal direction), the battery can be detachably fixed to the body frame in an approximately horizontal state in the longitudinal direction of the battery. Owing to this, the system can utilize the space for attaching and detaching operation in the horizontal direction. This can allow the battery bracket to be placed as close as possible to the saddle, and the degree of freedom for adjusting the height of the saddle can thereby be extended.

For example, the battery may comprise one or more electric cells enclosed by a housing. The bracket member defines a box-shaped support section with one end face open and it may be designed such that when the housing is inserted from said one end face, only a portion of said housing can be accommodated in the inside of said box-shaped support section. In this way, since the battery can be simply inserted from the open end face and it can be installed without inserting the entire housing into the inside of the bracket member, this may facilitate the attaching and detaching operation of the battery.

Preferably, the bracket member further comprises an extension plate section that extends from the support section for supporting the battery, and the housing has a slot, whereby when the battery is accommodated in the bracket member, the extension plate section can be accommodated in the slot. This can enhance the stability and mounting strength of the battery housing, when it is accommodated. For example, the slot may be defined by a pair of normal walls extending outward from an outer wall of the housing substantially in parallel with each other, along with a pair of horizontal walls extending from peak portions of respective normal walls so as to approach to each other.

Preferably, the battery support section of the bracket member may comprise a first support section having the extension plate and a second support section for supporting said battery from a side opposite to said extension plate, which are combined to form the entire battery support section. By this arrangement, it can be adapted to many shapes of battery terminals. Preferably, the second support section is made of resin and equipped with a terminal to be connected with the terminal of the battery.

Preferably, the bracket retainer may be a band having a halving portion. This band can independently clamp the body frame. By fastening the band so that both ends of the halving portion can approach each other, said bracket retainer is fixed to the body frame and thereby the battery bracket can be mounted to the body frame easily. In this case, the bracket retainer preferably has a mounting section for coupling the bracket member with the band in a location opposite to the halving portion.

In another embodiment, the bracket member and the bracket retainer have mounting faces, respectively, which face each other as in a state where the battery bracket has been fixed to the body frame. The mounting holes are respectively formed in said mounting faces, through which the fasteners are inserted. In this point, curved sections that follow the contour of the body frame are respectively formed in the bracket member and the bracket retainer, so that the body frame may be clamped in the space defined by said curved sections. In this embodiment, the bracket retainer may be formed as a rigid band having the curved section and the mounting section.

Preferably, the bracket retainer includes a guard for covering at least a part of the circumference of one end portion of the fastener protruding from the mounting hole. This may help prevent the one end portion of the fastener protruding from the mounting hole of the bracket retainer from being loosened and thus stolen. Further, preferably the other end portion of the fastener is positioned in the inside of the bracket and covered by the accommodated battery. This can make it impossible for a third person having no key to loosen the other end portion of the fastener.

As for the configuration of a key device, the key device may be configured such that an engaging section extended from the key device or the like can be engagingly locked, when the key is turned. Alternatively, in another embodiment, the battery and the bracket member have parts, to be brought into engagement to each other, in which the key device may be configured so as to allow the engaging parts to be secured.

Further, in a preferred embodiment of the present invention, a one-way clutch means is disposed in a transmission path of the electromotive power from the electromotive power output unit box to the primary sprocket, which is constructed and disposed so as to transmit the torque in the direction from said electromotive power output unit box to said primary sprocket but not to transmit the torque in the inverse direction. With the aid of the one-way clutch means, since when the electromotive power output unit box is not used to drive, the pedal effort will not be transmitted to the electromotive power output unit box, and therefore it can be avoided that the load on said electromotive power output unit box is transmitted to the primary sprocket, thereby constantly enabling a minimum of effort by the rider of the bicycle. The location in which the one-way clutch means is to be installed may include, for example, a space between the electromotive power output unit box and the power sprocket. In that case, the secondary sprocket may be fixed to the primary sprocket so that they can rotate integrally and coaxially with each other. Further, if the primary sprocket and the secondary sprocket are coupled to, for example, the shaft for transmitting the pedal effort, the one-way clutch means may be interposed between the secondary sprocket and this shaft.

Preferably, a single chip control circuit of 16 bits at minimum and an electric motor are disposed in the inside of the electromotive power output unit box. The single chip control circuit provides a whole control of the electronic processing for the electromotive power assisted bicycle, as well as a software control by means of a pulse width modulation method for the electric motor based on at least the pedal effort that has been detected.

Since the single chip control circuit of 16 bits at minimum has a high level of processing function, those functions inherent to a dedicated IC according to the prior art can be added to said single chip without applying a heavy load thereto, thus achieving a compact and simplified system for the electromotive power assisted bicycle. In addition, it allows for not only flexibility in implementing functional modifications in the future but also the ability to select any suitable software for bicycles of many different frames and to add any additional functions. Further, in the pulse width modulated control to the electric motor, since the control is always monitored by the software, the electric motor can be suspended immediately under any circumstances.

BRIEF DESCRIPTION OF THE DRAWINGS

Other purposes and advantages of the present invention will be understood in detail by reading the detailed description of preferred embodiments of the present invention with reference to the attached drawings, in which:

FIG. 6 is a top plan view and a side elevation view of a unit mounting bracket according to a first embodiment of the present invention for installing an electromotive power output unit box to a body frame which may be used in an electromotive power assisted bicycle according to an embodiment of the present invention.

FIG. 7 is a general perspective view illustrating a procedure for installing the unit mounting bracket shown in FIG. 6 to the body frame, wherein (a) shows a state where the bracket is initially aligned with a drive shaft receiving hole, and (b) shows a state shifted from the state (a) where the drive shaft, a crank shaft and the electromotive power output unit box have all been assembled.

FIG. 8 is a general perspective view showing a state where the unit mounting bracket has been installed in an upright position to a different type of body frame, wherein (a) shows the installation without a cover and (b) shows the installation with the cover.

FIG. 9 is a top plan view and a side elevation view of an NS polarized ring magnet serving as one component of a rotational speed sensor to be assembled in an electromotive power assisted bicycle of the present invention.

FIG. 10 is a front elevation view showing the rotational speed sensor that has been built up by mounting the NS polarized ring magnet of FIG. 9 onto a surface of a gear as well as a side elevation view taken along the normal line of said rotational speed sensor.

FIG. 12 is a waveform representing a temporal variation of a magnetic field signal detected by a Hall IC disposed adjacent to the NS polarized ring magnet.

FIG. 16 is a diagram showing an example of an anti-rotation means for inhibiting the relative rotation of the pawl with respect to the drive shaft, wherein (a) is a top plan view of general configuration of a ball spline, (b) of a spline key and (c) of a key slot, respectively.

FIG. 22 is a top plan view, a front elevation view and a side elevation view of a bracket retainer constituent of a battery bracket.

FIG. 23 is a diagram relating to a fixation of a battery bracket and a battery, wherein (a) is a side elevation view of a state where the battery bracket has been fixed to the seat post and the battery is ready to be inserted, (b) is a schematic front elevation view showing a slot of the battery and (c) is a bottom plan view showing the state where the battery is ready to be inserted shown in (a).

FIG. 24 is a side elevation view showing a sequence of states for accommodating the battery in the battery bracket, wherein (a) shows a state where the battery is being inserted, and (b) shows a state where the battery has been completely mounted.

FIG. 25 is a front elevation view of a drive unit serving as a gear box according to one embodiment of the present invention, wherein (a) shows the drive unit viewed from the output shaft 35a side (front side), and (b) shows the drive unit viewed from the opposite side (reverse side) thereof.

FIG. 27 is an exploded perspective view of a unit mounting bracket according to a fourth embodiment of the present invention, wherein (a) shows the unit mounting bracket before being mounted to a body of a bicycle, (b) shows a state when the unit mounting bracket is mounted to the body of the bicycle and (c) shows the unit mounting bracket that is mounted to the body of the bicycle and an electromotive power output unit box to be mounted to said unit mounting bracket.

FIG. 29 is a diagram showing a part necessary for mounting the unit mounting bracket according to the fourth embodiment onto a body frame, wherein (a) represents a front elevation view (upper) and a side elevation view (lower) of a fitting for mounting the box, (b) represents a front elevation view (right) and a side elevation view (center) of a frame mounting band, a front elevation view (upper left) of a head portion of said band, a front elevation view (upper left) of a reverse side of the head portion of said band and a side elevation view (lower) of a finalized shape thereof.

FIG. 30 is a perspective view showing a state where the battery bracket according to the second embodiment is to be mounted to the seat post, wherein (a) is an exploded perspective view showing related components before assembly and (b) is a perspective view of a state where the battery is inserted after said battery bracket has been mounted.

FIG. 31 is a top plan view (upper right), a side elevation view (upper left) and a front elevation view (lower left) of the battery bracket according to the second embodiment.

FIG. 35 is a schematic view of a force combining mechanism in an electromotive power assisted bicycle according to a prior art.

DESCRIPTION OF THE PREFERRED EMBODIMENTS

Preferred embodiments of the present invention will now be described with reference to the attached drawings.

Figure 1:
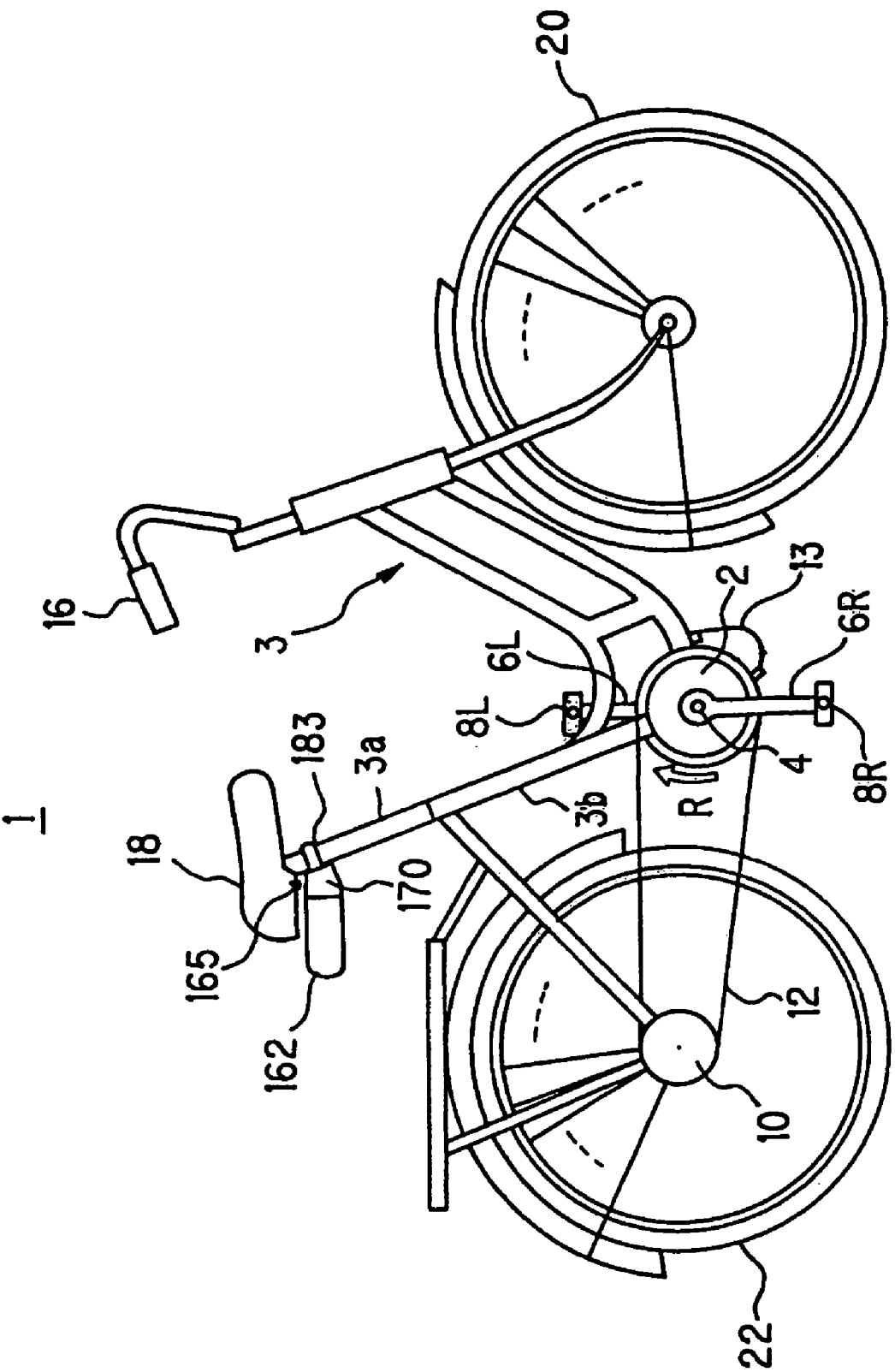
FIG. 1 is a schematic diagram showing an electromotive power assisted bicycle according to the present invention.

FIG. 1 shows a general configuration of an electromotive power assisted bicycle 1 according to a first embodiment of the present invention. As shown in FIG. 1, a main frame structure of this electromotive power assisted bicycle 1 comprises, similarly to an ordinary bicycle, a body frame 3 made of metal pipe, and to said body frame 3 are mounted a front wheel 20, a rear wheel 33, a handle 16, a saddle 18 and so on in a known manner.

Specifically, the saddle 18 is fixed to one end of a seat post 3a, while the other end of said seat post 3a is fixed as accommodated in a seat tube 3b thereto by a fixing means, which is not shown. A height of the saddle 18 can be adjusted by loosening said fixing means. Further, a battery 162 is mounted to the body at a location of the seat post 3a close to the saddle 18 by using a battery bracket 165 fixed to the seat post 3a. It is to be noted that the battery 162 comprises one or more electric cell(s) 17 (FIG. 2) housed inside a rectangular housing, as will be described later. Further detailed configuration of the battery bracket 165 will be described later.

Further, a drive shaft 4 is rotatably supported in a lower central portion of the body frame 3, and a left and a right end of the drive shaft 4 are fitted with pedals 8L, 8R via crank bars 6L, 6R. This drive shaft 4 is coaxially fitted with a primary sprocket 2 via a one-way clutch (see FIG. 4(b), 99, which will be described later) for transmitting the revolution exclusively in the R direction corresponding to the forward driving direction of the body. An endless chain 12 is stretched across between this primary sprocket 2 and a rear wheel power mechanism 10 is disposed in a central location of the rear wheel 22.

Figure 2:
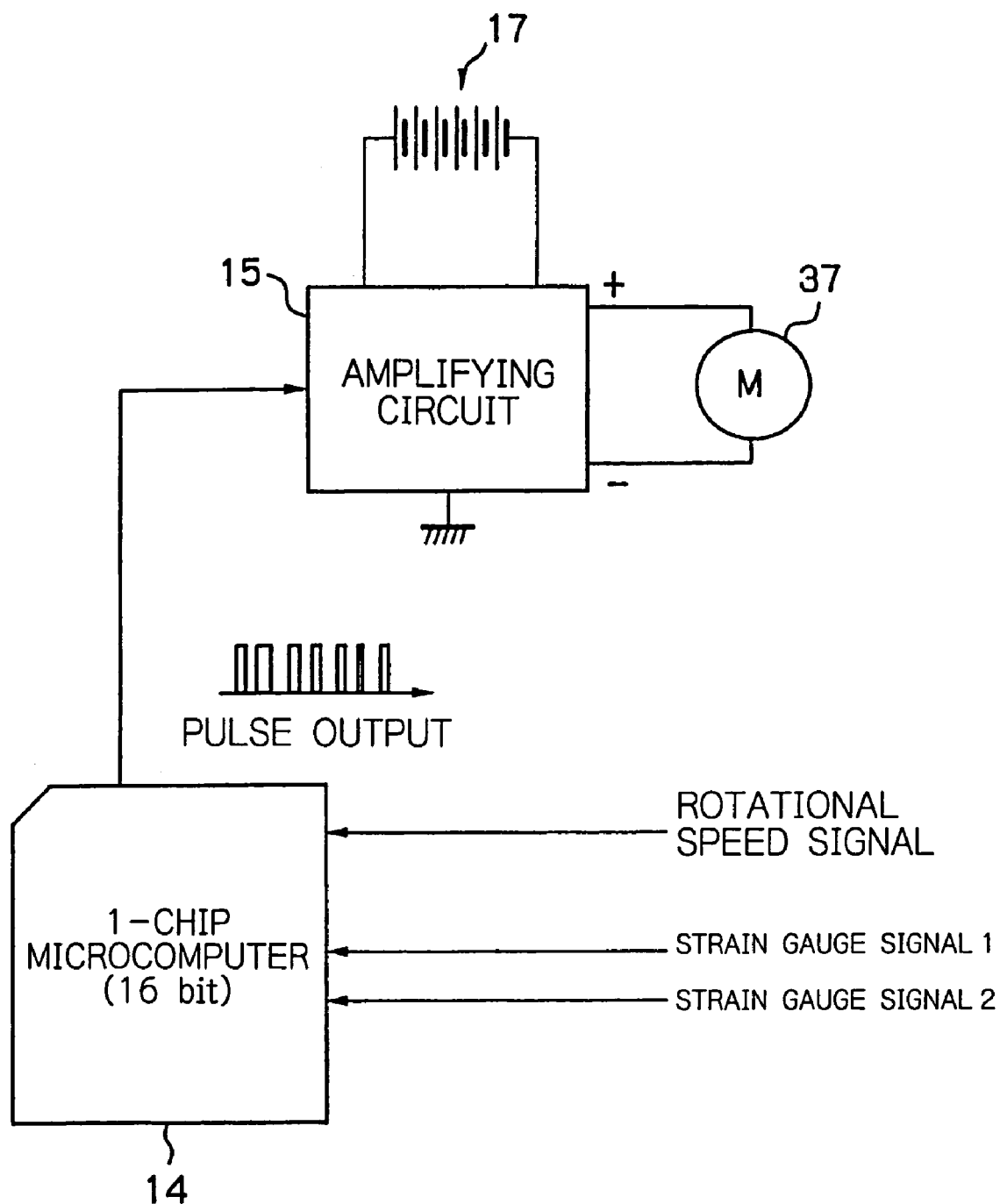
FIG. 2 is a schematic diagram showing a control system of an electromotive power assisted bicycle according to the present invention.

The electromotive power assisted bicycle 1 of the illustrated embodiment provides a control for assisting the pedal effort at an assist ratio (assisting power/pedal effort) that is determined from at least a bicycle running speed and the pedal effort. FIG. 2 shows a general view of a control system of the electromotive power assisted bicycle 1 for executing this control. The control system of the electromotive power assisted bicycle 1 according to the present embodiment comprises a single 16-bit 1-chip microcomputer 14 that provides a whole control of the electronic processing of the entire bicycle, a PWM controllable electric motor 37, an amplifying circuit 15 connected directly to the 1-chip microcomputer 14 for amplifying electric power of a control signal therefrom, and an electric cell 17 connected to the amplifying circuit 15 for supplying the electric power to the electric motor 37.

The 1-chip microcomputer 14 receives as input signals at least a revolving speed signal for calculating a running speed and strain gauge signals 1 and 2 used for calculating the pedal effort. Means for generating those input signals will be described later. The 1-chip microcomputer 14 calculates the running speed and the pedal effort from those input signals and executes the electronic processing for determining the assist ratio based on a predetermined algorithm. Subsequently, the 1-chip microcomputer 14 sequentially outputs pulse signals that have been modulated such that the pulse widths correspond to the assisting power to provide an instruction to the electric motor 37 to generate the assisting power in association with the determined assist ratio. It is to be noted that the amplifying circuit 15 is equipped with not only the electric power amplifying function for the pulse signals but also a function as a buffer for the pulse signals.

Since in the 1-chip microcomputer 14, 1 unit of data or 1 unit of command is composed of 16 bits, the 1-chip microcomputer 14 is able to execute such a program having a higher level of processing function at a higher speed based on a larger scale of data volume as compared with an 8-bit microcomputer that has been typically used in the prior art electromotive power assisted bicycle. In this connection, in the present embodiment, the dedicated PWM control IC has been omitted, but the above-described electronic processing is performed in a whole processing by the 1-chip microcomputer 14, while at the same time, the above-mentioned PWM control is applied to the electric motor 37 directly. This PWM control may be realized by software (including firmware) stored in a memory, which is not shown, of the 1-chip microcomputer 14.

Thus, the present embodiment allows for a single microcomputer, by using the 16-bit microcomputer with high processing capacity, to perform all the control tasks including, for example, the PWM control that has been performed by using the dedicated IC in the prior art, yet without modifying a basic design by any significant degree. Consequently, the number of parts and an area of substrate can be reduced as a whole, and this contributes to the total cost reduction as well as the miniaturization of the system. For example, it is true that 16-bit microcomputer is more expensive than the 8-bit microcomputer, but if the PWM control dedicated IC, an IC for executing other electronic processing such as monitoring of a remaining amount of a electric cell and their peripherals are combined with the 8-bit microcomputer as an additional functional means, the system of the 8-bit microcomputer would lead to a higher cost than the 16-bit microcomputer.

In addition, since the 16-bit microcomputer is affordable to execute a variety of processing with its software without trouble, and thereby a circuit can be made simple and even a future enhancement in its function may be feasible in a similarly flexible way, also from this point of view, cost reduction can be possible. Further, since the electromotive power assisting condition can always be monitored by the software, the electric motor 37 can be suspended immediately in any circumstances.

[Force Combining Mechanism and Assisting Power Mechanism]

Figure 4:
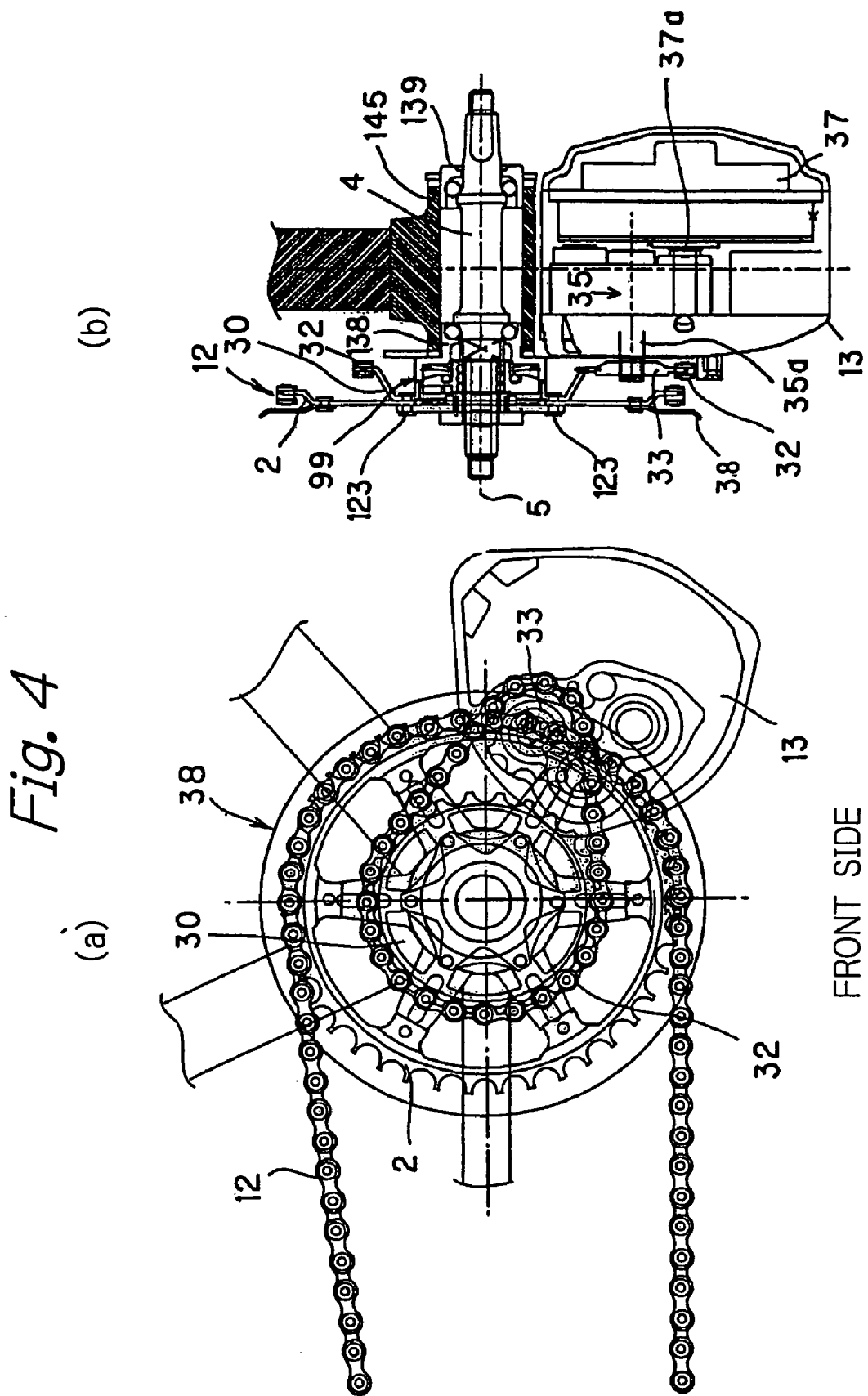
FIG. 4 is a diagram showing a force combining mechanism of an electromotive power assisted bicycle of the present invention, wherein (a) is an enlarged front elevation view thereof viewed from the front side of a primary sprocket and (b) is a cross sectional view thereof.
Figure 5:
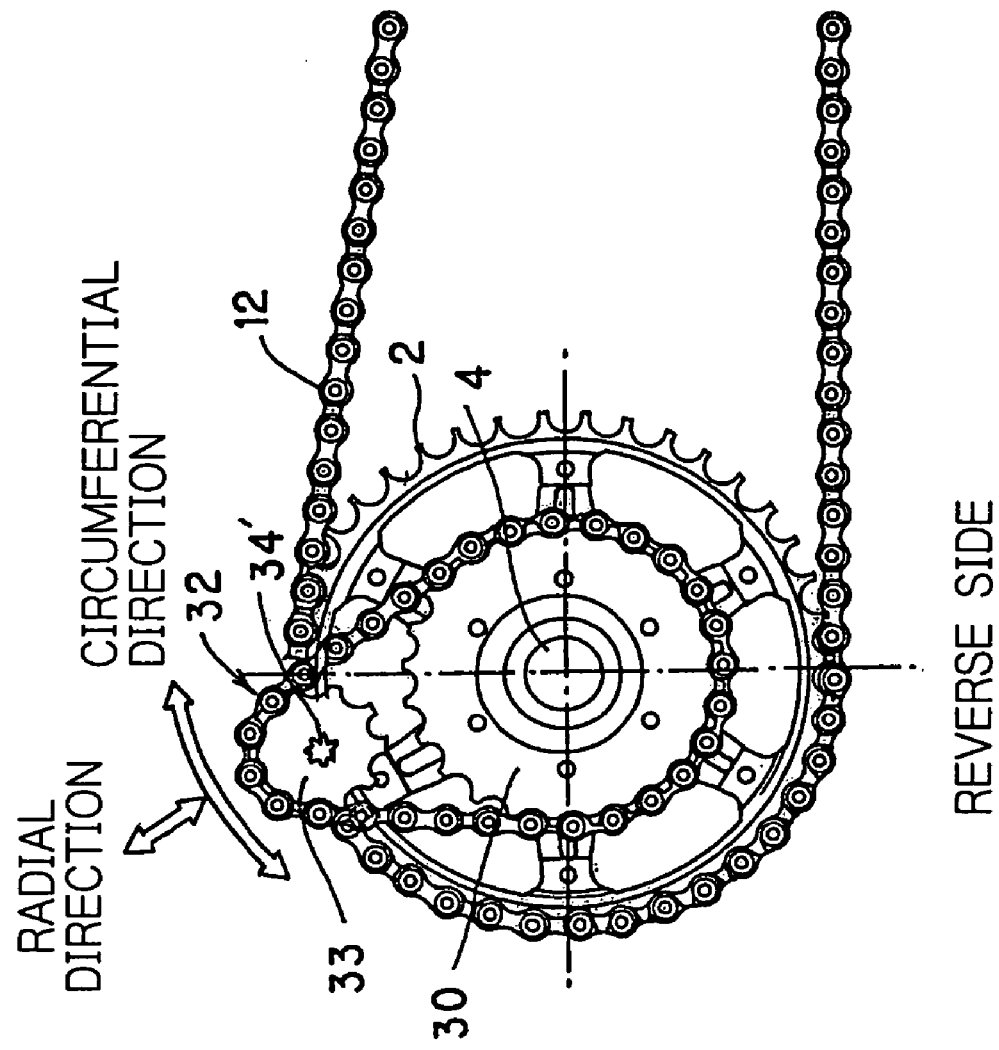
FIG. 5 is an enlarged front elevation view viewed from a reverse side of a primary sprocket for illustrating a force combining mechanism by a double chain system of an electromotive power assisted bicycle according to another embodiment of the present invention.

A force combining mechanism for combining an assisting power and a pedal effort, and a supply mechanism for supplying the assisting power in the electromotive power assisted bicycle 1 will now be described with reference to FIGS. 3 through 5.

Figure 3:
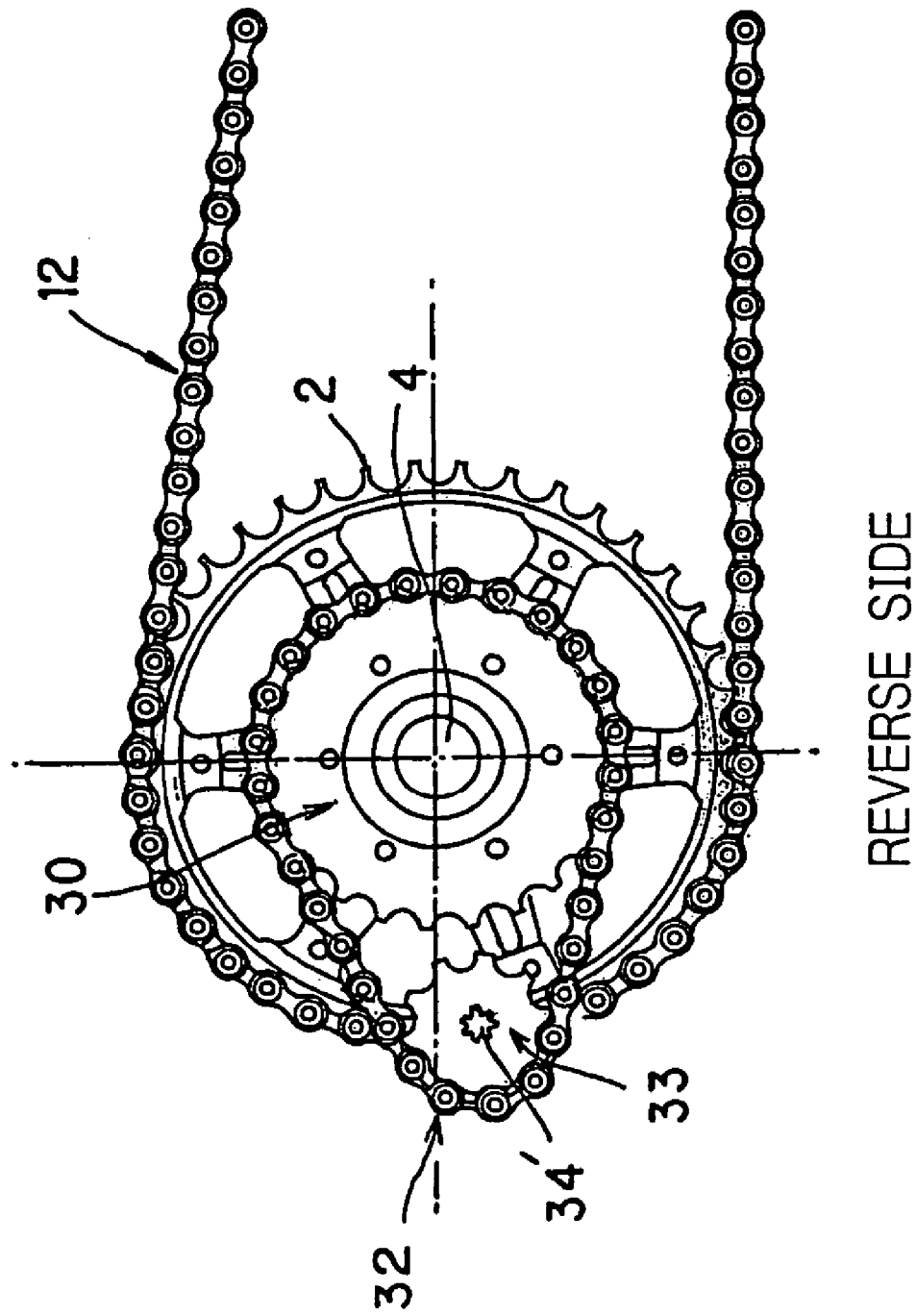
FIG. 3 is an enlarged front elevation view viewed from a reverse side of a primary sprocket for illustrating a force combining mechanism by a double chain system of an electromotive power assisted bicycle according to one embodiment of the present invention.

FIG. 3 shows an example of the force combining mechanism when the primary sprocket 2 is viewed from the reverse side thereof (the opposite side of FIG. 1). This force combining mechanism comprises a secondary sprocket 30 supported coaxially with the primary sprocket 2, a power sprocket 33 capable of being rotated by an assisting power to be output under a predetermined condition, and an auxiliary chain 32 of endless rotation, which has been stretched between the power sprocket 33 and the secondary sprocket 30 to transmit the assisting power from said power sprocket 33 to said secondary sprocket 30. The power sprocket 33 and the secondary sprocket 30 are equipped with teeth arranged in the same pitch, wherein preferably the number of teeth of the power sprocket 33 is smaller than that of the secondary sprocket 30.

Since the force combining mechanism of FIG. 3 is disposed in the inner side of the body with respect to the primary sprocket 2, the secondary sprocket 30 and the power sprocket 33 do not protrude outwardly from the body, thus allowing the body to be made compact. Further, as illustrated, since a distance between the primary sprocket 2 and the power sprocket 33 can be made smaller than a radius of the primary sprocket 2, the entire force combining mechanism can be integrally formed in a low-profile unit. Owing to this, as shown in FIG. 4(a), if seen from the outside of the bicycle (i.e., from the front side), the force combining mechanism, in its majority portion, is hidden in the axially inner side of the primary sprocket 2, so the exterior appearance is not spoiled. Installing a chain cover 38 over the primary sprocket 2 so as to hide the chain 12 provides protection for the chain as well as further improvement in the exterior appearance.

FIG. 4(b) shows a cross sectional view of FIG. 4(a) taken along a vertical line passing through the center of the primary sprocket 2. As illustrated in FIG. 4(b), the primary sprocket 2 and the secondary sprocket 32 are fixed by pins 123 so that they do not move separately from each other (i.e., they rotate as one unit), and they are both coupled to a drive shaft 4 via a one-way clutch 99. The power sprocket 33 is operatively coupled to an electromotive power output unit box 13 via a power shaft 35a extending in parallel with the drive shaft 4. By forming a serration (see FIG. 3) in a center hole 34 of the power sprocket 33, a slipping rotation between the power shaft 35a and the center hole 34 can be prohibited.

The electromotive power output unit box 13 is mounted to a frame similar to that of a typical bicycle, and its housing contains an electric motor 37 that is supplied with electric power from the battery (FIG. 2) and a reduction gear mechanism 35 coupled to an output shaft 37a of said motor 37 for reducing a revolving speed of the motor and transmitting it to the power shaft 35a of the power sprocket 33. A so-called one-way clutch (not shown) for transmitting the power only in one direction is provided in the course of the transmission path of the assisting power in the reduction gear mechanism 35. This one-way clutch is configured and connected so that it can transmit the assisting power from the electric motor 37 to the power sprocket 33 but not transmit a torque in the inverse direction, or from the power sprocket 33 to the reduction gear mechanism 35.

An operation of the force combining mechanism according to the present embodiment will now be described.

When the electric motor 37 is controlled to rotate under a predetermined condition and the assisting power from the electric motor 37 is provided to the power sprocket 33 via the reduction gear mechanism 35, the torque of the power sprocket is transmitted to the secondary sprocket 30 via the auxiliary chain 32, and in turn is immediately transmitted to the main sprocket 2 that has been fixed to said secondary sprocket 30 and designed to be rotated by the pedal effort. Thus, the combining of the assisting power and the pedal effort can be achieved.

When the electric motor 37 is not driven to revolve, a load necessary for revolving the motor 37 is prevented from being transmitted to the power sprocket 33 by said one-way clutch, which is not shown, disposed within the reduction gear mechanism 35, thereby allowing the light driving of the bicycle.

Thus, the present embodiment employs a so-called double chain system, in which, differently from the prior art system, the assisting power is not directly transmitted to a chain 12 serving for transmitting the pedal effort, but the assisting torque from the power sprocket 33 is transmitted via a separate chain 32 to the secondary sprocket 30 rotating along with the primary sprocket 2. Owing to this configuration, the degree of freedom for installing the electromotive power output unit box 13 can be extended broadly as compared to the prior art. For example, as shown in FIGS. 3 and 4(a), since the electromotive power output unit box 13 can be placed toward the front of the bicycle, the electromotive power output unit box 13 is allowed to be installed in an ordinary bicycle frame; not only in a dedicated frame that has been specially tailored for the electromotive power assisted bicycle.

It is a matter of course that the power sprocket 33 may be positioned in any location along a circumferential direction of the secondary sprocket 30. FIG. 5 shows an example where the position of the power sprocket 33 has been offset by about 90 degrees clockwise in the circumferential direction. In that case, the electromotive power output unit box 13 can be mounted to a support frame of a saddle 18 (FIG. 1). Further, in accordance with a selected length of the auxiliary chain 32, the position of the power sprocket 33 in the radial direction (i.e., a distance from the center of the primary sprocket 2 to the center of the power sprocket 33) can be modified as desired to be further outer side or further inner side. Thus, a minimum ground clearance of the electromotive power output unit box 13 can be made larger or smaller.

In this way, since the double chain system provides great flexibility in installation, any bicycle can be equipped with the electrical power system without restriction. In other words, the degree of freedom in designing can be increased greatly.

In addition, if the number of teeth of the power sprocket 33 is selected to be smaller than that of the secondary sprocket 30 as illustrated, then the force combining mechanism can independently provide a speed reduction system. Owing to this, the reduction ratio of the reduction gear mechanism 35 can be made small, and consequently the reduction gear mechanism can be made simple and small. Thus, in this embodiment, the degree of freedom for the reduction ratio can also be extended.

[First Embodiment of the Unit Mounting Bracket]

According to an embodiment of the present invention, a unit mounting bracket is employed to install the electromotive power output unit box 13 onto the body frame 3.

FIG. 6 shows a first embodiment of a unit mounting bracket 70. The unit mounting bracket 70 is made up of a bottom plate 71, and a pair of side plates 72R, 72L originating from a pair of side edges 81R, 81L defining opposite sides of said bottom plate 71 and extending in parallel with each other approximately in a vertical direction. The pair of side plates 72R, 72L are provided with side holes 84R, 84L through which the drive shaft 4 (see FIG. 14) is to pass.

The bottom plate 71 has a main plate segment 71a both of whose lateral edges are defined by a pair of side edges 81R, 81L and an extension segment 73 extended from a front edge 81F, different from said side edges, of said main plate segment. A periphery of the main plate segment 71a is defined by the side edges 81R, 81L, the front edge 81F and a rear edge 81B, and it forms an approximately rectangular shape. The extension segment 73 is formed into a tapered shape so that the width thereof is gradually narrowed to a halfway point relative to a distance from the main plate segment 71a and it is formed to have the same width after the halfway point. The main plate segment 71a and the extension segment 73 are provided with mounting holes 74, 75, respectively, through which the mounting bolt of the electromotive power output unit box is to pass. Further, the main plate segment 71a may be provided with openings 78R, 78L for inserting thereinto protrusions of the electromotive power output unit box 13, which is not shown, and thereby securing the electromotive power output unit box 13 so it cannot be moved.

Further, a rib 76 is formed in the main plate segment 71a, which rises up from one surface of the bottom plate (defined by the surface from which the side plates are extending in the illustrated example) and which is concave in the opposite surface. The rib 76 extends linearly and substantially across the full width of the bottom plate 71 between the pair of side plates 72R, 72L. Preferably, the extended axial line along the length of the rib 76 may intersect with the pair of side plates 72R, 72L at an approximate right angle.

Further, the bottom plate 71 has, in its rear edge 81B, a folded segment 79 that is folded approximately at a right angle with respect to the plane defined by said bottom plate 71. Further, a pair of corner-rib segments 77R, 77L is formed in a region where each of the pair of side plates 72R, 72L intersects with the bottom plate 71, in a form depressed inwardly toward the bracket so as to connect said side plate and said bottom plate.

The rib 76, the folded segment 79 and the pair of corner-rib segments 77R, 77L may help reinforce the unit mounting bracket 70 significantly, so as to prevent the bottom plate 71 and the connections between the bottom plate and the side plates from being deflected or deformed easily, which may otherwise occur due to the counteraction of the electromotive power output unit box 13 installed thereon when it generates electromotive power.

Each of the pair of side plates 72R, 72L is made up of a partial circular segment 72C having an outer circumference formed into a partial circle and an upright segment 72M for continuously connecting said circular segment to the bottom plate 71. The side holes 84R, 84L are formed, respectively, in the central portions of the circular segments 72C.

A plurality of slit holes 80a, 80b, 80c and 80d are formed in the pair of side plates for mounting separate members. To improve convenience in a mounting operation, notches may be provided in those slit holes as illustrated. The separate members may include, for example, a cover for the primary sprocket 2, the chain 12, the auxiliary chain 32 and so on.

Now, a method for installing the electromotive power output unit box 13 by using said unit mounting bracket 70 will be described with reference to FIG. 7.

FIG. 7(a) shows a state where the unit mounting bracket 70 is placed on a support section 145, prior to the drive shaft 4 being actually fitted to the body. The support section 145

(see FIG. 4(b)) is located in a lower portion of the body frame 3 and has a shaft hole 90 for receiving the drive shaft 4 so that the drive shaft 4 may be supported therein via bearings (i.e., the bearings 138, 139 of FIG. 4(b), which will be described later).

First of all, as shown in FIG. 7(a), the side holes 84L, 84R are aligned with the shaft hole 90 with the support section 145 sandwiched between the pair of side plates 72R, 72L.

Subsequently, as shown in FIG. 7(b), the drive shaft 4 is inserted through the shaft hole 90 and the side holes 84L, 84R, and then pedals 8L and 8R are mounted to a left and a right end of the drive shaft 4 (precisely, a pedal shaft 146 of FIG. 10) via crank bars 6L, 6R, respectively. At this time, the pair of side plates 72R, 72L is clamped from the left and the right ends, and thus it is secured fixedly to the support section 145. In actual practice, they are initially clamped in a condition where they are not completely fixed (i.e., in a half-fixed condition), or in a condition where the unit mounting bracket 70 is allowed to be rotated clockwise and counterclockwise (directions of M in the drawing) exclusively when a force is applied thereto. Then, they rest in a condition where the extension segment 73 is tilted by some ten degrees counterclockwise from the final mounting position thereof to facilitate the fitting operation of the bolt.

Subsequently, the bolts 85 are inserted into the mounting holes 74 and 75 of the bottom plate 71 and screwed in the corresponding threaded holes formed in the electromotive output unit box 13, which is not shown, so as to be engaged therewith completely. Then, the unit mounting bracket 70 together with the electromotive power output unit box 13 mounted thereto is rotated clockwise to its actual mounting position indicated in FIG. 7(b).

In the next step, the pair of side plates 72R, 72L is completely fastened from the left and the right ends to be fixedly secured. Preferably, a mounting unit 87 fixed to the body frame 3 via a band 86 and a protrusion 88 of the frame electromotive power output unit box 13 are fixedly coupled. In this way, providing at least one additional point for fixation in another location may enable further the fixation of the electromotive power output unit box 13.

As described above, the unit mounting bracket of the present embodiment enables the easy mounting of the electromotive power output unit box 13 without applying any additional processing to a frame of an ordinary bicycle. However, once mounted, it may be impossible to remove the electromotive power output unit box 13 by loosening the bolt 85 shown in FIG. 7(b) because the frame 3 is located above the head of the bolt 85. Further, an ordinary tool can not loosen the fastening of the bracket 70, and so removing the electromotive power output unit box and remodeling the body may not be realized so easily.

Further, in the present embodiment, since the bracket 70 may be rotated around the side hole 84, the proper mounting position of the unit can be determined automatically without adjusting the mounting position. This means that if the requirement for positioning is strict in the above-described force combining mechanism by the double-chain system, the mounting operation provided by the bracket 70 will be particularly effective.

Furthermore, the bracket 70 of the present embodiment allows the electromotive power output unit box 13 to be installed in a flexible manner to broadly different frames. In this connection, FIG. 8(a) shows an example of the electromotive power output unit box 13 that has been installed in the upright state. In FIG. 8(a), the protrusion 88 is fixed to the vertically extending frame.

FIG. 8(b) shows an example according to another configuration of installation. In this example, the electromotive power output unit box 13 is installed with the bracket 70 such that the unit 13 may be located between an upper and lower frames coupled to the handle shaft, and the mounting unit 87 connected to the support frame of the saddle via a fastener such as a band 86 or the like, and the protrusion 88 of the electromotive power output unit box 13 are fixedly coupled. Then, the space between the upper and the lower frames and the entire lower portion of the saddle support frame are covered with a cover 91 to provide an improved exterior appearance as well as protection for machines. At this time, the cover 91 may be provided with a hole 92 so as to allow the electromotive power output unit box 13 to be protruded partially from said hole, and in that case, the electromotive power output unit box 13 itself may be an accent to improve the exterior appearance.

[Second Embodiment of the Unit Mounting Bracket]

Figure 17:
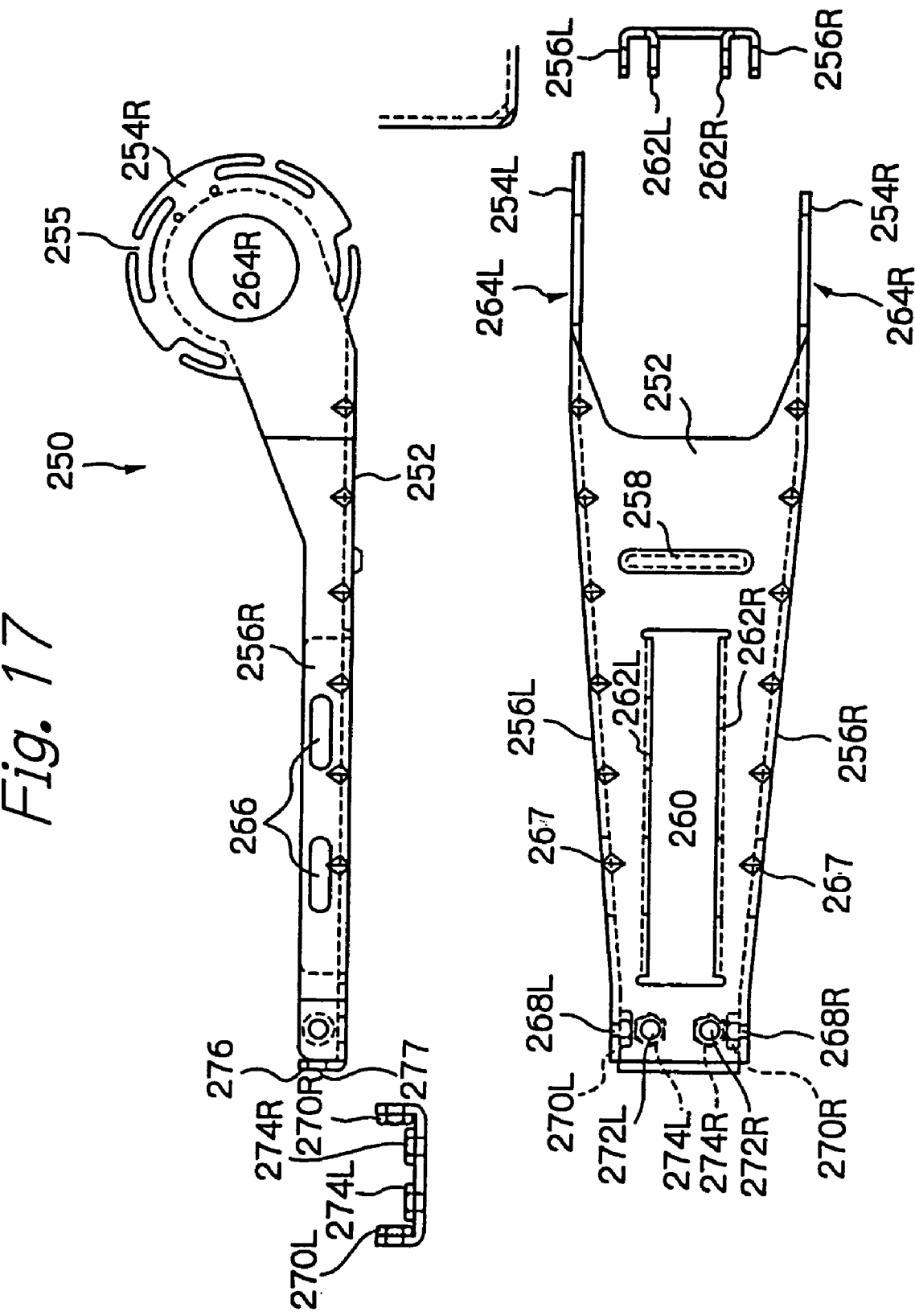
FIG. 17 is a top plan view and a side elevation view of a unit mounting bracket according to a second embodiment.

FIG. 17 shows a unit mounting bracket 250 according to a second embodiment adaptable to a bicycle with a diamond-shaped frame such as a mountain bike. The unit mounting bracket 250 is made up mainly of a bottom plate 252, a pair of side plates 254R, 254L extending from the bottom plate 252 diagonally, and an end plate 276 bent substantially at a right angle from said bottom plate at an end thereof. The pair of side plates 254R, 254L comprises a pair of partial circular segments, each having a periphery formed into a part of circle, and a pair of side extension segments 256R, 256L extending from said bottom plate 252 approximately in a vertical direction along a length of the bottom plate as the extension segment for said partial circular segments, wherein said circular segments are each provided in their central areas with side holes 264R, 264L through which the drive shaft 4 (see FIG. 14) is to pass. It is to be noted that a plurality of slit holes 255 may be formed in said circular segment to attach a separate member. Further, one or more (two in the illustrated example) of side guiding elongated holes 266 are also formed in the side extension segments 256R, 256L.

The bottom plate 252 is provided with a bottom guiding elongated hole 260 which serves as a guide means for the electromotive power output unit box 13, as will be described later. A pair of guide wall segments 262R, 262L is formed along a pair of opposite long edges of the bottom guiding elongated hole 260 such that said guide wall segments are bent substantially at a right angle from the bottom plate so as to extend in the same direction as the side plates 254R, 254L. The guide wall segments 262R, 262L are useful both for reinforcing the unit mounting bracket 250 and for guiding the electromotive power output unit box 13, and guiding elongated holes, which are not shown, are formed corresponding to the side guiding elongated holes 266 in parallel therewith. The guiding elongated holes of the pair of guiding wall segments 262R, 262L are provided such that each of them is formed at the same height from the bottom plate and in the same location in the longitudinal direction and has the same width as the side guiding elongated hole 266.

A rib 258 is formed in the bottom plate 252 so that the rib 258 is concaved from one surface of the bottom plate 252 (from which the side plate extends in the illustrated example) and is raised in the opposite surface thereof. The rib 258 extends linearly and across substantially the full width of the bottom plate 252 between the pair of side plates 254R, 254L. Preferably, the extended axial line along the length of the rib 258 may intersect with the pair of side plates at about a right angle. Further, a plurality (six in each of the left and the right in the illustrated example) of corner-rib segments 267 is formed for providing additional reinforcement in a region where each of the pair of side extension segments 256R, 256L intersects with the bottom plate 252, in a form depressed inward the bracket so as to connect said side extension segment and said bottom plate.

The rib 258, the corner-rib segments 267 and the end plate 276 may reinforce the unit mounting bracket 250 significantly so as to prevent the bottom plate 252 and the connections between the bottom plate and the side plates from being deflected or deformed easily, which may otherwise occur due to the counteraction of the electromotive power output unit box 13 installed thereon when it generates the electromotive power.

Further, two through holes 272R, 272L are formed in the bottom plate 252 in the vicinity of the end plate 276, spaced from each other with the longitudinal center axis line of the bottom plate placed therebetween. Two nuts 274R, 274L are fixedly coupled to the bottom plate 252 with their centerlines in alignment with those of the through holes 272R, 272L, respectively.

Two through holes 268R, 268L are formed in the pair of side plates 254R, 254L in the mounting segment thereof defined in the vicinity of the end plate 276. Two nuts 270R, 270L are fixedly coupled to the side plates 254R, 254L in the mounting segments thereof with their centerlines in alignment with those of the through holes 268R, 268L, respectively.

It is to be noted that a through hole 277 is also formed in the end plate 276.

The state where the electromotive power output unit box 13 has been installed by using the above-mentioned unit mounting bracket 250 will now be described with reference to FIG. 18.

Figure 18:
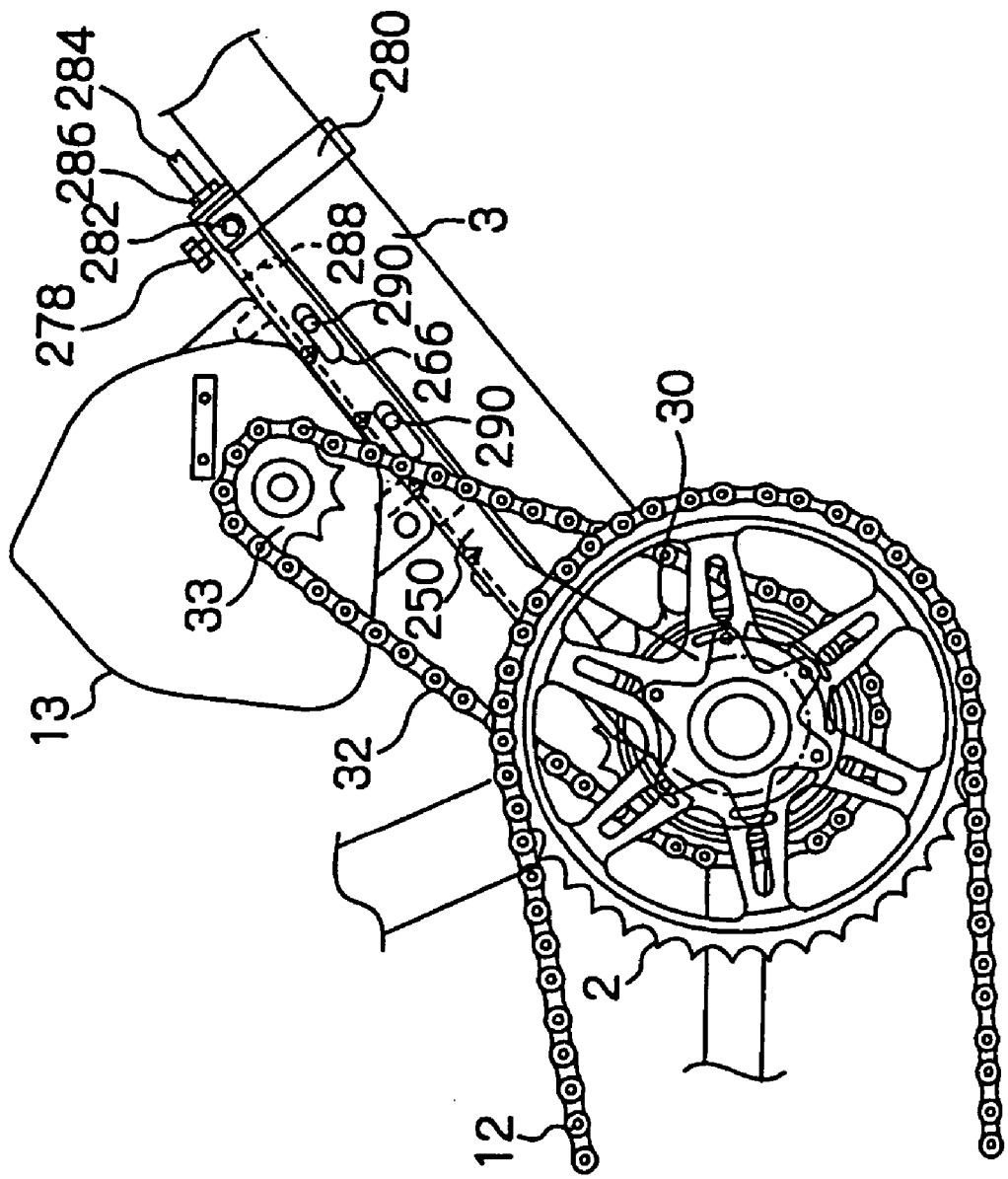
FIG. 18 is a diagram showing a state where an electromotive power output unit box has been mounted to a body frame of an electromotive power assisted bicycle of a double chain system by using the unit mounting bracket according to the second embodiment.

As shown in FIG. 18, similarly to the unit mounting bracket 70 according to the first embodiment, the pair of side plates 254R, 254L is placed to clamp the support section so that the drive shaft penetrates therethrough. At this time, upper ends of the side extension segments 256R, 256L of the unit mounting bracket are applied over the body frame 3 from the upside. A band 280 is wound around the body frame 3, and a pair of mounting holes of the band 280, which are not shown, and the two nuts 270R, 270L fixed to the mounting segments of the side plates 256R, 256L, respectively, are brought into alignment with each other at their centerlines, and then bolts 282 are engaged with these nuts, to thereby tightly clamp the body frame by the band 280. In addition, push screws 278 are respectively engaged with the nuts 274R, 274L fixed to the bottom plate 252 and screwed in until top ends of the push screws 278 begin to apply a pushing force against the body frame.

In this way, since the unit mounting bracket 250 is fixedly secured at both ends, it may be held in an extremely stabilized condition, and additionally, since the two push screws 278 are screwed in at the locations off from the longitudinal center axis line of the bottom plate, the screws can be inter-locked to the frame 3 and thus reliably prevent the slippage of the band with the aid of the leading effect against the deflection of the bracket caused by the reactive force in association with the driving operation of the electromotive power output unit box 13.

A partial fine-adjusting mechanism of the unit mounting bracket 250 will now be described. This partial fine-adjusting mechanism functions as a chain tension adjusting mechanism when used in combination with the double chain force combining mechanism.

The electromotive power output unit box 13 has a raised portion 288 for a guide formed in a mounting face. This guiding raised portion 288 passes through the bottom guiding elongated hole 260 formed in the bottom plate 252. A width of the bottom guiding elongated hole 260 is substantially same as that of the guiding raised portion 288, and a length of the bottom guiding elongated hole 260 is longer than that of the guiding raised portion 288. Accordingly, the electromotive power output unit box 13 is allowed to slide along the longitudinal direction of the unit mounting bracket 250 in the state that an outer surface of the guiding raised portion 288 is substantially in contact with an inner wall of the bottom guiding elongated hole 260.

Further, the raised portion 288 includes in each of its side faces, one or more (two in the illustrated example) of guiding protrusions 290, which are configured and disposed to pass through the side guiding elongated holes 266 and the guiding elongated holes of the pair of guide wall segments 262R, 262L. A diameter of the guiding protrusion 290 is substantially same as the width of the side guiding elongated hole 266, while it is smaller than the length of the side guiding elongated hole 266. Consequently, the electromotive power output unit box 13, in the state where the outer surface of the guiding protrusion 290 is almost in contact with the inner wall of the side guide elongated hole 266, is allowed to slide without any displacement in an up and down direction with respect to the unit mounting bracket 250.

It is preferred for stabilizing the sliding motion of the electromotive power output unit box 13 that a contact area should be provided between the region of the bottom plate defined in the area surrounding the bottom guiding elongated hole 260, and the electromotive power output unit box 13, so that they may come in contact with each other when the raised portion 288 of the electromotive power output unit box 13 is fitted in the bottom guiding elongated hole 260. In this connection, the electromotive power output unit box 13 has a flat plate-like stabilizing area (not shown) formed therein, which is allowed to slidably engage with the flat surface portion of the bottom plate across a part or all of the junction portion of the raised portion 288 and the electromotive power output unit box 13, or namely the surrounding area of the base end of the raised portion 288. Since this stabilizing area is slidably engaged with the bottom plate while stretching outward from the bottom guiding elongated hole 260, it can prevent such a defect that the electromotive power output unit box 13 may fall into the bottom guiding elongated hole 260 as the electromotive power output unit box 13 is slidably moved, while at the same time it functions as a so-called stabilizer that can prevent a swing motion of the electromotive power output unit box 13.

This stabilizing area may be configured in any form as long as it can function as the stabilizer during the sliding motion. For example, it may be configured as a flat surface area formed integrally with the housing of the electromotive power output unit box 13 such that it stretches out from the base end of the raised portion 288. Alternatively, one or more stabilizing areas may be configured, which stretch out from the base end of the raised portion 288, by the attachment of one or more angle members to the electromotive power output unit box 13. Further, said stabilizing area may be formed by a sheet plate that may be interposed between the electromotive power output unit box 13 and a separately arranged raised portion 288. In the case of the unit mounting bracket 250 for the diamond frame as is the case of the present embodiment, the latter sheet plate may be suitable.

It is to be noted that the stabilizing area is not necessarily a flat surface in so far as it can come in slidable contact with the bottom plate 252. For example, if the bottom plate has a sectional view of a curved line, the stabilizing area may also have an adaptively curved contour in its sectional view.

The raised portion 288 may be made up of any desired member that can slidably move within the bottom guiding elongated hole 260. For example, it may be provided by attaching a separate bracket member, such as a member having an inverse U-shape in a sectional view, to the housing of the electromotive power output unit box 13 with a screw or the like, or alternatively it may be formed as a portion integrated with the housing of the electromotive power output unit box 13. Alternatively, the raised portion 288 may be provided in the form of a plurality of legs that are raised exclusively in locations on which the protrusion 290 is to be mounted. The protrusion 290 may be similarly made up of any desired member that can come in slidable contact with the side guiding elongated hole 266. For example, it may be formed as a screw-like member with circular head having a substantially same diameter as the width of the elongated hole 266, which can be screwed into the raised portion 288 through the side guiding elongated hole 266 after the raised portion 288 is inserted through the bottom guiding elongated hole 260. In that case, preferably such a screw as can be screwed by using a hexkey may be used.

Further, a threaded shaft 284 is mounted to the raised portion 288 so as to protrude from the front end thereof. When the electromotive power output unit box 13 is mounted to the bottom plate 252, the threaded shaft 284 extends in the longitudinal direction of the unit mounting bracket 250 and protrudes through the through hole 277 of the end plate 276. This protruding portion of the threaded shaft 284 is fitted with a nut 286, and rotating this nut 286 can provide a partial fine adjustment of the electromotive power output unit box 13 along the longitudinal direction.

As described above, in the unit mounting bracket 250 of the second embodiment, since the position of the electromotive power output unit box 13 can be fine-adjusted in one direction, the installment of the auxiliary chain 32 over the power sprocket 33 and the adjustment thereof may become extremely easy. Further, as to the change in length in association with the aged deterioration of the auxiliary chain 32, the adjustment of stretching of the chain can be provided easily.

Such an advantage that the electromotive power output unit box can be mounted in a flexible manner to the frame of an ordinary bicycle, especially to a diamond-shaped frame without any additional processing is applicable to this embodiment, similarly to the first embodiment.

[Third Embodiment of the Unit Mounting Bracket]

Figure 19:
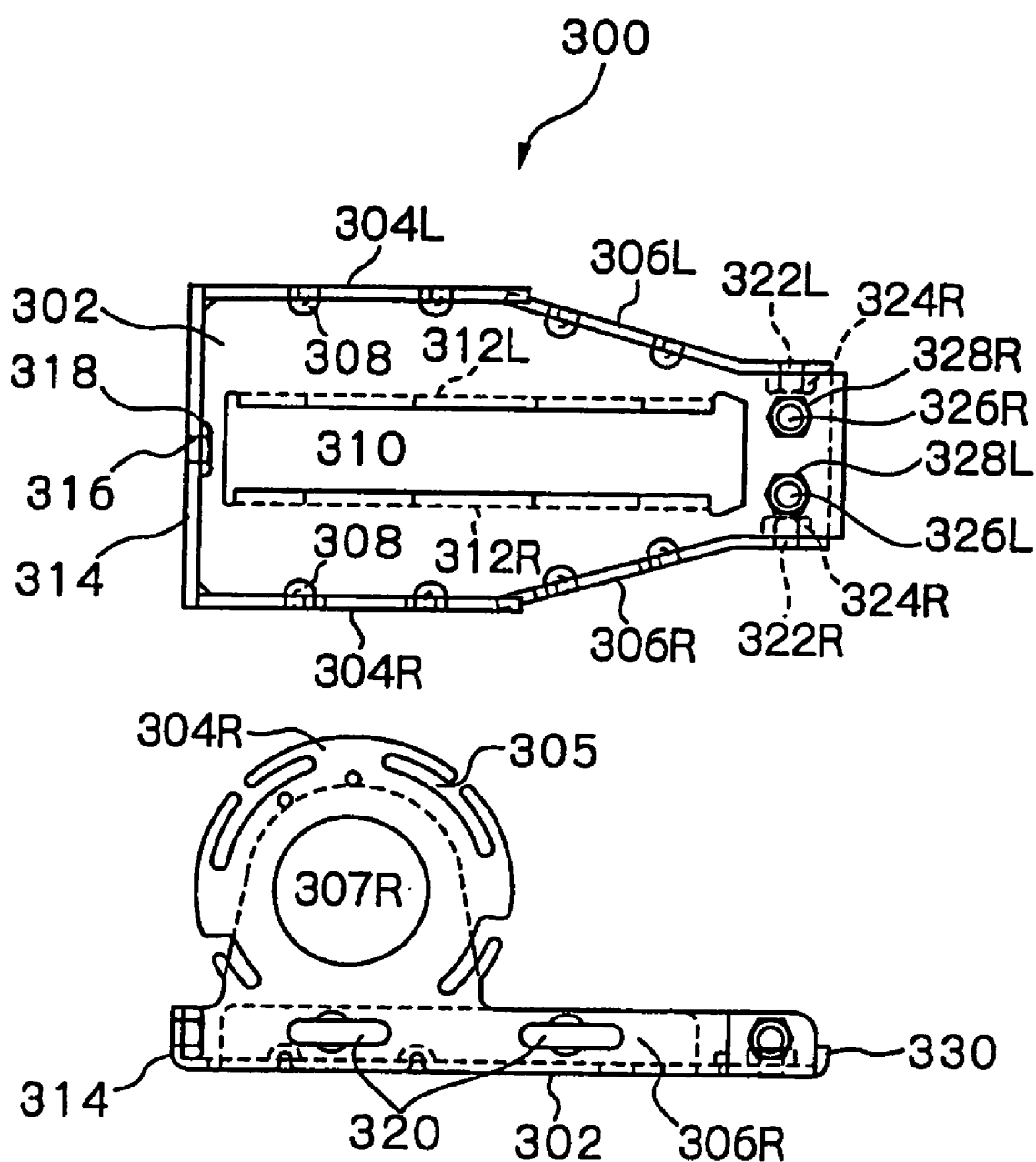
FIG. 19 is a top plan view and a side elevation view of a unit mounting bracket according to a third embodiment.

FIG. 19 shows a unit mounting bracket 300 according to a third embodiment, which is adaptable to bicycles with such frames, other than the diamond-shaped frame, as foldable bicycles or a light roadster bicycles, for example. The unit mounting bracket 300 comprises mainly a bottom plate 302, a pair of side plates 304R, 304L extending substantially in a vertical direction from the bottom plate 302, and an end plate 314 bent substantially at a right angle in an end portion of the bottom plate. The pair of side plates 304R, 304L comprises a pair of partial circular segments each having an outer circumference formed into a partial circle, and a pair of side extension segments 306R, 306L, extending from said bottom plate 302 substantially in the vertical direction along the length of the bottom plate as the extension segment of said partial circular segment, wherein said circular segments are provided with side holes 307R, 307L through which the drive shaft 4 (see FIG. 14) is to pass. It is to be noted that a plurality of slit holes 305 may be formed in said circular segment to allow attachment of a separate member thereto. Further, one or more (two in the illustrated example) of side guiding elongated holes 320 are also formed in each of said pair of side plates 304R, 304L.

A bottom guiding elongated hole 310 is formed in the bottom plate 302, which serves as a guide means for the electromotive power output unit box 13, as will be described later. A pair of guide wall segments 312R, 312L is formed along a pair of long edges defined in opposite sides of the bottom guiding elongated hole 310, said guide wall segments being bent substantially at a right angle from the bottom plate and extending in the same direction as the side plates 304R, 304L. The guide wall segments 312R, 312L are useful both for reinforcing the unit mounting bracket 300 and for guiding the electromotive power output unit box 13. Guiding elongated holes, which are not shown, are formed corresponding to the side guiding elongated holes 320 in parallel therewith. The guiding elongated holes of the pair of guiding wall segments 312R, 312L are formed such that each of them is at the same height from the bottom plate and in the same location in the longitudinal direction and has the same width as the side guiding elongated hole 320.

Further, a plurality (four each in the left and the right in the illustrated example) of corner-rib segments 308 is formed for providing additional reinforcement in a region where each of the pair of side extension segments 304R, 304L intersects with the bottom plate 252, in a form depressed inwardly toward the bracket so as to connect the side extension segment and the bottom plate. Further, a bent segment 330 that has been bent substantially in a vertical direction with respect to the bottom plate is formed in an end of the bottom plate 302 opposite to the end plate 314.

The corner-rib segments 308, the end plate 134 and the bent segment 330 may help reinforce the unit mounting bracket 300 significantly so as to prevent the bottom plate 302 and the connections between the bottom plate and the side plates from being deflected or deformed easily, which may otherwise occur due to the counteraction of the electromotive power output unit box 13 installed thereon when it generates the electromotive power.

Further, two through holes 326R, 326L are formed in the bottom plate 302 in the vicinity of the bent segment 330 spaced apart from each other with the longitudinal center axis line of the bottom plate placed therebetween. Two nuts 328R, 328L are fixedly coupled to the bottom plate 302 with their centerlines in alignment with those of the through holes 326R, 326L, respectively.

Two through holes 322R, 322L are formed in mounting segments of the pair of side extension segments 306R, 306L defined in the vicinity of the bent segment 330. Two nuts 324R, 324L are fixedly coupled to the mounting segments of the pair of side extension segments 306R, 306L with their centerlines in alignment with those of the through holes 322R, 322L, respectively.

It is to be noted that a through hole 316 is also formed in the end plate 314. A nut 318 is fixedly coupled to the end plate 314 with its centerline in alignment with that of the through hole 316.

The state where the electromotive power output unit box 13 has been installed by using the above-mentioned unit mounting bracket 300 will now be described with reference to FIG. 20.

Figure 20:
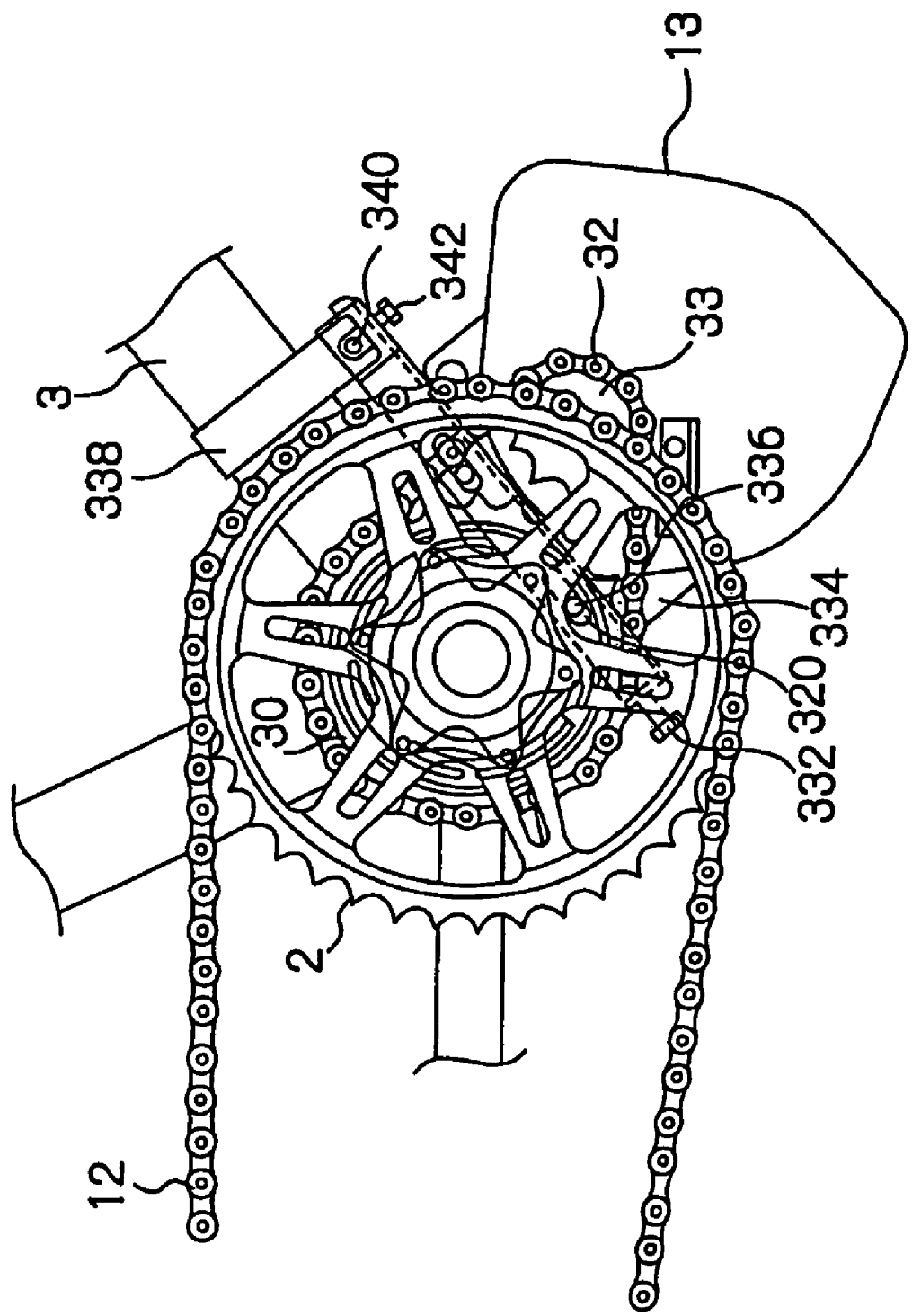
FIG. 20 is a diagram showing a state where an electromotive power output unit box has been mounted to a body frame of an electromotive power assisted bicycle of a double chain system by using the unit mounting bracket according to the third embodiment.

As shown in FIG. 20, similarly to the unit mounting brackets 70 and 250 according to the first and the second embodiments, the pair of side plates 304R, 304L is placed to clamp the support section so that the drive shaft penetrates therethrough. At this time, upper ends of the side extension segments 306R, 306L of the unit mounting bracket 300 are applied over the body frame 3 from the underside. A band 338 is wound around the body frame 3, and a pair of mounting holes of the band 338, which is not shown, and the two nuts 322R, 322L fixed to the mounting segments of the side extension segments 306R, 306L, respectively, are brought into alignment with each other at their centerlines, and then bolts 340 are engaged with these nuts, to thereby tightly clamp the body frame by the band 338. In addition, push screws are engaged with the nuts 326R, 326L fixed to the bottom plate 302 and screwed in until top ends of the push screws begin to apply a pushing force against the body frame.

In this way, since the unit mounting bracket 300 is fixedly secured at both ends, it may be held in an extremely stabilized condition, and additionally since the two push screws 342 are screwed in at the locations off from the longitudinal center axis line of the bottom plate, the screws can be inter-locked to the frame 3 and thus prevent slippage of the band reliably with the aid of the leading effect against the deflection of the bracket caused by the reactive force in association with the driving operation of the electromotive power output unit box 13.

A partial fine-adjusting mechanism of the unit mounting bracket 300 will now be described. This partial fine-adjusting mechanism functions as a chain tension adjusting mechanism when used in combination with the double chain force combining mechanism.

The electromotive power output unit box 13 has a raised portion 334 for a guide formed in a mounting face. This guiding raised portion 334 passes through the bottom guiding elongated hole 310 formed in the bottom plate 302. A width of the bottom guiding elongated hole 310 is substantially the same as that of the guiding raised portion 334, and a length of the bottom guiding elongated hole 310 is longer than that of the guiding raised portion 334. Accordingly, the electromotive power output unit box 13 is allowed to slide along the longitudinal direction of the unit mounting bracket 300 in a state such that an outer surface of the guiding raised portion 334 is substantially in contact with an inner wall of the bottom guiding elongated hole 310.

Further, the raised portion 334 includes in each of its side faces, one or more (two in the illustrated example) of guiding protrusions 336, which are configured and disposed to pass through the side guiding elongated holes 320 and the guiding elongated holes of the pair of guide wall segments 312R, 312L. A diameter of the guiding protrusion 336 is substantially the same as the width of the side guiding elongated hole 320, while it is smaller than the length of the side guiding elongated hole 320. Consequently, the electromotive power output unit box 13, in the state where the outer surface of the guiding protrusion 336 is almost in contact with the inner wall of the side guide elongated hole 320, is allowed to slide without any displacement in an up and down direction with respect to the unit mounting bracket 300.

The configurations of the raised portion 334 and the protrusion 336 may be desirably and favorably determined similarly to the case of the unit mounting bracket 250 of the second embodiment. Further, it is also preferred in the unit mounting bracket 300 of the third embodiment that a stabilizing area, which functions as a stabilizer during the sliding motion should be similarly arranged.

Yet further, the nut 318 fixed to the end plate 314 is engaged with a push screw 332 such that a top end of the push screw is in contact with the raised portion 334. Accordingly, rotating of the push screw 332 presses the raised portion 334, thereby providing a partial fine-adjustment of the electromotive power output unit box 13 along the longitudinal direction.

As described above, in the unit mounting bracket 300 of the third embodiment, since the position of the electromotive power output unit box 13 can be fine-adjusted in one direction, the installment of the auxiliary chain 32 over the power sprocket 33 and the adjustment thereof may become extremely easy. Further, as to the change in length in association with the age deterioration of the auxiliary chain 32, the adjustment of stretching of the chain can be provided easily.

Such an advantage that the electromotive power output unit box can be mounted in a flexible manner to the frame of an ordinary bicycle, especially to a frame other than a diamond-shaped frame, including, for example, a frame for a foldable bicycle, a light roadster bicycle and the like without any additional processing is applicable to this embodiment, similarly to the first embodiment.

[Fourth Embodiment of the Unit Mounting Bracket]

Figure 28:
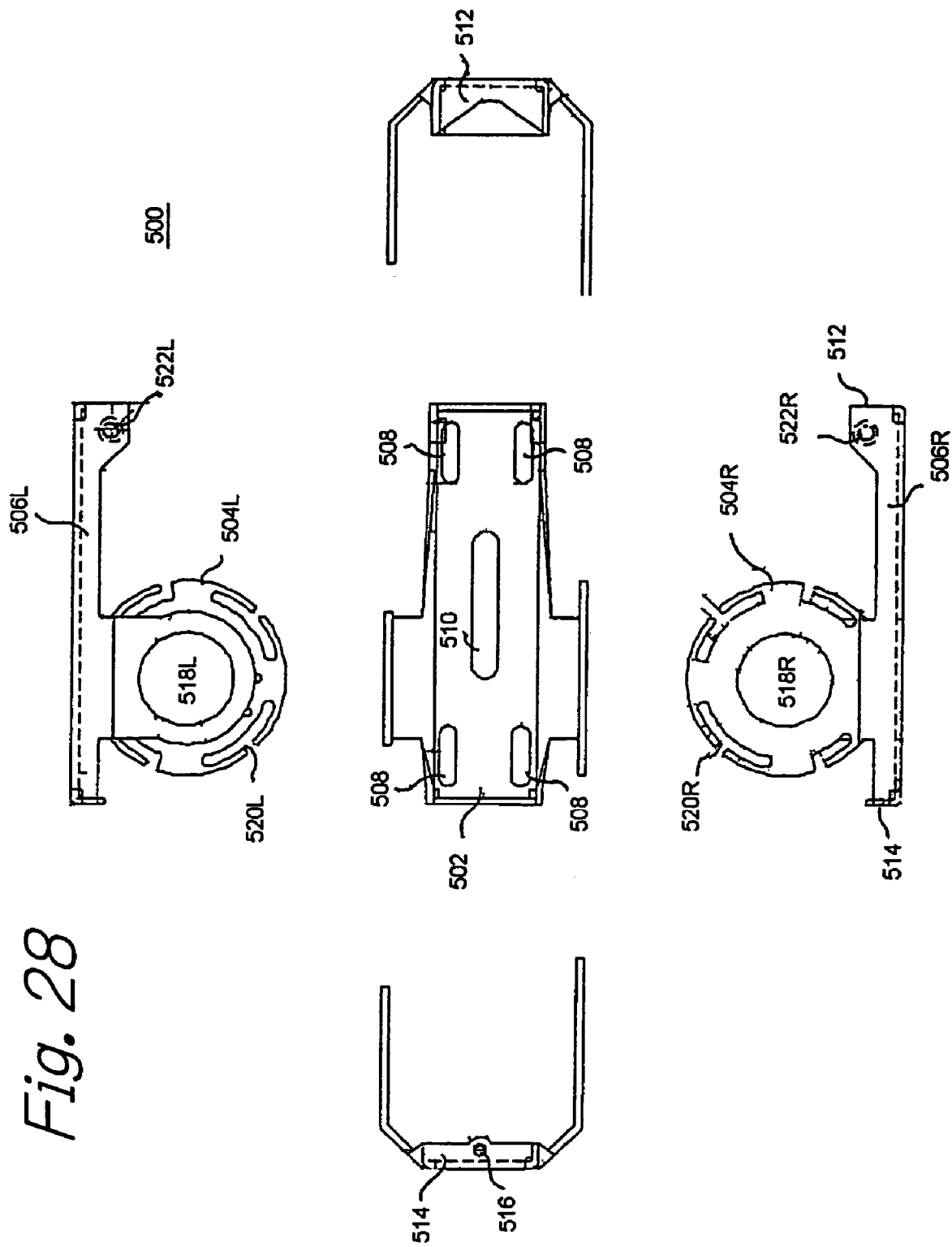
FIG. 28 shows the unit mounting bracket according to the fourth embodiment, viewed from the top (center diagram), from the front (right), from the back (left), from the right hand (lower) and from the left hand (upper) sides respectively.

Fourth embodiment of the unit mounting bracket will now be described with reference to FIG. 27 and FIG. 29. As shown in FIG. 28, a unit mounting bracket is generally shown by reference numeral 500, and comprises mainly a bottom plate 502, a pair of side plates 504R, 504L extending substantially in a vertical direction from said bottom plate 502, a frame engaging portion 512 formed in one end of said bottom plate and an end plate 514 bent substantially at a right angle in the other end of said bottom plate.

A V-shaped concave surface to be engaged with the frame is formed in the frame engaging portion 512, while in the end plate 514 is formed a sliding-motion hole 516 which is to be engaged with a bolt (524 of FIG. 1) for allowing the electromotive power output unit box 13 to move slidably.

The pair of side plates 504R, 504L comprises a pair of partial circular segments, each having a periphery formed into a part of circle, and a pair of side extension segments 506R, 506L extending from said bottom plate 502 approximately in a vertical direction along a length of the bottom plate as the extension segment for said partial circular segments. Said circular segments are provided in the central area thereof with side holes 518R, 518L through which the drive shaft 4 (see FIG. 14) is to pass. It is to be noted that a plurality of slit holes 520R, 520L may be formed in said circular segment to attach a separate member. Band attaching holes 522R, 522L are formed in the side extension segments 506R, 506L, each in one end thereof adjacent to the frame engaging portion 512.

The bottom plate 502 is provided with a bottom guiding elongated hole 510 usable as a guide means for the electromotive power output unit box 13, as will be described later, and four mounting elongated holes 508 through which bolts are inserted to install the electromotive power output unit box 13 to the bottom plate 502.

As shown in FIG. 27(a), bolts 526 are inserted respectively through the mounting elongated holes 508 of the bottom plate 502, and those bolts are engaged with a box mounting plate 530 that can be placed closely to an inner surface of the bottom plate 502. FIG. 29(a) shows this box mounting plate 530. As illustrated, the box mounting plate 530 has a backbone portion 532 and overhang portions 534 formed integrally with said backbone portion in the opposite ends thereof. Holes 536 capable of engaging with the bolts 526 are respectively formed in the vicinity of both ends of the overhang portions 534.

FIG. 27(b) shows a state where the unit mounting bracket 500 has been mounted to the body frame. The unit mounting bracket 500 is fixed by clamping the pair of side plates 504R, 504L from both sides under the condition where the drive shaft is inserted through the pair of side holes 518R, 518L and the V-shaped concave surface of the frame engaging portion 512 of the bottom plate is engaged with the body frame. At this time, since the angle of the bottom plate around the drive shaft can be adjusted, the unit mounting bracket 500 is adaptable to many different body frames, as is the case with the above embodiments. Further, to ensure the fixation of the frame engaging portion 512, a pair of fixing bands 540 with the frame clamped therebetween are coupled to each other in one end thereof and coupled to the bottom plate in the other end thereof, respectively.

FIG. 29(b) shows a shape of the fixing band 540. The fixing band 540 has a head section 542 and a band section 544 extending from said head section. The head section 542 is generally flat in its reverse face, where a bolt hole 546 is formed so that the bolt may be inserted therethrough. The band section 544 is provided with a plurality of bolt holes 548 allowing for the bolt 542 (FIG. 27(b)) to be inserted therethrough. A final configuration where the unit mounting bracket 500 is actually fixed to the body frame by using the fixing band 540 is such as shown in the lower drawing of FIG. 29(b) that the band section 544 is bent.

The pair of fixing bands is positioned with their reverse faces facing each other and then the bolt is inserted through the bolt holes 546 and fastened tightly, to thereby couple the fixing bands at one end thereof together. By inserting the bolt 542 into either one of the bolt holes 548 so as to be engaged with the band attaching holes 522R, 522L, the other ends of the fixing bands 540 are fixedly secured to the bottom plate. Selecting the bolt hole 548 through which the bolt 542 is to be inserted corresponding to a diameter of the body frame allows the unit mounting bracket 500 to be mounted to a variety of bodies.

FIG. 27(c) shows in an exploded view a state where the electromotive power output unit box 13 is mounted to the bottom plate 502 by using bolt holes formed in a lower plate 550 of said box 13. A front surface of the lower plate 550 facing the bottom plate is provided with a protrusion (not shown). This protrusion has a width approximately equal to the width of the bottom guiding elongated hole 510 and a length shorter than that of the hole 510, so that it may be slidably moved along the guiding elongated hole 510 in the state where it is inserted through the bottom guiding elongated hole 510 with a part thereof protruding into the inside of the bottom plate. Since this protrusion is engaged or thread-engaged with the top end of the sliding-motion bolt 524, the unit mounting bracket 500 according to the present embodiment is also provided with a partial fine-adjusting function similarly to the above second and third embodiments. When the box 13 is to be slidably moved, the sliding-motion bolt 524 should be rotated under a condition where the lower plate 550 of the box is not completely fixed with the bolts. Those bolts are moved in conjunction with the sliding motion of the box along the mounting elongated holes 508, and in association with this motion the box mounting plate 503 also moves in a state where it is in the proximity to the inner surface of the bottom plate. At a point where the auxiliary chain 32 has been adequately stretched, the mounting bolts of the lower plate 550 are tightly screwed in the box mounting plate 530 so that the box 13 may be fixed to the bottom plate 502 completely.

As described above, the unit mounting bracket 500 of the present embodiment allows the electromotive power output unit box 13 to be installed in various types of frames in a flexible manner. Further, since a fastening operation by the fixing band 540 is carried out under a condition where the frame engaging portion 512 located distant from the side plates 504R, 504L is in engagement with the frame, the box 13 can be installed to the frame more rigidly.

[Rotational Speed Sensor]

A rotational speed sensor for outputting a revolving speed signal to be input to the 1-chip microcomputer 14 will now be described.

FIG. 9 shows an NS polarized ring magnet 200 as one of the components of the rotational speed sensor. This ring magnet 200 is formed generally into a flat ring having an opening 205 in its center. The ring magnet 200 comprises a plurality of magnet segments that divides the ring by equal angles, and in those magnet segments, when viewed from the front side, N-pole segments 202 placed with their N-pole side facing front and S-pole segments 204 placed with their S-pole side facing front are alternately arranged. In such a case, preferably the N-S poles of the magnet segments may be arranged, as shown in the side elevation view, such that the direction of magnetic flux may be substantially normal to the ring surface to achieve the condition where the opposite sides of the N-pole segments 202 are S-pole and the opposite sides of the S-pole segments 204 are N-pole. Although 12 magnet segments are arranged in the illustrated example, more or less magnet segments may be employed according to a revolving speed of the object to be detected and a required detection accuracy.

It is to be noted that if there are normal components of the magnetic field with respect to the ring surface, then the orientation of the N-S pole of each magnet segment can be desirably and favorably modified. For example, one magnet may be placed along a circumferential direction so as to form adjacent N-pole segment and S-pole segment by respective poles of said one magnet. In that case, the opposite side of the N-pole segment will be N-pole, while the opposite side of the S-pole segment 204 will be S-pole, and it is considered from the viewpoint of the intensity of the magnetic field that the example of FIG. 9 is preferred.

FIG. 10 shows a gear 210 as an object whose revolving speed is to be detected. The gear 210 is rotated by the torque transmitted through the shaft 214 and a ring groove 208 is formed in one surface of the gear 210 to provide a size and shape sufficient to accommodate the ring magnet 200. The ring magnet 200 is accommodated in this ring groove 208 and affixed thereto by an adhesive or the like. At this time, preferably the ring magnet 200 and the surface of the gear 210 are flush with each other. This prevents the ring magnet from protruding beyond the gear surface and thereby minimizes the loss of space due to the installation of the rotational speed sensor.

Figure 11:
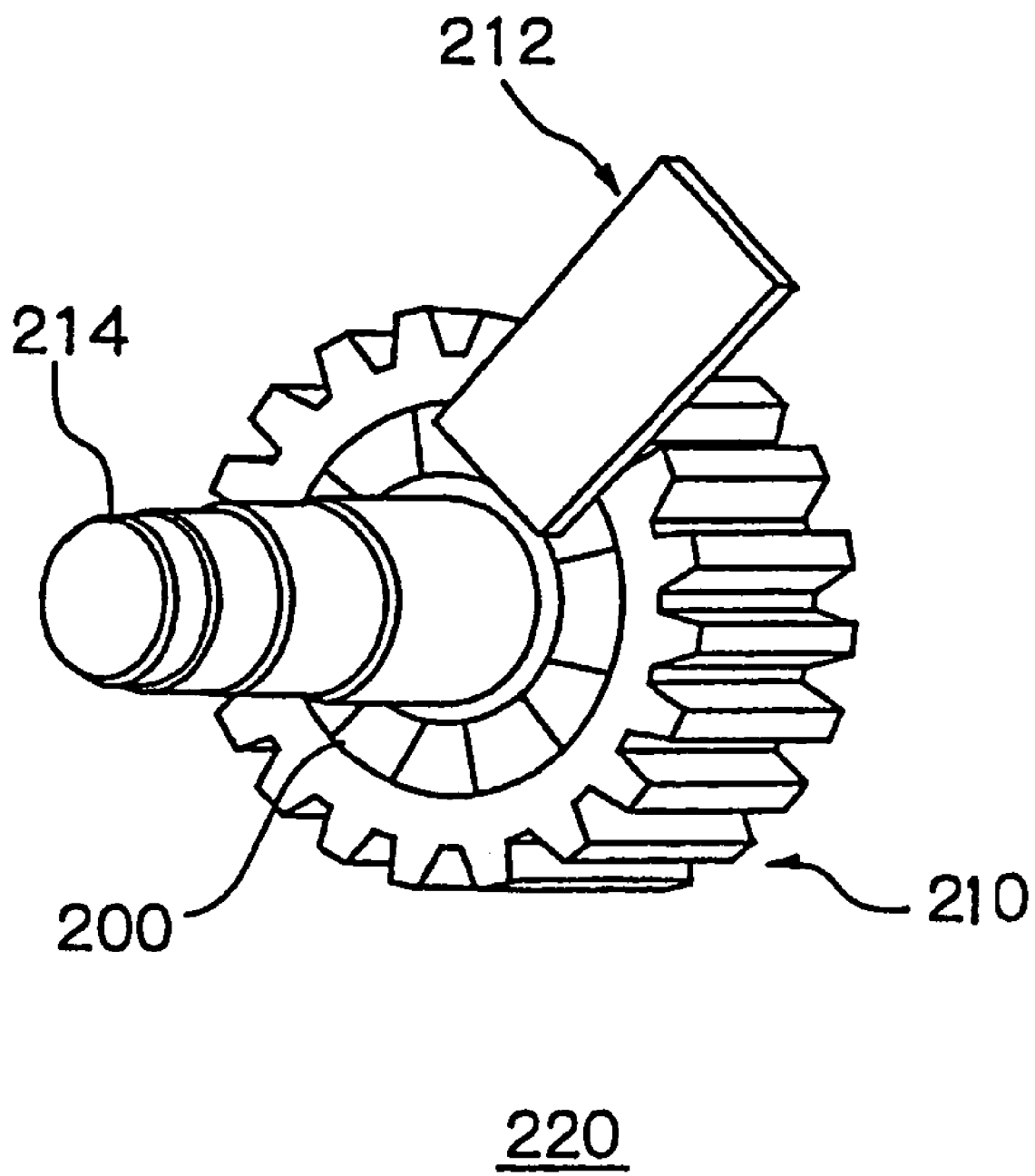
FIG. 11 is a perspective view of the rotational speed sensor of FIG. 10.

A Hall IC 212 for detecting the magnetic field is disposed adjacent to the ring magnet 200 installed in the gear 210. This Hall IC 212 is a well-known magnetic field detecting IC that is equipped with a built-in element that can generate a resistance proportional to a current and a magnetic field in a normal direction to the current and the magnetic field by the Hall effect when the magnetic field is present in vertical direction with respect to the direction of the current flow within a semiconductor, and the Hall IC 212 also outputs a value of said resistance as a digital signal. An output terminal of the Hall IC 212 is connected to the 1-chip microcomputer 14. FIG. 11 shows the rotational speed sensor 220 of FIG. 10 represented in the perspective view.

The 1-chip microcomputer 14 may analyze the magnetic field detection signal (the revolving speed signal) from the Hall IC 212 in any desired and preferred method to detect the revolving speed of the gear 210. Herein, FIG. 12(*a*) shows one example of the magnetic waveform by the ring magnet 200 at a point of detection by the Hall IC 212. The Hall IC 212 detects a variation in a magnetic field such as shown in FIG. 12(*a*) and outputs a pulse signal as shown in FIG. 12(*b*). The pulse signal of FIG. 12(*b*) corresponds in its timing to a local maximum portion of the N-pole side of the magnetic waveform of FIG. 12(*a*). In this case, the positive values (N-pole side) are exclusively extracted and the negative values (S-pole side) are deleted, but exclusively negative values or both the positive and negative values may be employed. The cycle of this pulse signal sequence (period between pulses) is proportional to the revolving speed of the ring magnet 200. Therefore, the 1-chip microcomputer 14 can detect a time interval of the pulse signal from the Hall IC 212 and determine the revolving speed of the ring magnet 200 and thus of the gear 210 immediately.

It is a matter of course that a magnetic field sensor other than the Hall IC; for example, a coil or the like, may be used, as far as it is capable of detecting the magnetic field. In this case, the output from the magnetic field detection sensor will appear to be such an analog waveform as shown in FIG. 12(*a*), and the 16-bit 1-chip microcomputer 14 is further added with a function for detecting, for example, a zero intersection point of the magnetic field signal (the time at the point of zero magnetic intensity), a peak in the N-pole side, or a peak in the S-pole side and for determining those times. Since the peak in the N-pole side 222 and the peak in the S-pole side 224 shown in FIG. 12(*a*) indicate the points when the poles of maximum magnetic intensity of the N-pole segment and the S-pole segment have passed through the detection area of the magnetic field sensor, the time period "T" necessary for the gear 210 to make one revolution can be detected from the count of occurrences of respective peaks and the times thereof. Thus, the revolving speed ($2\pi/T$) of the gear 210 can be determined immediately. It is a matter of course that the revolving speed of the gear may be determined when it is rotated by a predetermined angle, without waiting for a full revolution.

Since the rotational speed sensor of the present embodiment includes the NS polarized ring magnet 200 that has been formed in the flat ring shape, it can achieve a low profile and thus a space-saving and light-weight rotational speed sensor. Further, since it has a very simple structure, the fabrication thereof may be easy and thus the cost therefor may be reduced.

Further, since a plurality of magnetic segments has been integrated into a single flat ring, the assembling operation to a carrying component may be feasible in a very easy manner. For example, as shown in FIG. 10, a ring groove is cut in the surface of the gear 210 and the ring magnet is simply embedded and secured therein with an adhesive or the like. As compared to the procedure of embedding each one of discrete magnets representing respective poles, the above manner can improve the working efficiency outstandingly. Furthermore, if the depth of the groove is matched with the height of the ring magnet, then there will be no protrusion to the outside, further contributing to the space saving.

Further, the time resolution of the revolving speed can be improved by reducing the angular range occupied by each magnetic segment.

The rotational speed sensor 220 can be mounted to a desired portion to be detected, and rotated so as to reflect the running speed of the electromotive power assisted bicycle 1. As for this portion to be detected, a gear (not shown) within the reduction gear mechanism 35 operatively coupled with the power sprocket 33 directly or indirectly via another gear may be preferred, because it allows for the rotational speed sensor 220 to be accommodated in the housing of the electromotive power output unit box 13. A location other than the above may include each location of, for example, a gear (not shown) disposed within a rear wheel power transmission mechanism 10, the sprocket 2, the secondary sprocket 30, the power sprocket 33 and a revolving portion of a front wheel. The 1-chip microcomputer 14 may have a look-up table used for converting the revolving speed of the portion to be detected, which is determined as described above, into the running speed of the electromotive power assisted bicycle 1.

[Pedal Effort Detection Mechanism]

A pedal effort detection mechanism which outputs strain gauge signals 1, 2 to be input to the 1-chip microcomputer 14 will now be described with reference to FIGS. 13 through 16. The pedal effort detection mechanism according to the present embodiment detects a strain which varies in association with a deformation of the one-way clutch 99 in response to a pedal effort.

Figure 13:
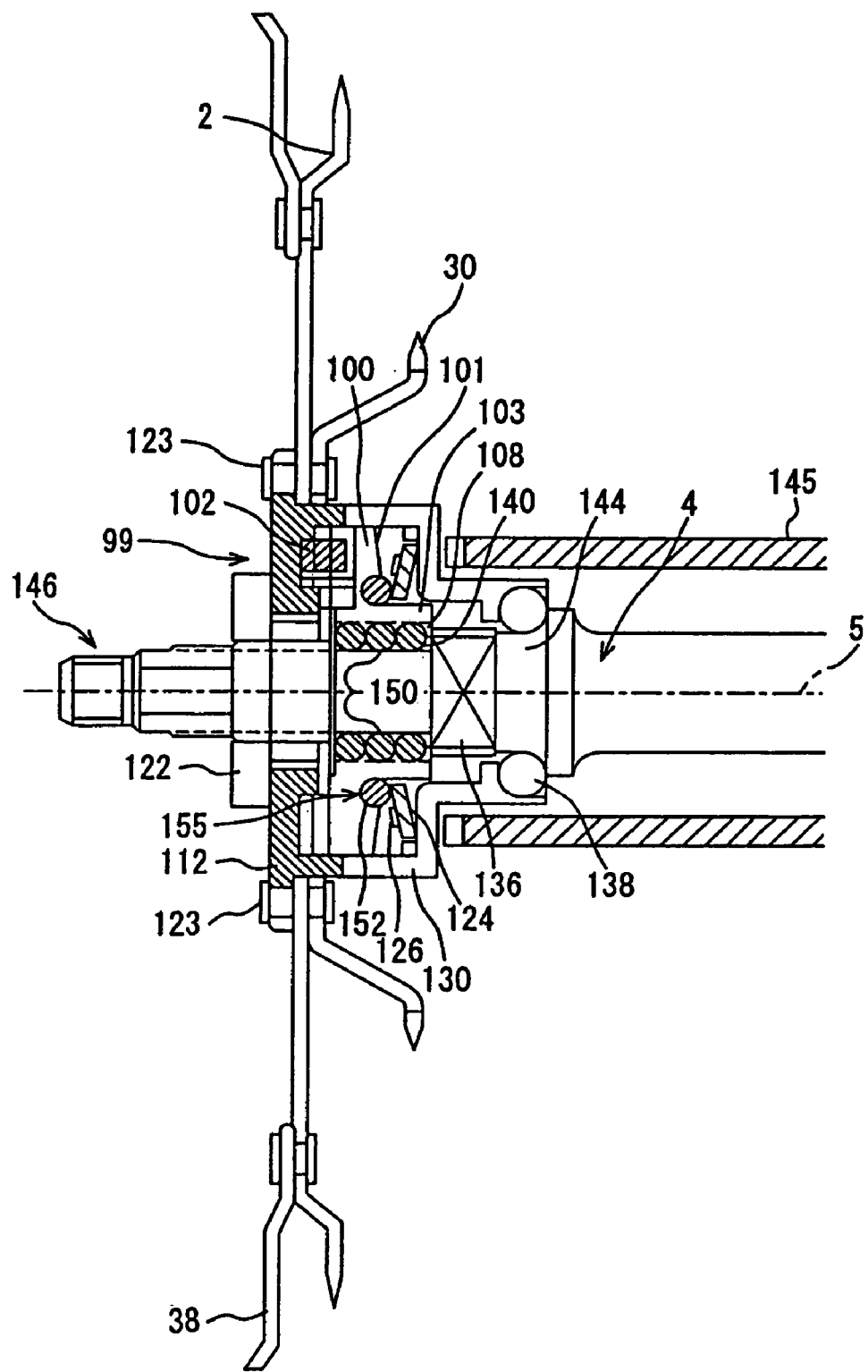
FIG. 13 is a cross sectional view around a drive shaft including a one-way clutch embodying a pedal effort detection mechanism of an electromotive power assisted bicycle of the present invention.
Figure 14:
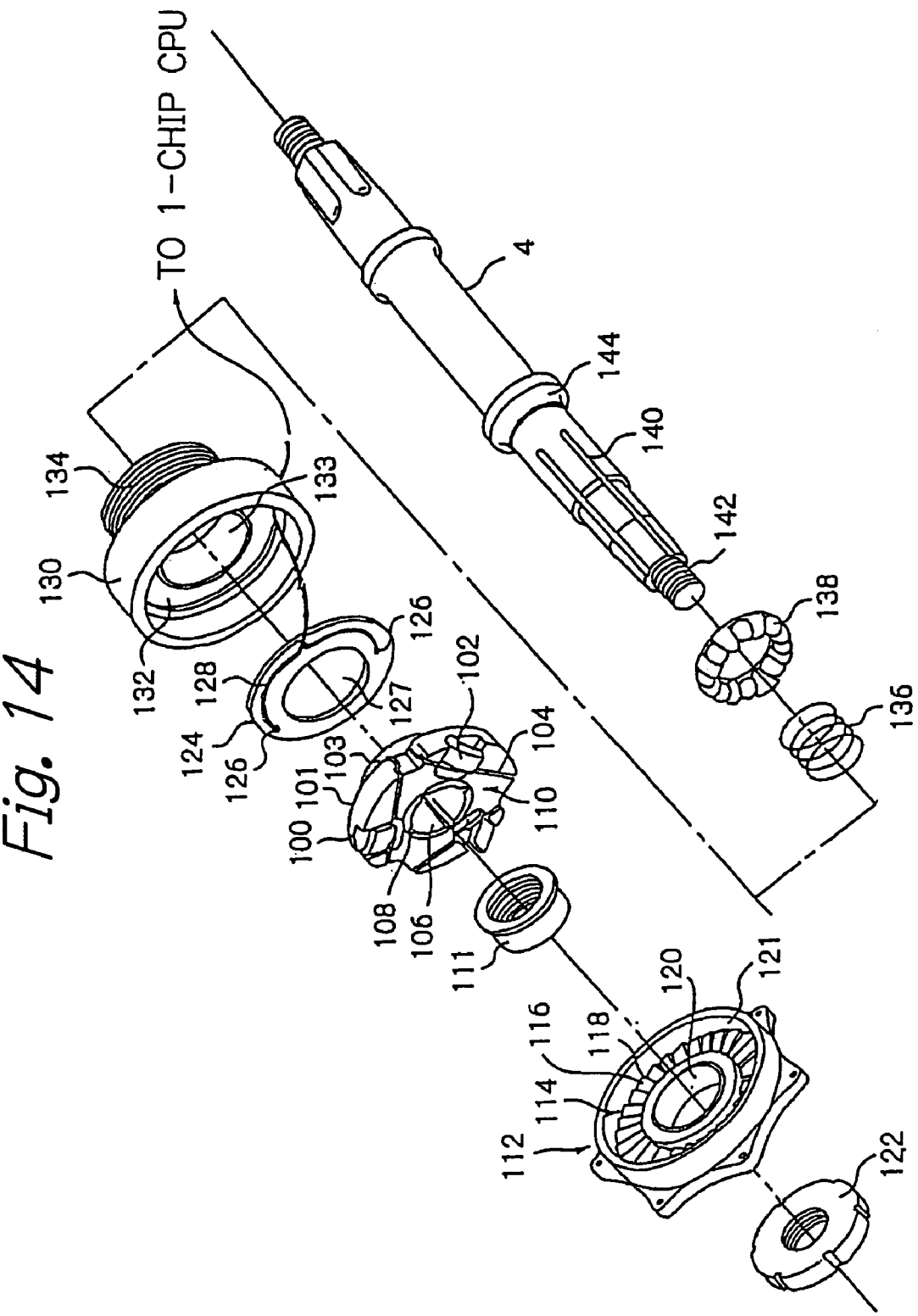
FIG. 14 is an exploded perspective view of the one-way clutch shown in FIG. 13.

As shown FIG. 13, the primary sprocket 2 is supported by the drive shaft 4 via the one-way clutch 99. This one-way clutch 99 comprises a pawl member 100 and a tooth member 112, as shown in FIG. 14.

Figure 15:
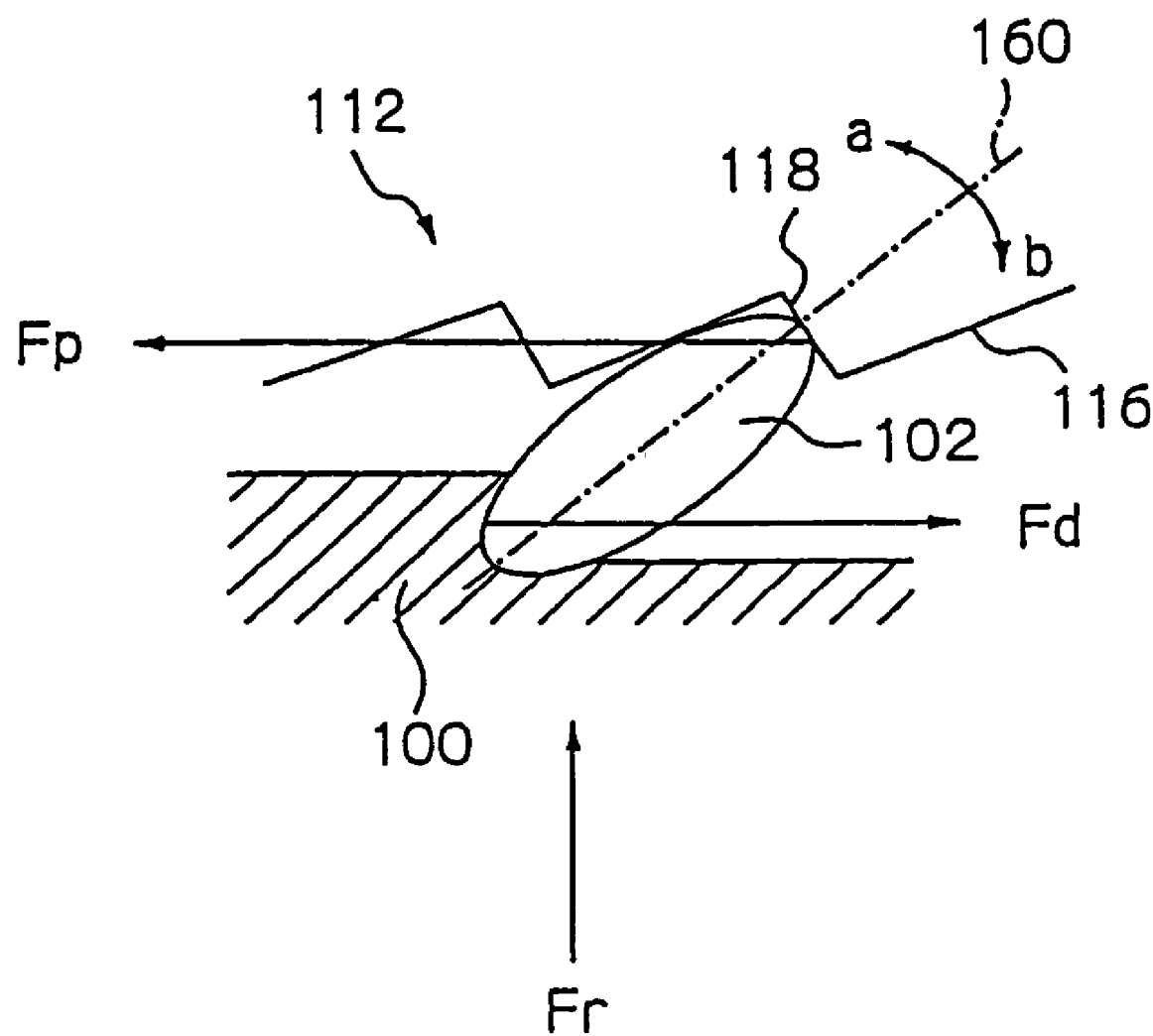
FIG. 15 is a diagram showing an engaged state of a tooth and a pawl of the one-way clutch (ratchet gear) for illustrating a principle of detecting the pedal effort of an electromotive power assisted bicycle of the present invention.

In the pawl member 100, three ratchet pawls 102 are arranged on a second engaging surface 100 along the circumference spaced apart by an angle of equal degrees. The ratchet pawls 102 are made of rigid material and configured to be capable of rotating around the shaft extending approximately along the radial direction of the second engaging surface 110. The ratchet pawls 102 are biased by a pawl erecting spring 104 so that a longitudinal direction thereof may form a predetermined angle with respect to the engaging surface 110 (a balancing direction 160 of FIG. 15) when no force is applied to the ratchet pawls 102. As shown in FIG. 15, when the ratchet pawls 102 deviate from the balancing direction 160 to an ascending direction "a" or a descending direction "b", the erecting spring 104 exerts a slight elastic force to the ratchet pawls 102 so as to cancel the deviation and to return it to the balancing direction 160.

Further, in the central area of the pawl member 100 is formed a pawl member bore 106 for receiving the drive shaft 4, and this pawl member bore 106 penetrates through a cylindrical portion 103 protruding from a back surface 101 of the pawl member 100. In the back surface 101, a circular groove 155 (FIG. 13) is formed on the outer surface of the cylindrical portion 103, and a number of steel balls 152 are fitted therein so as to rotate freely. This constructs a bearing serving for receiving an axial load as well as serving as a sliding bearing.

A coned disc spring 124 is brought into contact with the back surface 101 of the pawl member 100 with the cylindrical portion 103 passed through the center hole 127 thereof. At this time, the coned disc spring 124 is in slidable contact with the back surface 101 via the steel balls 152 or the load carrying bearing in a direction allowing for an elastic force of the coned disc spring 124 to resist against the pressure from the pawl member 100. Strain gages 126 are attached to the surface of the coned disc spring 124 at two locations opposite from each other by 180 degrees. The strain gauges 126 are electrically connected to the 1-chip microcomputer 14 via a lead 128. More preferably, three or more strain gauges may be attached to the coned disc spring 124. At this time, it is preferred that a plurality of strain gauges are disposed such that they are in rotationally symmetrical positions, on the surface of the coned disc spring 124.

The coned disc spring 124 is accommodated in the inner bottom portion 132 of a bowl-shaped supporter 130. In the supporter 130 are formed a support bore 133 for allowing the drive shaft 4 to pass through and a supporting cylindrical section 134 protruding from the back surface of the supporter 130. The outer surface of the supporting cylindrical portion 134 is threaded, so that the supporter 130 can be fixedly secured to the body by thread-engaging said threaded portion with the threaded inner wall of the support section 145. The inner wall of the supporting cylindrical portion 134 is engaged with a bearing 138 adaptable to support the load both in the axial direction and in the radial direction (see FIG. 13), and the bearing 138 is also supported by a stopper inclined plane 144 formed in the drive shaft 4. Similarly, another bearing 139 is mounted on the other side of the drive shaft 4 (see FIG. 4(b)), so that the drive shaft 4 may be rotatably supported with respect to the body.

Four of the first anti-rotation grooves 108 extending in the axial direction are formed on the inner wall of the pawl member bore 106. Also, four of the second anti-rotation grooves 140 extending in the axial direction 5 so as to face the first anti-rotation grooves 108 are formed on the outer wall of the driving shaft 4 to be in slidable contact with the inner wall of the pawl member bore 106. As shown in FIG. 16(a), the first anti-rotation grooves 108 and the second anti-rotation grooves 140 facing thereto define cylindrical grooves extending along the axial direction, and a number of steel balls are contained in each cylindrical groove thus filling the groove. Owing to this, the pawl member 100 can move along the axial direction 5 with a minimized frictional resistance, while preventing rotation relative to the drive shaft 4. This constructs a kind of ball spline, and a ball spline of other types, including, for example, a ball spline of endless rotation type, may be applied as such an anti-rotation means capable of sliding.

Further, as to the method for coupling the pawl member 100 to the drive shaft 4, a means other than the ball spline of FIG. 16(a) may be employed. For example, such a system as shown in FIG. 16(b), or a so-called key-spline system may be applicable as the anti-rotation means, in which the protrusion 140a extending in the axial direction is formed on the drive shaft 4, and a third anti-rotation groove 108a for accommodating the protrusion 140a is formed in the pawl member 100. Alternatively, in FIG. 16(b), the protrusion 140a may be formed in the pawl member 100 side and the third anti-rotation groove 108a may be formed in the drive shaft 4 side. Further, such a system as shown in FIG. 16(c), or a so-called key-groove system may be applicable as the anti-rotation means, in which a fourth anti-rotation groove 108b extending in the axial direction and a fifth anti-rotation groove 140b facing thereto are formed in the pawl member 100 and the drive shaft 4, respectively, and the key plate is contained in the groove in the rectangular parallelpiped shape formed by those grooves.

A plurality of ratchet teeth 114 are formed on a first engaging surface of the tooth member 112, which are to be engaged with the ratchet pawl 102. The ratchet teeth 114 comprise relatively sharply inclined planes 118 and relatively moderately inclined planes 116 with respect to the first engaging surface 121, and are formed alternately in a cyclic manner along a circumferential direction of the tooth member.

The tooth member 112 is supported by the drive shaft 4 via a collar 111 so as to be in slidable contact therewith in such a manner that its first engaging surface 121 may face the second engaging surface 110 of the pawl member 100. At this time, the ratchet pawl 102 and the ratchet tooth 112 are engaged with each other (FIG. 15). Specifically, the drive shaft 4 is operatively coupled to the tooth member 112 exclusively via the engaging portion between the ratchet pawl 102 and the ratchet tooth 112. The end portion 142 of the drive shaft 4 having passed through the tooth member bore 120 via the collar 111 is mated with a washer 122 to prevent the tooth member 112 from being shifted outwardly in the axial direction (FIG. 13). The tooth member 112 is attached with the primary sprocket 2 by the pin 123 (FIG. 13) so as to prevent the relative movement therebetween, and further the top end of the drive shaft 4 is formed into a pedal shaft 146. Thus, the ratchet gear is completely built, and serves for coupling the drive shaft 4 and the primary sprocket 2 so as to transmit exclusively the rotation by the force on the pedals in a forward direction of the body to the primary sprocket 2.

Preferably, a bias spring 136 is interposed between the stopper inclined plane 144 of the drive shaft 4 and the back surface 101 of the pawl member 100. This bias spring 136 forces the pawl member 100 to be biased in the axial direction so as to produce a clearance between the steel balls 152 accommodated in the back surface 101 and the coned disc spring 124 when the pedal effort is not greater than a predetermined value (for example, substantially proximal to zero).

An operation of the pedal effort detecting mechanism will now be described.

As a rider applies a pedal effort to the pedals 8R, 8L to rotate the drive shaft 4 in a forward direction of the body, this rotational driving force is transmitted to the pawl member 100 supported operatively by the drive shaft such that it can not rotate but can slidably move with respect to the drive shaft 4. At that time, as shown in FIG. 15, since the ratchet pawl 102 is applied with a force "Fd" corresponding to the pedal effort from the pawl member 100, the top end thereof is brought into contact with the relatively sharply inclined plane 118 of the ratchet teeth of the tooth member 112, thereby attempting to transmit this force to the ratchet teeth. Since the ratchet tooth member 112 is coupled to the primary sprocket 2, the top end of the ratchet pawl 102 receives a force Fp generated from the load for driving from the relatively sharply inclined plane 118. The ratchet pawl 102 that has been applied from both its end portions with the force Fp and the force Fd, which are acting in the opposite directions to each other, is rotated in the "a" direction to be elected. At this time, the pawl 100 is moved axially inwardly by the erection of the ratchet pawl 102 to press down the coned disc spring 124 disposed between the pawl member 100 and the supporter 130. The coned disc spring 124, in resistance to this, exerts an elastic force "Fr" to the pawl member 100. This force Fr and the force caused by the pedal effort to move the pawl member 100 in the axial direction are balanced within a short time. Thus, each of those parameters, including the stress-strain of the coned disc spring 124, the clearance between the pawl member 100 and the tooth member 112, the angle of the ratchet pawl 102 with the second engaging surface 110, the position of the pawl member 100 with respect to the body frame and a pressure applied to press down the coned disc spring 124, represents a physical quantity reflecting the pedal effort. Accordingly, the operating force T can be estimated by detecting at least one of those parameters.

In the present embodiment, the strain caused by the stress (hereinafter referred to simply as "strain") of the coned disc spring 124 will be detected by way of example. The 1-chip microcomputer 14 executes an arithmetic operation at least by an addition (including an averaging) of the signals from the two strain gags 126 attached onto the coned disc spring 124. In this way, measuring and averaging over the amounts of the strain at a plurality of locations may allow for the output variation to be extended even with the same level of pedal force and also allow for the noise components to be smoothed, and so the SN ratio can be improved and further an estimation accuracy of the pedal effort can be improved. This effect will become greater as the number of strain gauges increases.

For the pedal effort not higher than a predetermined value, since the bias spring 136 produces a clearance between the back surface 101 of the pawl member 100 and the coned disc spring 124, the steel balls 152 impinge less frequently upon the coned disc spring 124. Owing to this, the noise components in the strain gauge signals are reduced and thus the stability in the pedal effort detection and also in the electromotive power assisting control can be improved.

Subsequently, the 1-chip microcomputer 14 executes an arithmetic operation to determine an auxiliary power "Te" to be applied for assistance based on at least the calculated operating force T, and arithmetically determines and outputs a control signal to instruct the electric motor 37 to supply a rotational driving force for said auxiliary power. Preferably, the 1-chip microcomputer 14 converts the revolving speed signal detected by the rotational speed sensor 220 into a speed of the bicycle, determines an appropriate auxiliary power Te based on both the pedal effort T and the bicycle speed, and controls the electric motor 37 to generate said auxiliary power Te.

The pedal effort detection mechanism of the present embodiment can bring about further superior effects as follows:

(1) Since the ratchet gear and the pedal effort detection mechanism are realized in a single mechanism, reduction in the number of parts, compact arrangement, weight saving and low cost of the mechanism can be realized.

(2) Since the coned disc spring that is an integrated form of the load receiving unit and the load detection sensor are used in the portion serving for detecting the pedal effort and thus two functions have been realized in a single unit, in addition to the above-stated effects, further compactness, weight saving and low cost thereof can be achieved, (3) Since the compactness, weight saving and simplification of the pedal effort detection mechanism has been achieved at a higher level, as indicated in the above clauses (1) and (2), an allowable range of application of the pedal effort detection mechanism to be installed has been further extended.

(4) For the reasons defined in the above clauses (1) and (2), the transmission loss of the load can be reduced as compared to a traditional mechanism, thereby realizing a feeling of good response for thee rider.

(5) For the reasons defined in the above clauses (1) and (2), idle motions of the pedal (time lag until being sensed by the sensor) have been successfully eliminated as compared to the traditional mechanism (using the coil spring), and the pedal feeling at the time of applying the pedal effort in the present embodiment has been made similar to that of an ordinary bicycle, in contrast to the spongy pedal feeling in association with the traditional mechanism.

The preferred embodiments of the present invention have been described as above, but the present invention is not limited to those examples and may be modified desirably and preferably within the scope of the concept of the present invention.

For example, the unit mounting brackets according to the embodiments of the present invention may be applied not only to the electromotive power assisted bicycle but also generally to a bicycle of a type equipped with the electromotive power output unit box 13, including, for example, an electrically powered bicycle capable of running by both pedal effort and the electric power. Such an electrically powered bicycle can provide a running operation exclusively by pedal effort similarly to an ordinary bicycle, as well as a running operation exclusively by the electric power, and not relying on pedal effort through the turning-on operation of the switches or the like, for example. It is a matter of course that the electromotive power assisting mode to be actuated in response to the level of pedal effort may be added to such an electrically powered bicycle.

In the above example, the one-way clutch means has been disposed within the reduction gear mechanism 35, and is operable so that the torque is transmitted in the direction from the electric motor 37 to the primary sprocket 2 but the torque is not transmitted in the inverse direction, but it may be disposed in other adequate locations on the transmission path of the electromotive power from the electric motor 37 to the primary sprocket 2. For example, the secondary sprocket and the primary sprocket are fastened with pins so as to rotate as one unit, but the above described one-way clutch means may be disposed on the torque transmission path between the secondary sprocket and the primary sprocket.

Further, the way of arrangement for either one of the pawl and the teeth of the one-way clutch 99 to be mounted on the sprocket, and the other to be mounted on the drive shaft, may be desirably and preferably selected. In one example, the pawl member 100 may be mounted on the sprocket side, while the tooth member 112 may be mounted on the drive shaft 4 so as to be slidable but unrotatable such that the tooth member 112 may press down the coned disc spring 124.

Further, in the above example, the strain of the coned disc spring has been detected as a physical quantity in association with the pedal effort, but the present invention is not limited to this, and any physical quantity produced in the one-way clutch 99 may be detected therefor as long as it may vary in response to a deformation corresponding to the applied pedal effort. For example, the tilting angle of the ratchet pawl, the relative distance between the ratchet pawl member and the ratchet tooth member, the position of either one of the ratchet pawl member and the ratchet tooth member with respect the body, and the pressure applied to press the coned disc spring may be selected as the physical quantity reflecting the pedal effort.

Further, the elastic member arranged so as to resist against the deformation of the one-way clutch 99 may be desirably and preferably modified in its type and shape. Other than the coned disc spring or the coil spring, for example, a rubber or elastic member may be used. Still further, although the strain gauge has been employed as the means for detecting the strain, the means is not limited to this but any means may be employed as far as it can detect the physical quantity in association with the strain.

[Battery Bracket]

A battery bracket 165 comprises, as shown in FIG. 1, a bracket member 170 capable of detachably accommodating a battery 162 and engagingly locking the accommodated battery using a key, and a bracket retainer 183 to be coupled with the bracket member 170 so as to clamp the seat post 3a.

[First Embodiment of the Battery Bracket]

A detailed configuration of the battery bracket 165 according to a first embodiment will now be described with reference to FIGS. 21 through 24.

Figure 21:
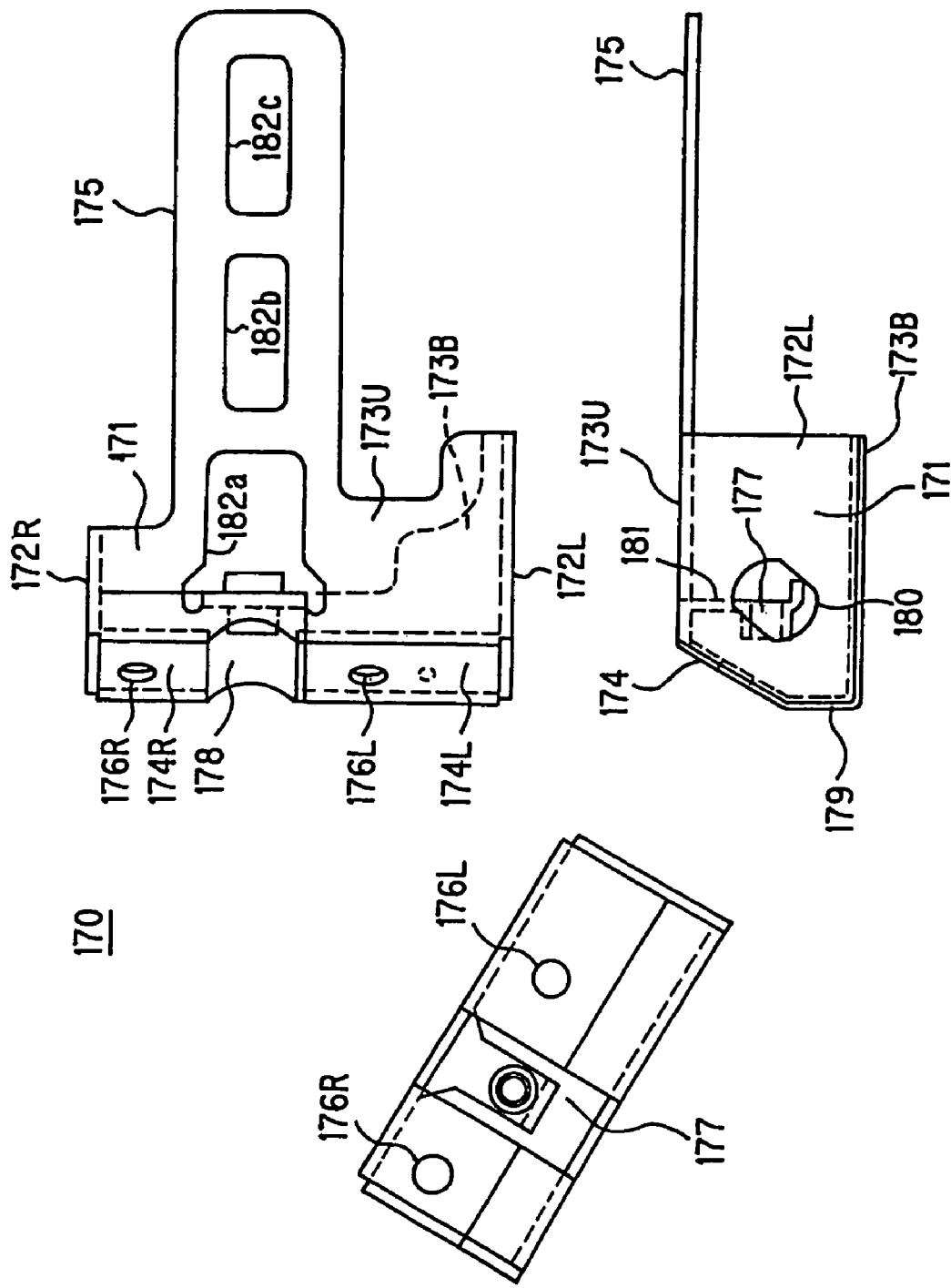
FIG. 21 is a bottom plan view, a front elevation view and a side elevation view of a bracket member constituent of a battery bracket.

FIG. 21 shows a lower plan view, a front elevation view and a side elevation view of the bracket member 170. The bracket member 170 comprises a box section 171 configured to house a part of the battery 162 and an extension plate section 175 extending from a top plate 173U of the box section.

The box section 171 is defined by the top plate 173U, a bottom plate 173B, a pair of left and right side plates 172R, 172L, a curved section 178 formed into a curved contour mating to a frame of the seat post 3a so as to clamp it, mounting faces 174R, 174L located adjacent to the curved section 178 in the left and the right sides thereof to be used as mounting faces which are to be engaged with the bracket retainer 183 when the battery bracket 165 is mounted to the body frame, and a connecting surface 179 connecting the bottom plate 173B with the mounting faces. An end face of the box section 171 defined in the opposite side to the mounting faces is open, and the battery 162 is to be inserted through this opening.

The mounting holes 176R, 176L are formed in the mounting faces 174R, 174L, respectively, for allowing fasteners such as bolts to pass through. Further, the mounting faces 174R, 174L are inclined with respect to the top plate 173U as illustrated so that in the state where the box section 171 has been mounted to the seat post 3a (FIG. 1) inclined with respect to the vertical direction, the battery 162 may be accommodated in the box section 171 approximately in a horizontal direction.

Further, the curved section 178 is also open. Herein, in the interior of the box section 171, a flexible arm 181 is suspended from the top plate 173U and a cylindrical frame engaging section 177 is formed in the lower end of this arm. When the battery 162 is inserted into the box section 171, the frame engaging section 177 is pressed by the battery, and it protrudes through the open curved section 178 to be engaged with the seat post 3a to thereby ensure the fixing of the battery bracket 165 to the seat post 3a.

A key hole 177 is opened in the side plate 172L for fitting the key device (see 188 of FIG. 24 as will be described later) therein. As for a mechanism of this key device, one system can be contemplated by way of example, in which an engagingly locking section (not shown) is formed in the housing of the battery 162, and the engaging section (not shown) protruded from a key cylinder by turning a key is engaged with said engagingly locking section of the housing so as to lock the battery fixedly. Alternatively, such a mechanism may be employed, in which the housing of the battery and the bracket member may be engagingly locked in a snap manner when the battery 162 is inserted into the bracket member 170, and the battery may be removed freely by pressing the push button, which is not shown, when not locked by the key device. In that case, the key device may be configured into a mechanism for fixing the portion engagingly locked in a snap manner so as to prevent the battery from being taken away.

The extension plate 175 is formed narrower in width than the box section 171 and its center axis is aligned with that of the curved section 178. To reduce the weight, three holes 182a, 182b and 182c are formed in the region extending from the top plate 173U to the extension plate 175.

FIG. 22 shows a top plan view, a front elevation view and a side elevation view of the bracket retainer 183. The bracket retainer 183 is configured as a rigid band comprising a curved section 185 formed into a curved contour mating to a shape of the frame of the seat post 3a to clamp it, and mounting faces 184R, 184L disposed adjacent to said curved section 185 in the left and the right sides thereof so as to be engaged with the bracket member 170 when the battery bracket 165 is mounted to the body frame. Mounting holes 186R, 186L are formed in those mounting faces 184R, 184L, respectively, for allowing the fasteners such as bolts to pass through.

The bracket retainer 183 further comprises an upper and a lower guard 187U, 187D extending approximately in a normal direction with respect to said mounting faces toward a direction opposite to the mounting faces.

When the battery bracket 165 is to be fixedly secured to the seat post 3a, the seat post 3a is received into a space defined by the curved sections 178 and 185. Then, the mounting faces 174R, 174L of the bracket member 170 are positioned to face the mounting faces 184R, 184L of the bracket retainer 183, and the corresponding mounting holes (176R and 186R, 176L and 186L) are aligned with each other. The fasteners such as bolts are inserted through those mounting holes and fastened up to thereby clamp the seat post 3a in the space defined by the curved sections 178 and 185.

A state where the battery bracket has been secured fixedly to the seat post 3a is shown in FIG. 23(a) (viewed from the side face) and in FIG. 23(c) (viewed from the bottom side). In this state, battery 162 is inserted into the bracket member 170.

As shown in FIG. 23(b), the battery 162 has a pair of vertical walls 164R, 164L protruding from the top wall thereof approximately in parallel with each other, and a pair of horizontal walls 166R, 166L extending from top ends of respective vertical walls in directions approaching each other, wherein a slot 167 is defined by those walls. When the battery 162 is inserted into the bracket member 170, the extension plate section 175 is accommodated in the slot 167. Owing to this, the fitting of the battery will be reinforced.

Herein, FIG. 24(a) and FIG. 24(b) show the state where the battery 162 is to be accommodated in the bracket member 170.

FIG. 24(a) shows the state where the battery 162 has begun to be inserted in the bracket member 170. As shown in FIG. 24(b), pushing the battery 162 further into the bracket member 170 from the state as indicated in FIG. 24(a) and turning the key device 188 can install the battery completely.

As described above, according to the battery bracket 165 of the present embodiment, theft of the battery 162 can be prevented by fixing it to the seat post 3a by using the key device 188. At that time, the present invention can eliminate such an effort to loosen or tighten the screw as practiced according to the prior art and enables an easy and quick attaching and detaching operation. Further, since the head of the fastener such as the bolt or the nut can be housed in the range surrounded by the upper and the lower guards 187U, 187D of the bracket retainer 183, it will be made impossible to approach from this side and to loosen the fastener and remove the bracket retainer 183. Since the other end of the fastener is in the inside of the box section 171 and covered with the battery 162 secured by the key device, it is impossible to access from the other end. Consequently, it will be impossible for a third party to steal the battery by disassembling the battery bracket.

To prevent the battery 162 from being stolen by pulling out the seat post 3a from the seat tube 3b, preferably the seat post 3a and its fixing site on the body should be coupled by a connecting means such as a wire or a rope. In that case, most preferably the connecting means may be laid within the inner wall of the seat post 3a and the inside of the body frame (for example, the seat tube 3b) over its entire length so as not to be viewable or accessible from the outside.

Further, as can be seen from the FIG. 23(a) and FIGS. 24(a) and (b), the attaching and detaching operation of the battery 162 is performed horizontally with respect to the ground. This makes it possible to minimize a distance between the mounted battery 162 and the saddle 18 as much as possible. In other words, even in the condition where the battery has been mounted, the height level of the saddle can be lowered as much as possible and thus the degree of freedom for adjusting the height can be ensured.

Yet further, it is to be appreciated that according to the battery bracket 165 of the present embodiment, even if there is little space available in the body for mounting the battery, the battery still can be mounted to the frame simply and easily.

[Second Embodiment of the Battery Bracket]

A configuration of a battery bracket 600 according to a second embodiment will now be described with respect to FIGS. 30 through 33.

As shown in FIGS. 30(a) and (b), the battery bracket 600, similarly to the first embodiment, comprises a bracket member (620, 630) capable of detachably accommodating a battery 162a and engagingly locking the accommodated battery by a key device, and a bracket retainer 602 to be coupled with the bracket member (620, 630) so as to clamp the seat post 3a.

FIG. 31 shows a configuration of the bracket retainer 602. The bracket retainer 602 comprises a band section 604 for clamping the seat post 3a, a coupling section 607 disposed in a halving section of said band section 604 and serving to couple the halving sections to each other, and a mounting section 605 having a mounting face for coupling the bracket retainer 602 to the bracket member. The band section 604 has bent segments 611 formed by bending both edges to enhance the rigidity. The coupling section 607 has a bolt hole 608 for allowing a bolt 650 to pass through for coupling both end portions of the band section 604 to each other. The mounting section 605 has bolt holes 610 for allowing the bolts to pass through for coupling the bracket retainer 602 with the bracket member.

As shown in FIG. 30(a), the bracket retainer 602 enables the battery bracket 600 to be mounted to the seat post 3a, in the state where it is coupled to the bracket member, by inserting the seat post 3a into a space defined by the interior of the band section 604, inserting the bolt 650 through the bolt hole 608, fitting a nut 652 to an end thereof and fastening up the nut.

In contrast to two connecting sites that have been provided in the bracket retainer of the first embodiment, only one connecting site may be needed in the second embodiment, thereby facilitating an easy mounting of the battery bracket to the body. It is to be noted that in the example shown in FIG. 30(a), a lever 648 is provided in the seat tube 3b so as to further facilitate the easy fixation of the seat post 3a.

The bracket member comprises a battery supporting terminal section 620 which has a connecting terminal with a terminal in the battery side and serves for supporting the battery from the beneath, and a battery supporting hanger section 630 for supporting and fixedly securing the battery in the above side.

Figure 32:
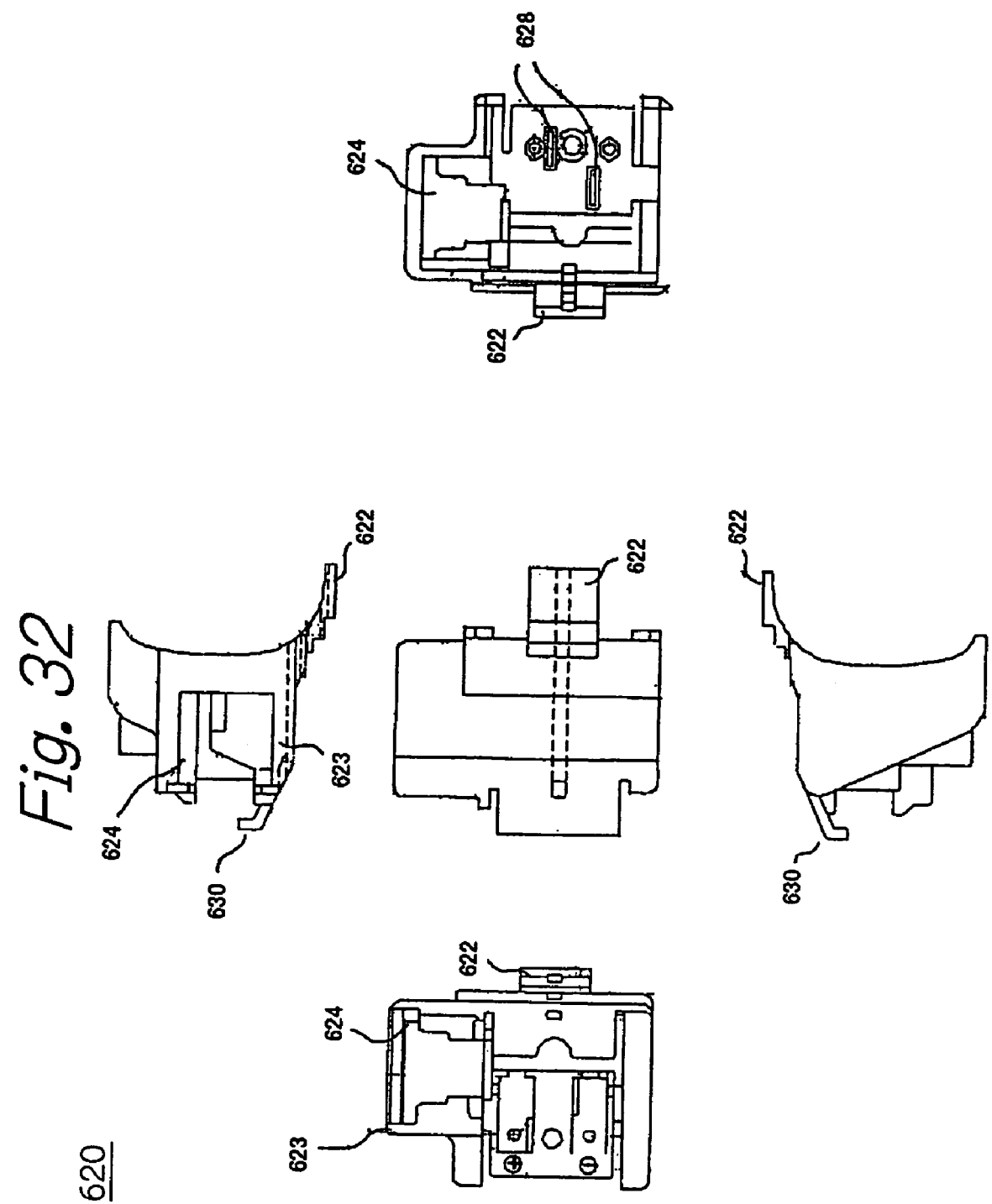
FIG. 32 shows a diagram of a battery terminal housing member of the battery bracket according to the second embodiment, viewed from the bottom side (center diagram), from the battery insertion side (right), from the body frame side (left), from the right hand side (lower) and from the left hand side (upper) respectively.

FIG. 32 shows a configuration of the battery supporting terminal section 620. It is to be appreciated that the battery supporting terminal section 620 is made of resin to provide an easy molding thereof which is adaptable to a variety of battery contours.

The battery supporting terminal section 620 comprises a supporting extension 622 disposed under the terminal so as to support the battery 162a from its underside, a side section for key 623 protruding toward the side face to house the key, a key hole 624 formed in said side section for key 623, a terminal 628 that is arranged in an engaging face with the battery and to be connected with the terminal of the battery 162a, and a protrusion 630 for ensuring a fixation of the battery supporting terminal section 620.

Figure 33:
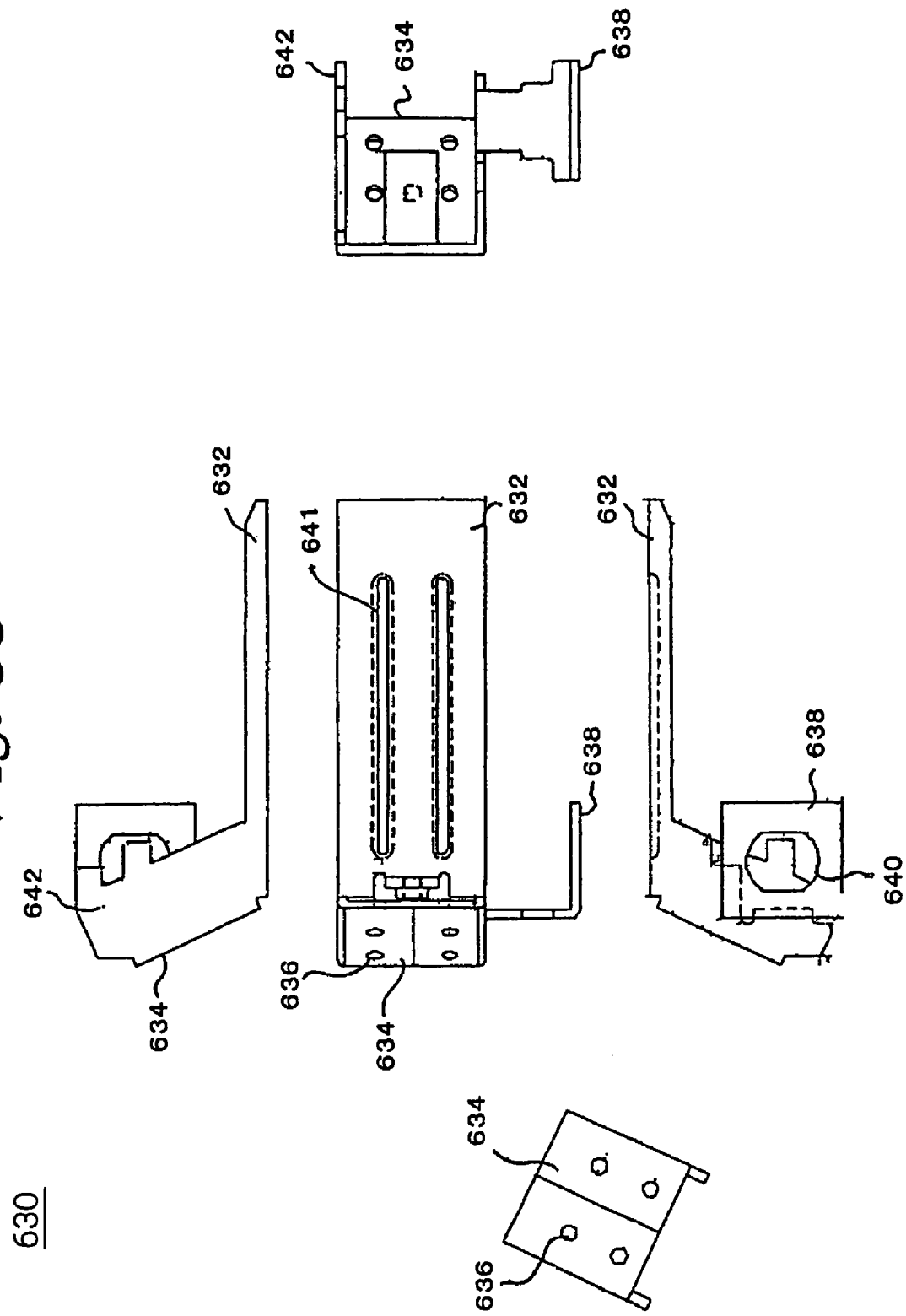
FIG. 33 shows a diagram of a battery support member of the battery bracket according to the second embodiment, viewed from the top side (center diagram), from the battery insertion side (right), from the body frame side (left), from the left hand side (lower) and from the right hand side (upper) respectively.

FIG. 33 shows a configuration of the battery supporting hanger section 630.

The battery supporting hanger section 630 comprises a body section 642 to be combined with a battery supporting terminal section 620 and an extension plate 632 extending from said body section. The body section 642 is provided with a mounting section 634 to be engaged with a surface of the mounting section 605 of the bracket retainer 602, a side section for key 638 protruding in a side face direction to accommodate the key, and a key hole 640 formed in said side section for key 638. Bolt holes 636 corresponding to the bolt holes 610 of the bracket retainer 602 are formed in the mounting section 634. The bolts are inserted through the bolt holes 636 and the bolt holes 610 of the bracket retainer 602 and engaged at one end thereof with nuts to be fastened to thereby couple the bracket retainer 602 and the battery supporting hanger 630 fixedly. The extension plate 632 is made so as to be inserted in the slot arranged in the housing of the battery, wherein a pair of reinforcing ribs 641 is formed in the extension plate 632 so as not to be deflected by the weight of the battery.

FIG. 30(b) shows an example in which the battery bracket 600 composed of the above-described parts that have been coupled to one another is mounted to the seat post 3a and further the battery 162a has been fitted therein. As shown in FIG. 30(b), the extension plate 632 is inserted in the slot 646 arranged in the top portion of the battery housing so as to support the battery from above in the form of suspending the battery, and the battery supporting terminal section 620 supports the battery from beneath by the supporting extension 622. Further, the side section for key 623 defined in the battery supporting terminal section 620 covers the side section for key 638 defined in the battery supporting hanger section 630 from the surroundings, and the key device 644 has been fitted through the key hole 624 and the key hole 638. By turning on this key device 644, the battery 162a is fixed so as not to be taken out as is the case of the first embodiment.

[Gear Box]

FIG. 25(a) shows a front elevation view of an electromotive power output unit box 13 serving as a gear box according to a first embodiment of the present invention, which is viewed from its output shaft 35a side (front side), while FIG. 25(b) shows a front elevation view thereof, which is viewed from the opposite side (reverse side).

As shown in FIG. 25(a), a housing of the electromotive power output unit box 13 comprises a box 400 which accommodates an electric motor 37 and a reduction gear mechanism 35 and a cover 402 for closing the opening (426 in FIG. 26) of said box. The box 400 and the cover 402 are coupled to each other with a plurality of bolts 404, 406, 408, 410, 412, 414 and 416. It is to be noted that bolt holes, which are not shown, are formed in the cover portion 402 into which the bolts 404-416 are inserted, and threaded holes are formed in the box 400, with which the bolts 400-416 are engaged.

Raised portions 418, 420 and 422 are formed in the cover 402. Bearings, which are not shown, are disposed in the reverse sides of the raised portions respectively, and receive and rotatably hold the shaft end portions of the gears of the reduction gear mechanism 35. Specifically, shaft centers of respective gears are aligned with the central tops of the raised portions 418, 420 and 422. The gear whose shaft end portion is held by the cover 402 may include, for example, a helical gear. It is a matter of course that other types of gear may be employed. It is to be noted that the output shaft 35a of the reduction gear mechanism 35 is protruded from the cover 402 and the power sprocket 33 is mated with said output shaft (see FIG. 4(b)).

It is to be noted that as shown in FIG. 25(b), a raised portion 424 is formed in the reverse side of the box 400 in a shape matched to the contour of the electric motor 37 configured as the flat motor (see FIG. 4(b)).

The gear box 13 according to the present embodiment is characterized in that the coupling positions Q1, Q2, Q3, Q4, Q5 and Q6 of the bolts 404-416 are arranged such that the shaft centers of the three gears whose shaft end portions are held in the locations of the raised portions 418, 420 and 422 are allowed to pass through the insides of respective different triangles defined by connecting those coupling positions Q1-Q6 of the bolts. In other words, with respect to each gear supported at shaft end thereof by the cover, three bolts may be arranged around the center of shaft of said gear to form a triangle therefor which is different from triangles for other shafts.

Figure 26:
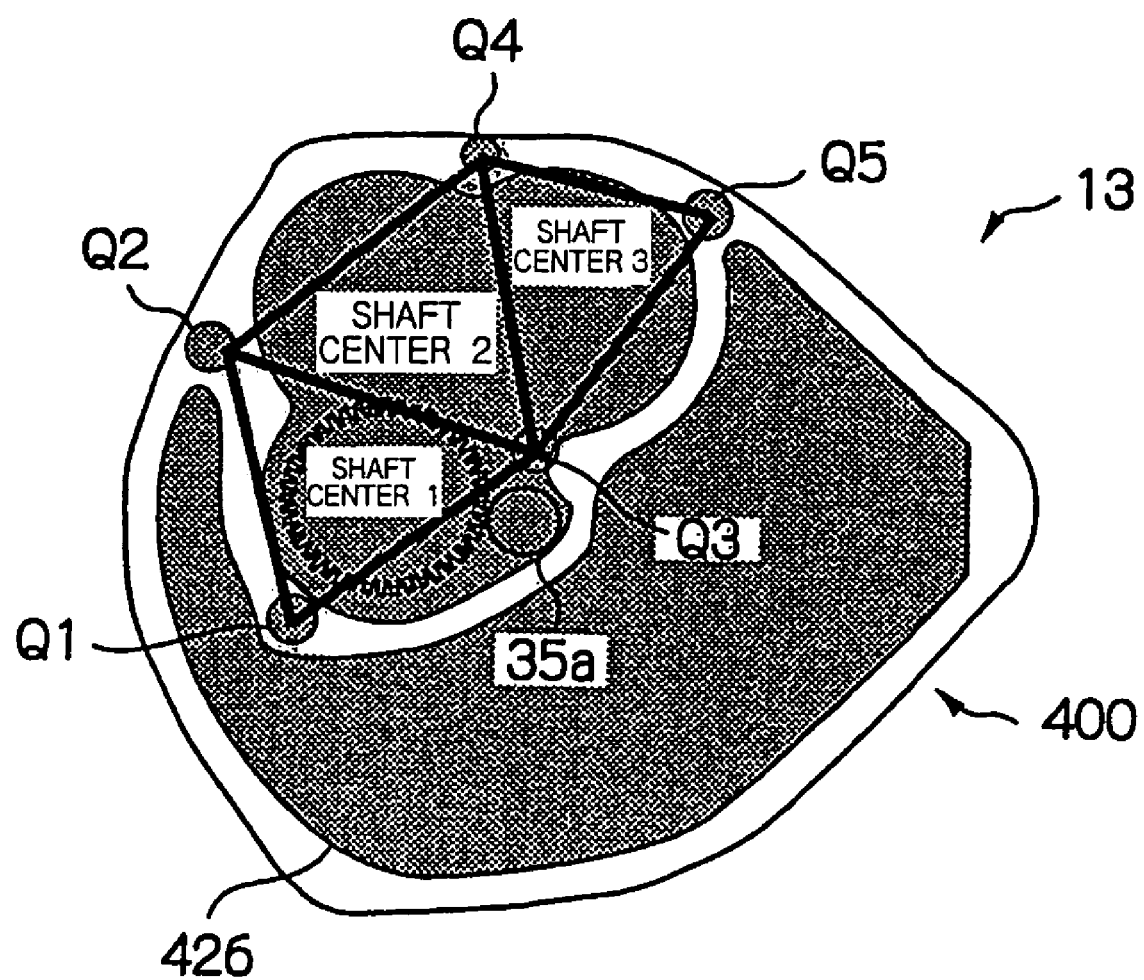
FIG. 26 is a front elevation view of a box in a state where a cover has been removed from a gear box according to one embodiment of the present invention.
Figure 34:
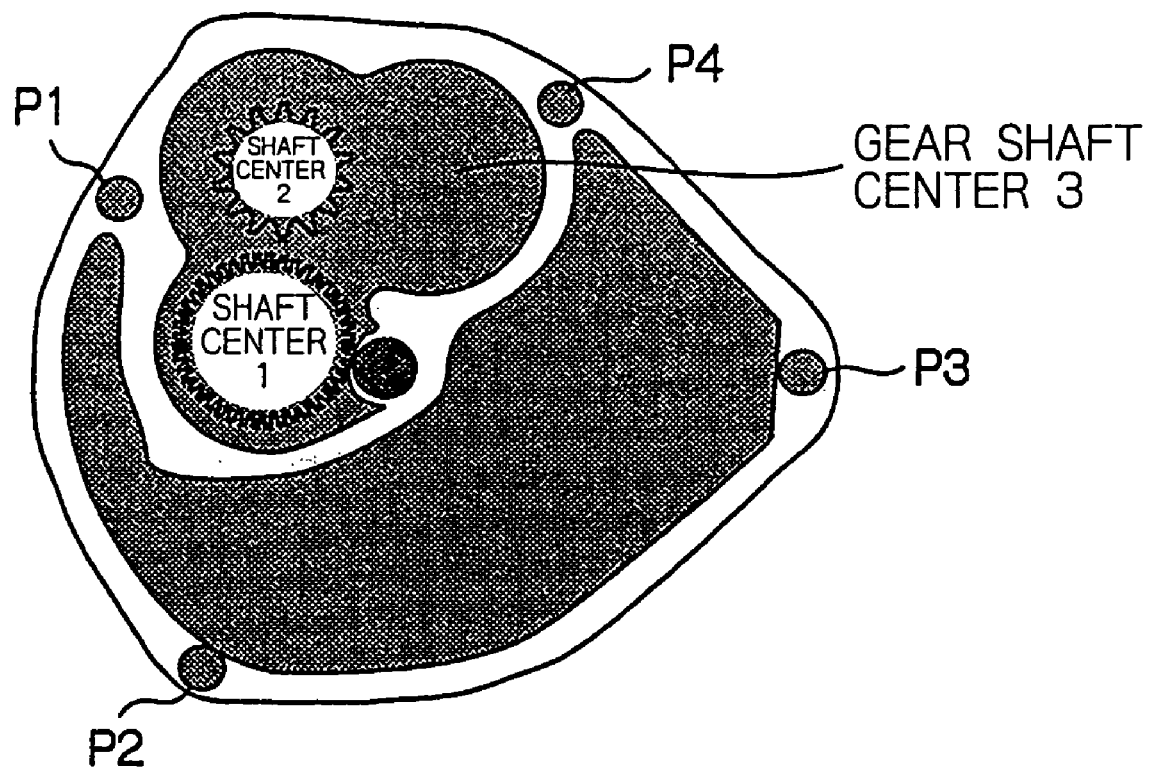
FIG. 34 is a front elevation view of a box in a state where a cover has been removed in a gear box according to a prior art.

FIG. 26 shows a front elevation view of the box 400 with the cover 402 removed. Each one of the shaft centers 1, 2, 3 is shown to be positioned in the inside of each one of the triangles, or the triangle Q1Q2Q3, the triangle Q2Q3Q4 and the triangle Q3Q4Q5. In addition, the triangles share one edge but not the area portion thereof. In contrast to this, it may be understood that the bolt fitting locations P1, P2, P3 and P4 according to the prior art shown in FIG. 34 can not make it possible to form the different triangles for respective shaft centers. In addition, the shaft center 2 is positioned disadvantageously even in the vicinity of the edge of the triangle P1P3P4.

Accordingly, the present embodiment allows the screw sections of the gear box to efficiently receive the load in the axial direction of respective gears, as compared to the prior art. Thus, the deflection of the gear box can be suppressed, and also its associative problem including the drumming phenomenon, and the deviations in the gear pitch and in the perpendicularity otherwise caused can thereby also be resolved.

The present embodiment is also applicable to the case where only a shaft end portion of one of the gears is held by the cover 402. In this case, a location of the shaft center of the gear should be designed for the shaft center not to pass in the vicinity of an edge of a triangle formed by connecting locations of three bolts but to pass near a center of, preferably near a center of gravity of the triangle so that an axial load from the shaft may be distributed approximately equally among three bolts. Further, preferably, the shaft center of the gear may extend approximately vertically with respect to this triangle to prevent a load normal to the shaft centerline from being induced. It is a matter of course that also in the example of FIG. 25(a) where a plurality of shaft end portions of the gears are held by the cover 402, preferably each of the shaft centers does not pass through the vicinity of the edge of the corresponding triangle but passes through the vicinity of the center of the triangle.

It is to be noted that the gear box according to the present embodiment includes any arrangements of the bolts that allow the axial load applied to the cover from the gears whose shaft end portions are held by said cover to be distributed approximately equally among the bolts. As a matter of course, these arrangements may be applied regardless of those factors including the number of gears whose end portions are held by the cover, the gear distribution over the cover and the like.

The invention claimed is:

1. An electromotive power assisted bicycle, comprising:
a drive shaft to be rotated by a pedal effort;
a primary sprocket fixed to said drive shaft for transmitting said pedal effort to a drive wheel;
a secondary sprocket fixed to said drive shaft coaxially with said primary sprocket;
a pedal effort detection means for detecting the pedal effort;
an electromotive power output unit box detachably mounted to a body of the bicycle for outputting an electromotive power in response to the pedal effort detected by said pedal effort detection means;
a power sprocket coupled to a rotating output shaft of said electromotive power output unit box;
an auxiliary chain stretched across between said secondary sprocket and said power sprocket;
a supporting section for rotatably supporting said drive shaft; and
a unit mounting bracket on which said electromotive power output unit box is mounted, said unit mounting bracket being fixed to said supporting section with the drive shaft penetrating through said unit mounting bracket.

2. An electromotive power assisted bicycle in accordance with claim 1, further comprising:
a battery bracket capable of accommodating a battery for said electromotive power output unit box, wherein said battery bracket includes
a bracket member capable of detachably accommodating said battery and interlocking the accommodated battery with a key, and
a bracket retainer to be coupled with said bracket member so as to clamp a body frame.

3. An electromotive power assisted bicycle in accordance with claim 2, in which said bracket retainer is formed as a rigid band for clamping said body frame.

4. An electromotive power assisted bicycle in accordance with claim 3, in which an orientation of said bracket member with respect to said bracket retainer has been set such that the battery accommodated in said bracket member is positioned approximately horizontally in a longitudinal direction thereof.

5. An electromotive power assisted bicycle in accordance with claim 3, in which said bracket retainer includes guards in both edges of said band extending in a longitudinal direction, said guards extending approximately in a vertical direction with respect to a band surface.

6. An electromotive power assisted bicycle in accordance with claim 3, in which said bracket retainer is a band having a halving portion, wherein said halving portion is fastened so that both fasing ends of the halving portion are close to each other, whereby said bracket retainer is fixed to the body frame.

7. An electromotive power assisted bicycle in accordance with claim 6, in which said bracket retainer has a mounting section for mounting said bracket member in a position of the band defined to be opposite to said halving portion.

8. An electromotive power assisted bicycle in accordance with claim 2, in which said bracket member has a supporting section for supporting a battery to be inserted therein and an extension plate extending from said supporting section, wherein
said battery comprises one or more electric cells enclosed by a housing, said housing being provided with a slot, and
when said battery is accommodated in said bracket member, said extension plate is accommodated in said slot.

9. An electromotive power assisted bicycle in accordance with claim 8, in which said supporting section is configured by combining a first supporting section having said extension plate with a second supporting section supporting said battery from an opposite side to said extension plate.

10. An electromotive power assisted bicycle in accordance with claim 9, in which said second supporting section is made of resin and comprises a terminal to be connected with a terminal of said battery.

11. An electromotive power assisted bicycle in accordance with claim 8, in which said supporting section is formed into a box shape with one end open for accommodating a part of said battery.

12. An electromotive power assisted bicycle in accordance with claim 2, in which said body frame to which said battery bracket is fixed is a seat post, and said seat post is coupled to a connection means fixed to a body, wherein said connection means extends through an inside of the body frame.

13. An electromotive power assisted bicycle in accordance with claim 2, in which said bracket member has an interlocking section that is engaged with said housing of the battery to thereby fix the battery when said key is turned.

14. An electromotive power assisted bicycle in accordance with claim 2, in which said bracket member and said battery comprise, respectively, those portions that are interlocked to each other at the time of insertion of said battery, and said interlocking section is fixed when said key is turned.

15. An electromotive power assisted bicycle in accordance with claim 2, in which said bracket retainer and said bracket member have curved sections associatively working for clamping the body frame and mounting surfaces to face each other.

16. An electromotive power assisted bicycle in accordance with claim 1, in which said electromotive output unit box comprises:
a box having an opening and capable of accommodating a plurality of gears inside thereof;
a cover for closing said opening; and
a plurality of coupling means for coupling said box with said cover in respective different coupling positions, wherein
a plurality of shaft end portions of gears is held by said cover, and
said coupling positions of the plurality of coupling means are arranged such that shaft centers of the plurality of gears whose shaft end portions are held by said cover may pass through an inside of respective different triangles defined by connecting said coupling positions of the plurality of coupling means.

17. An electromotive power assisted bicycle in accordance with claim 16, in which said shaft center of the gear whose shaft end portion is held by said cover passes through the vicinity of a center of gravity of said triangle.

18. An electromotive power assisted bicycle in accordance with claim 16, in which said shaft center of the gear whose shaft end portion is held by said cover extends approximately in a vertical direction with respect to at least one of said triangle.

19. An electromotive power assisted bicycle in accordance with claim 16, in which said gear whose shaft end portion is held by said cover is a helical gear.

20. An electromotive power assisted bicycle in accordance with claim 16, in which said coupling means is a bolt, and a bolt hole through which said bolt is to be inserted is formed in said cover, while a threaded hole with which said bolt is to be engaged is formed in said box.

21. An electromotive power assisted bicycle in accordance with claim 16, in which said respective different triangles have no shared area portion.

22. An electromotive power assisted bicycle in accordance with claim 16, in which an electric motor is disposed in an inside of said electromotive power output unit box, and said plurality of gears reduces a revolving speed of said electric motor.

23. An electromotive power assisted bicycle in accordance with claim 22, in which said electric motor is a flat motor.

24. An electromotive power assisted bicycle in accordance with claim 1,
wherein said unit mounting bracket has a bottom plate and a pair of side plates extending from said bottom plate approximately in the same vertical direction, and wherein
said unit mounting bracket is fixed to said supporting section in a state where said supporting section is clamped between said pair of side plates with said drive shaft inserted through side holes formed in said pair of side plates respectively,
said electromotive power output unit box being mounted to said bottom plate.

25. An electromotive power assisted bicycle in accordance with claim 24, in which said bottom plate has a mounting hole for inserting a bolt therethrough, said bolt being used to fix said electromotive power output unit box to the bottom plate on a surface thereof defined to be opposite to said supporting section, wherein when said electromotive power output unit box is mounted, a head of said bolt is located in a front surface side of said bottom plate facing to said supporting section.

26. An electromotive power assisted bicycle in accordance with claim 24, in which an end portion of said bottom plate is coupled with a band means for tightly clamping a body frame.

27. An electromotive power assisted bicycle in accordance with claim 26, in which said bottom plate comprises a pushing means for applying a pushing force onto the body frame.

28. An electromotive power assisted bicycle in accordance with claim 27, in which said pushing means is composed of at least two pushing screws that have been screwed in penetrating said bottom plate from a location off from a center axis line of said bottom plate.

29. An electromotive power assisted bicycle in accordance with claim 26, in which a V-shaped concave face to be engaged with said body frame is formed in the end portion of said bottom plate coupled with said band means.

30. An electromotive power assisted bicycle in accordance with claim 26, in which said band means has a plurality of holes, wherein one end portion of said bottom plate is fixed to the body frame by inserting a fixing means through either one of said holes and engaging said fixing means with said bottom plate.

31. An electromotive power assisted bicycle in accordance with claim 26, in which said unit mounting bracket further comprises a sliding means capable of slidably moving said electromotive power output unit box in one direction along said bottom plate, and said bottom plate has a mounting hole that allows a fixing means for mounting said electromotive power output unit box to said bottom plate to pass through and that is elongated along said one direction, wherein said fixing means is engaged with a mounting plate disposed in a body frame side of said bottom plate.

32. An electromotive power assisted bicycle in accordance with claim 24, in which said unit mounting bracket further comprises a sliding means capable of slidably moving said electromotive power output unit box in one direction along said bottom plate.

33. An electromotive power assisted bicycle in accordance with claim 32, in which said sliding means comprises:

a guide means for operatively guiding said electromotive power output unit box so as not to be out of said one direction when said electromotive power output unit box is slidably moved; and a moving means capable of adjusting a moving operation of said electromotive power output unit box along said one direction.

34. An electromotive power assisted bicycle in accordance with claim 33, in which said guide means has a bottom guiding elongated hole formed in said bottom plate, wherein said electromotive power output unit box is slidably moved in a state where a raised portion protruding from said electromotive power output unit box has been inserted through said bottom guiding elongated hole.

35. An electromotive power assisted bicycle in accordance with claim 34, in which said guide means has side guiding elongated holes formed in at least a pair of side plates, wherein said electromotive power output unit box is slidably moved in a state where a protrusion protruding from said raised portion in a side face direction has been inserted through said side guiding elongated hole.

36. An electromotive power assisted bicycle in accordance with claim 35, in which said pair of side plates further comprise side extension segments extending from base end portions thereof in a longitudinal direction of said bottom plate, wherein said side guiding elongated holes are formed in said side extension segments.

37. An electromotive power assisted bicycle in accordance with claim 34, in which said electromotive power output unit box includes a stabilizing area capable of slidably contacting with said bottom plate across a part or a full of surrounding area of a base end portion of said raised portion.

38. An electromotive power assisted bicycle in accordance with claim 33, in which said moving means comprises:

an end plate extending from an end portion of said bottom plate approximately in a vertical direction with respect to said bottom plate, and a pushing screw that has been screwed in said bottom plate, wherein said electromotive power output unit box is pushed in and slidably moved by said pushing screw.

39. An electromotive power assisted bicycle in accordance with claim 33, in which said moving means comprises:

a threaded shaft attached to said electromotive power output unit box such that it extends in said one direction;

an end plate extending from an end portion of said bottom plate approximately in a vertical direction with respect to said bottom plate and having an end hole through which said threaded shaft is to be inserted; and a bolt means to be engaged with a portion of said threaded shaft protruding from said end hole, wherein said electromotive power output unit box is slidably moved along with said threaded shaft by a revolution of said bolt means.

40. An electromotive power assisted bicycle in accordance with claim 24, in which said bottom plate comprises at least one rib that is raised up from one surface of said bottom plate and depressed from the other surface opposite to said one surface.

41. An electromotive power assisted bicycle in accordance with claim 40, in which said rib extends linearly over substantially full width of said bottom plate between said pair of side plates.

42. An electromotive power assisted bicycle in accordance with claim 24, in which said bottom plate, in at least one edge thereof on which said side plate is not extending, includes a bent segment that has been bent approximately at a right angle with respect to the bottom surface of said bottom plate.

43. An electromotive power assisted bicycle in accordance with claim 24, in which said unit mounting bracket further comprises a corner-rib segment formed in a region where said side plate intersects with said bottom plate in a form depressed inward said bracket so as to connect said side plate and said bottom plate.

44. An electromotive power assisted bicycle in accordance with claim 24, in which each of said pair of side plates comprises a partial circular segment with side hole formed in a central area of said circular segment through which said drive shaft is to pass.

45. An electromotive power assisted bicycle in accordance with claim 1, in which said secondary sprocket and said power sprocket are disposed in an inner side of the body than said primary sprocket.

46. An electromotive power assisted bicycle in accordance with claim 1, in which a one-way clutch is interposed on a transmission path of an electromotive power from said electromotive power output unit box to said primary sprocket, wherein said one-way clutch is configured and disposed so as to transmit a torque in a direction from said electromotive power output unit box to said primary sprocket but not to transmit the torque in the inverse direction.

47. An electromotive power assisted bicycle in accordance with claim 1, in which said electromotive power output unit box contains a single chip control circuit of 16 bits in minimum and an electric motor, wherein said single chip control circuit provides a whole control of an electronic processing of the electromotive power assisted bicycle as well as a software control in a pulse modulation control system of said electric motor based on at least said pedal effort that has been detected.

* * * * *